US006049143A

United States Patent [19]

Simpson et al.

[11] Patent Number: 6,049,143

[45] Date of Patent: Apr. 11, 2000

[54] ELECTRICAL CONNECTION SAFETY APPARATUS AND METHOD

[75] Inventors: Richard O. Simpson, Placerville; Stephen G. Jarvis, Alamo; John LaGrou, Placerville, all of Calif.

[73] Assignee: OFI, Inc., Placerville, Calif.

[21] Appl. No.: 09/298,566

[22] Filed: Apr. 22, 1999

Related U.S. Application Data

[63] Continuation-in-part of application No. 09/140,484, Aug. 26, 1998, Pat. No. 5,946,180.

[51] Int. Cl.[7] .......... H02H 3/00

[52] U.S. Cl. .......... 307/126; 307/131; 439/955; 361/1

[58] Field of Search .......... 307/116, 125, 307/126, 130, 131, 139, 140; 439/955; 361/5–7, 42, 59, 79, 86, 87, 93, 103, 1

[56] References Cited

U.S. PATENT DOCUMENTS

| | | | |
|---|---|---|---|
| 3,185,949 | 5/1965 | Jordan . | |
| 3,769,549 | 10/1973 | Bangert, Jr. . | |
| 4,386,333 | 5/1983 | Dillan . | |
| 4,642,248 | 2/1987 | Campolo et al. . | |
| 4,649,454 | 3/1987 | Winterton . | |
| 4,820,176 | 4/1989 | Niikura | 439/152 |
| 4,915,639 | 4/1990 | Cohn et al. . | |
| 5,109,315 | 4/1992 | Morse | 307/118 |
| 5,369,352 | 11/1994 | Toepfer et al. . | |
| 5,457,445 | 10/1995 | Su | 337/198 |
| 5,474,464 | 12/1995 | Drewnicki et al. . | |
| 5,563,782 | 10/1996 | Chen et al. | 363/146 |
| 5,577,923 | 11/1996 | Lee . | |
| 5,660,554 | 8/1997 | Mead . | |
| 5,781,387 | 7/1998 | Doyle et al. | 307/118 |
| 5,831,802 | 11/1998 | Ahmed et al. | 307/149 |
| 5,844,326 | 12/1998 | Proctor et al. | 307/34 |
| 5,875,087 | 2/1999 | Spencer et al. | 361/87 |

*Primary Examiner*—Jeffrey Gaffin
*Assistant Examiner*—Peter Zura
*Attorney, Agent, or Firm*—Sierra Patent Group, LC

[57] ABSTRACT

An electrical connection safety apparatus which eliminates the risk of fire or electric shock associated with current overload faults in electrical systems. The apparatus senses or detects the electrical current rating of electrical appliances or electrical cords or connectors which are plugged into electrical outlets, and disconnects power to the appliance or outlet and connector whenever the current rating is exceeded. Current rating is indicated by a preset current threshold for the appliance or by a detectable feature associated with an electrical connector. Circuitry monitors the load current delivered to the appliance or receptacle and connector and compares the load current to detected current rating. When a current overload occurs, power to the appliance or receptacle and connector is disconnected.

77 Claims, 15 Drawing Sheets

ELECTRICAL CONNECTION SAFETY APPARATUS AND METHOD

This is a continuation-in-part of application Ser. No. 09/140,484, filed Aug. 26, 1998, now issued as U.S. Pat. No. 5,946,180.

BACKGROUND OF THE INVENTION

1. Field of the Invention

This invention pertains generally to electrical appliances, sockets, receptacles, plugs and extension cords, and more particularly to an electrical connection safety apparatus which prevents fires and electrical shocks due to electrical faults caused by defects associated with AC electrical appliances, light fixtures, outlets, cords and connectors and by improper use of the same. The electrical connection safety apparatus of the invention senses or detects the current rating of electrical connectors when the connectors are plugged into an electrical socket, and disconnects the power to the socket and connector when the load current through the socket and cord exceeds the cord current rating. The electrical connection safety apparatus may be used with conventional electrical cords, connectors, sockets, appliances and light fixtures, and will reset itself whenever a connector is unplugged or removed from a socket.

2. Description of the Background Art

The use of electrical "extension" cords is well known and is widely practiced in residential and commercial settings to allow power to reach electrical appliances which are remote from wall-mounted AC electrical outlets, sockets or receptacles. Electrical extension cords for use at relatively low current ratings are widely available. Also widely available are lamp cords with easy-to-use male and female electrical cord ends and instructions which allow consumers to fashion their own extensions cords. A variety of power strips and multiple receptacle devices are often used in conjunction with extension cords to allow multiple appliances to draw power from a single extension cord. Because of the ease and convenience provided, extension cords have been and likely will continue to be overused as semi-permanent extensions of household electrical systems.

While the advantages provided by extension cords are well known, there are also important disadvantages associated with extension cord use. Particularly, a large percentage of residential and commercial fires are due to electrical causes involving extension cords. Persons using extension cords often lack sophistication with regard to electrical properties of the appliances, extension cords and receptacle devices. Thus, users of extension cords often select and purchase cords having the smallest physical size and position the cords under carpets or behind drapes in order to minimize visibility of the cords. In situations where the current flowing through an extension cord exceeds the cord's current rating, overheating of the internal conductors occurs which can result in the burning of cord insulation and materials adjacent to the cords, resulting in fires.

The fire risk associated with extension cord use has not been abated even though electrical safety is widely regulated by state, local and national government codes and regulations. For example, in the United States, the National Electric Code or NEC provides building safety codes which regulate the various parts of building electrical systems, including switches, lighting fixtures, wiring, outlets, circuit breakers, fuses and the like. However, NEC regulations essentially stop at the electrical outlet, and electrical appliances and extension cords are not regulated by building electrical codes. Local government ordinances generally require that all electrical appliances, extension cords and like items be approved by Underwriter's Laboratories or "UL." However, while building electrical systems and the appliances and cords used therewith are separately regulated to ensure safety, there are generally no regulations, ordinances or guidelines in place to provide for safety of the overall electrical system together with connected cords and appliances. Thus, a user of an electrical system can assemble one or more extension cords and appliances with a building electrical system, each of which complies with government codes, to achieve an arrangement which is unsafe and presents a risk of fire and electric shock.

The above problem is illustrated by the following scenario. In the United States, a typical wall-mounted AC electrical outlet or receptacle for residential use is rated to handle fifteen amperes of current. Electrical protective devices such as circuit breakers and/or fuses are generally associated with the electrical outlet and will "trip" or disconnect the outlet in the event that a current overload through the outlet occurs. A user connects a standard electrical extension cord rated for ten amperes of current to the outlet, and then connects a multiple receptacle power strip to the extension cord. The user then connects three electrical appliances to the power strip, with each appliance operating normally with a five ampere current load. In the event that all three appliances are activated or turned on simultaneously, each appliance will simultaneously draw a five ampere current load, resulting in fifteen amperes of current flowing through the ten ampere extension cord. Since the current rating of the cord is exceeded, the cord conductors can overheat and burn the cord insulation and adjacent materials, and thus cause a house fire. The circuit breaker or other safety device which protects the outlet will not trip or otherwise interrupt the current flow because the current through the outlet has not exceeded the outlets fifteen ampere threshold. Thus, even though the building electrical system, extension cord and appliances each comply with safety codes, a fire can result from their use, and the fire is not avoided by the current overload protection provided by the circuit breaker.

Other current overload faults can develop in residential situations wherein the conventional overload protection provided by circuit breakers will also fail to prevent a fire. Electrical appliances such as televisions, refrigerators, toasters, computers and the like can, and often due, develop internal faults that cause a "hot spot" within the appliance. For example, in appliances wherein an electric motor drives rotating or moving parts, such as in refrigerators, the bearings or bushings wear and lose lubrication, and the electric current needed to operate the motor increases in order to overcome the friction. When such an appliance failure occurs, the current load drawn by the appliance will include the normal operating current together with fault-induced current. This total current can exceed the current rating of the electrical cord of the appliance but still be insufficient to trip the protective circuit breaker, and thus result in a fire as the cord overheats. Additionally, many appliances include internal combustible materials which can ignite as a result of current overload.

Still another situation in which an overload fault can result in a fire involves electrical outlets themselves and the circuit breakers or fuses installed to protect them from overload situations. As noted above, in the United States, residential electrical outlets are typically rated for fifteen amperes of current. For various reasons, circuit breakers or fuses are often inadvertently installed which have higher current trip levels, such as twenty amperes, than the electrical outlet current rating. In such situations the electrical outlets themselves can overheat and cause a fire.

Yet another situation in which a current overload can occur and cause fire is present in standard light fixtures, and particularly in overhead incandescent light fixtures. A typical dual lamp ceiling light fixture is generally manufactured for use with sixty watt light bulbs. The metal enclosure, light bulb sockets and insulation are designed to safely dissipate heat from sixty watt bulbs. Excess heat from higher wattage bulbs, however, will eventually overheat, char and damage the integrity of the light bulb sockets and create a potential fire hazard. A warning sticker from the manufacturer is included on the fixture indicating that the fixture should not be used with light bulbs which exceed sixty watts. Users often ignore such warnings and will use one hundred watt bulbs in the light fixture, and the resulting heat damage to the light bulb sockets can lead to a fire. Another hazard associated with overhead light fixtures, even when used properly, is that the heat generated by the light bulbs may be prevented from dissipating due to excessive or incorrect use of overhead or attic insulation. As the insulation serves to capture heat in the light fixture, the housing of the light fixture can elevate to dangerous levels and result in fire even though the recommended light bulbs are used.

A further problem associated with electrical receptacles and outlets, in addition to the current overload hazards noted above, is the shock hazard presented to small children by the typical electrical receptacle. Children often shock themselves, sometimes fatally, by pushing foreign objects, such as hair pins, paper clips, wires, or other small conductive items, into the slot of the receptacle until a foreign object contacts a live conductor within the receptacle and delivers current to the child. While plastic caps are available to cover unused receptacles, they are seldom used, and can be removed by children.

Various devices are known for protection against ground faults associated with appliances and cords, such as ground fault circuit interrupters and ground fault shields. However, these devices offer no protection in current overload fault situations. Presently, there are no available devices or systems which can remedy the aforementioned problems associated with current overload faults in electrical appliances, extension cords or outlets. Further, there are no satisfactory devices or systems available for preventing current overloads or overheating in light fixtures, or for eliminating the shock hazard presented to children by conventional electrical receptacles.

Accordingly, there is a need for an electrical connection safety apparatus that provides protection against current overload faults or overheating in electrical connections, electrical appliances, electrical light fixtures and electrical systems generally which could otherwise result in a fire, and which eliminates the electrical shock hazard presented to children by conventional electrical receptacles. The present invention satisfies these needs, as well as others, and generally overcomes the deficiencies found in the background art.

SUMMARY OF THE INVENTION

The present invention is an electrical connection safety apparatus and method which eliminates the risk of fire or electric shock associated with current overload faults in electrical systems. The apparatus senses or detects the electrical current rating of electrical connectors which are plugged into electrical outlets and disconnects power to the outlets and connectors whenever the connector current rating is exceeded. The invention further provides for the detection of excess heat generated by an electrical fixture, connection or appliance, and disconnects power to the same in the event that a certain temperature threshold is exceeded. The invention can be used with conventional electrical connectors, cords and electrical outlets which are presently in use.

In general terms, the invention comprises means for sensing or detecting the current rating of an electrical connector, means for sensing or detecting the load current delivered through the electrical connector, and means for disconnecting power to the electrical connector when the load current exceeds the connector's detected current rating. The invention also preferably comprises means for indicating the current rating of electrical connectors, means for resetting the power disconnecting means, means for preventing power disconnection due to "false" overload detection, means for indicating the location of a current overload fault, means for disconnecting power due to detection of a temperature threshold, means for disconnecting power due to detection of a ground fault, means for indicating the location of a ground fault, means for disconnecting power due to detection of an arc fault, means for indicating the location of an arc fault, and means for preventing electrical shocks due to insertion of foreign conductors into electrical receptacles.

By way of example, and not of limitation, the connector current rating indicating means preferably comprises a detectable feature or indicia associated with the electrical connector. The detectable feature can be subject to detection by mechanical, electrical, optical, magnetic, or other means. In one preferred embodiment, the detectable feature of the connector is a mechanical feature associated with the prongs which terminate in an electrical connector or "plug" associated with an electrical cord. Connector prongs of different length, or connector prongs having a particular configuration of detectable notches or cutouts, may be used to indicate different connector current ratings. The thickness, shape or other physical or mechanical feature of the prongs may alternatively be used to indicate different connector current ratings. The detectable feature or indicia may be an integral part of the electrical connector, or may be in the form of an adapter which is coupled to the connector. The detectable feature or indicia may be optically detectable, such as a bar code or like optically readable or detectable indicia.

The means for detecting connector current rating preferably comprises means for mechanically detecting the length or notch pattern in electrical connector prongs, and means for generating an electric signal output corresponding to the detected prong length or notch pattern. The mechanical detection means may comprise one or more movable members, associated with an electrical receptacle, socket or other connection, which are moved by the prongs of the electrical connector as the prongs are inserted into the receptacle. The distance moved by the movable members corresponds to the length or notch pattern of the connector prongs. The electric signal output generating means preferably comprises a variable resistor or resistors, associated with the movable members, which generate a resistance output responsive to the degree of movement of the movable members. The movable members may be pivotally or slidably associated with the electrical receptacle, or otherwise movably mounted in a manner which allows the movable members to undergo a range of motion which corresponds to the length of the electric connector prongs or a notch configuration associated with the electrical prongs.

Preferably, a spring biases the movable members towards a neutral or reset position such that, when the prongs of an electrical connector are withdrawn from the receptacle, the movable member moves back to the reset position. The electric signal output generating means may alternatively be based on capacitance, inductance or other electrical effect.

The means for sensing or detecting the load current to the electrical cord preferably comprises a transformer that generates a voltage signal which is proportional to the load current drawn through the electric cord. The transformer preferably comprises a simple one turn primary wherein a voltage output is generated in a secondary winding. The load current sensing means may alternatively comprise other standard means for generating an electronic signal which is responsive to load current.

The means for disconnecting power to the electrical cord when the load current exceeds the cord's detected current rating preferably comprises electronic means for monitoring the load current, means for comparing the load current to the cord current rating, and means for activating a power disconnect relay when the load current exceeds the cord current rating. The aforementioned means are preferably embodied in electronic circuitry or hardware which carries out the operations of periodically monitoring sensed load current, periodically comparing the sensed load current to the detected cord current rating, and activating the power disconnect relay when the load current exceeds the cord current rating. The means for carrying out these operations may alternatively be embodied in software which runs on a conventional microprocessor.

The means for resetting the power disconnecting means preferably comprises reset contacts associated with the movable member, and circuitry or software means for reconnecting or re-activating power when the movable member moves to a reset position. Alternatively, the reset means may be manually operated. A preferable means for preventing power disconnection due to "false" overload detection may comprise circuitry or software which prevents activation of the power disconnect relay unless the load current has exceeded the cord rating for a predetermined amount or length of time. Alternatively, the means for preventing power disconnection due to "false" overload detection may include electronic circuitry whereby the output voltage of the load current sensing transformer is processed through rms to DC conversion which produces a DC voltage proportional to the true rms energy of the output voltage of the load current sensing transformer. Transient current peaks, whether they be caused by arcing or normal appliance start-ups, contain only small amounts of true rms energy. Although the above describes two embodiments of methods for preventing "false" overload disconnects, it should not be construed as limiting the invention. Other means to prevent "false" tripping will be obvious to those skilled and practicing the described art. Hereinafter, in this document the term "false overload detection" is used to describe the various ways to prevent "false" or "nuisance" disconnects. The means for indicating the location of a current overload fault, an arc fault, or a ground fault preferably comprises indicator lights associated with a dual receptacle electrical outlet that indicate which receptacle has experienced the fault in question.

An object of the invention is to provide an electrical connection safety apparatus and method which prevents fires caused by the electrical overloading of extension cords Another object of the invention is to provide an electrical connection safety apparatus and method which prevents fires caused by current overload faults associated with electrical appliances.

Another object of the invention is to provide an electrical connection safety apparatus and method which prevents fires caused by overloading of electrical outlets.

Another object of the invention is to provide an electrical connection safety apparatus and method which senses or detects the current rating of an electrical cord or other connector as it is plugged into an electrical outlet and which disconnects power to the electrical cord and outlet when the load current through the cord exceeds the detected cord current rating.

Another object of the invention is to provide an electrical safety apparatus and method which allows the user, through front panel electrical means, preferably a variable resistor or a rotatable multi-position switch, to set the overload trip level of both the upper and lower outlets of a duplex receptacle. This object could include, or not include, the ability of the outlet to sense an encoded connector current rating.

Another object of the invention is to provide an electrical connection safety apparatus and method which automatically resets itself whenever the electrical cord is removed.

Another object of the invention is to provide an electrical connection safety apparatus which utilizes a manual power reset.

Another object of the invention is to provide an electrical connection safety apparatus and method which can be used with conventional electrical cords and electrical sockets.

Another object of the invention is to provide an electrical connection safety apparatus and method which is quick and easy to install and use.

Another object of the invention is to provide an electrical connection safety apparatus and method which prevents fires caused by the electrical overloading or overheating of electrical light fixtures.

Another object of the invention is to provide an electrical safety apparatus and method which prevents shock hazard to children who insert foreign objects into electrical outlets.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Figure 11:
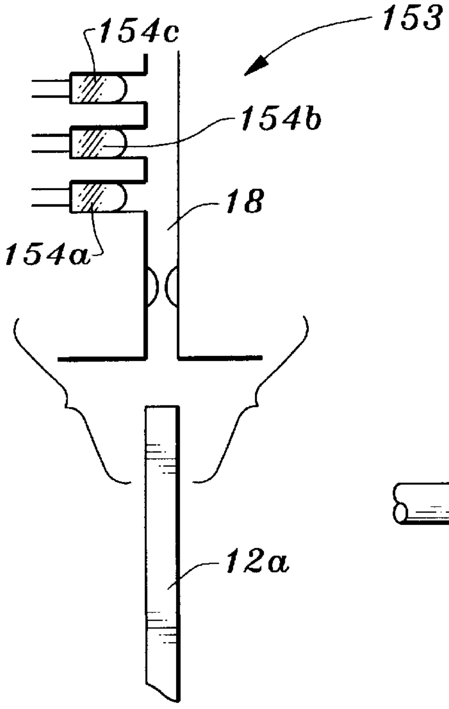
FIG. 11 is a functional diagram of a third embodiment electrical receptacle in accordance with the invention, showing an optical detector system for the cord connector prongs of FIG. 1.
Figure 12:
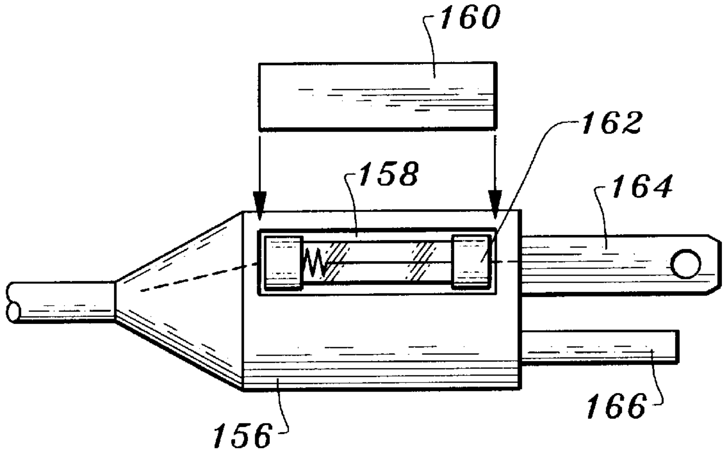
FIG. 12 is side elevation view in partial cross-section of an electrical cord connector with a replaceable fuse.
Figure 13:
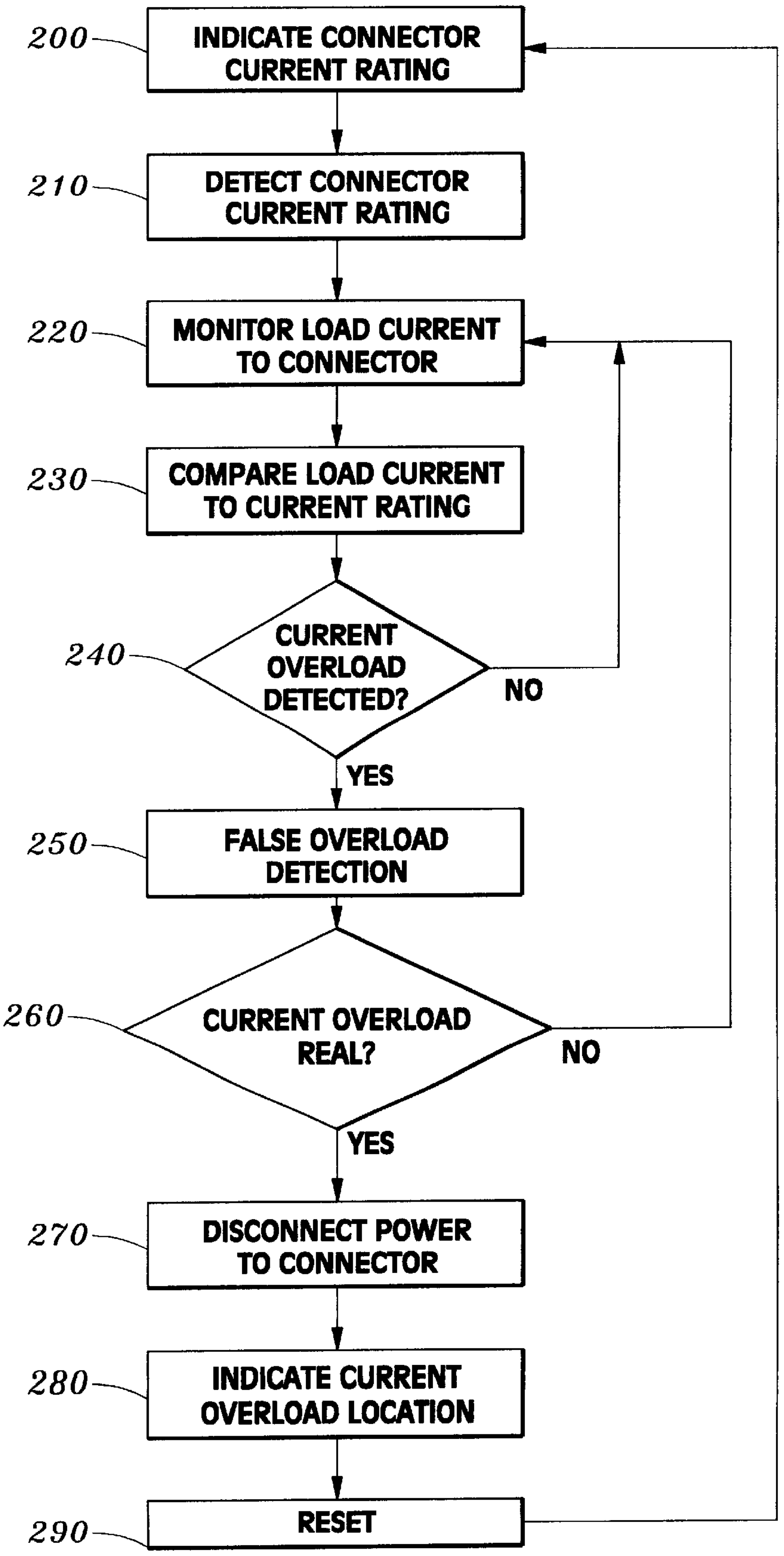
FIG. 13 is a flow chart illustrating the method of using the invention as embodied in the dual receptacle electrical outlet of FIG. 5 through FIG. 7.

Referring more specifically to the drawings, for illustrative purposes the present invention is embodied in the apparatus shown generally in FIG. 1 through FIG. 12, and the method shown in FIG. 13. It will be appreciated that the apparatus may vary as to configuration and as to details of the parts, and that the method may vary as to details and the order of the steps, without departing from the basic concepts as disclosed herein. The term "connector" as used herein means electrical connector devices generally, including any associated electrical cord or conductors. Thus, "connector" means electrical cords, extension cords, appliance cords, plugs, adaptors or any other type of connector or electrical connection device having connector prongs which can engage or plug into an electrical socket or receptacle.

Figure 1:
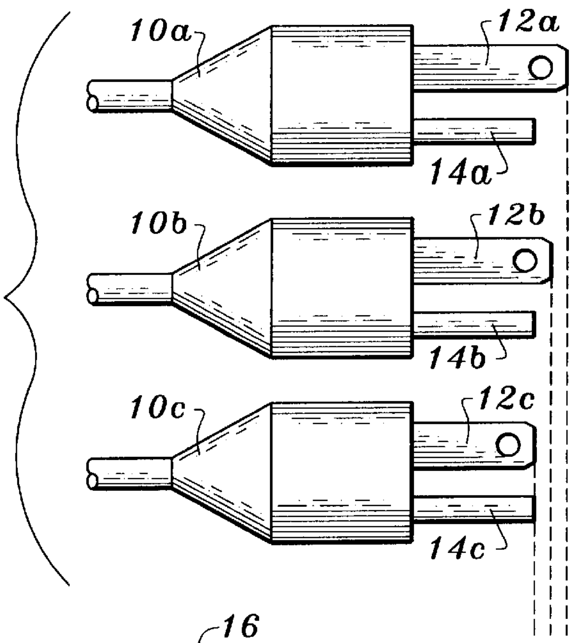
FIG. 1 is a side elevation view of electrical cord connectors in accordance with the present invention wherein the length of connector prongs are indicative of the electrical cord current rating.

Referring now to FIG. 1, the electrical connection safety apparatus of the invention comprises means for indicating the current rating of an electrical connector such as electrical cord connectors 10*a*, 10*b*, 10*c*. Connectors 10*a*, 10*b*, 10*c* are shown as typical electrical extension cord or appliance cord connectors of the type used in the United States. As noted above, extension cords, appliance cords and other connectors typically have maximum electrical current ratings which, when exceeded, create a risk of fire. The current rating indicating means of the invention preferably comprises a mechanically detectable feature associated with a connector 10*a*, 10*b*, 10*c*. Most preferably, the means for indicating the current rating of connectors 10*a*, 10*b*, 10*c* comprise connector prongs 12*a*, 12*b* 12*c* of varying length, with the longer prongs generally indicating higher current ratings. As shown, connector prong 12*a* is longer than connector prong 12*b*, which is longer than connector prong 12*c*. The longest connector prong 12*a*, for example, indicates a current rating for connector 10*a* of fifteen amps, while intermediate length connector prong 12*b* indicates a current rating of ten amps for connector 10*b*, and the shortest connector prong 12*c* indicates a current rating of five amps for connector 10*c*. Alternatively, shorter connector prongs could indicate higher current ratings.

Various other mechanical features associated with prongs 12*a*, 12*b*, 12*c* could be utilized to indicate current rating, such as prong thickness or shape, or the presence of grooves, serrations, tapers or other mechanically detectable indicia which could represent or encode the current rating of connectors 10*a*, 10*b*, 10*c*. Current rating may also be indicated by varying length or other mechanical feature associated with ground connector prongs 14*a*, 14*b*, 14*c* on connector 10*a*, 10*b*, 10*c*. Connectors 10*a*, 10*b*, 10*c* are shown in a typical configuration for use in the United States. Various other connector and prong arrangements, such as those used in Europe and elsewhere, may also be employed with the present invention. Optical means for indicating current rating may also be used with the invention, and are discussed further below.

Figure 2:
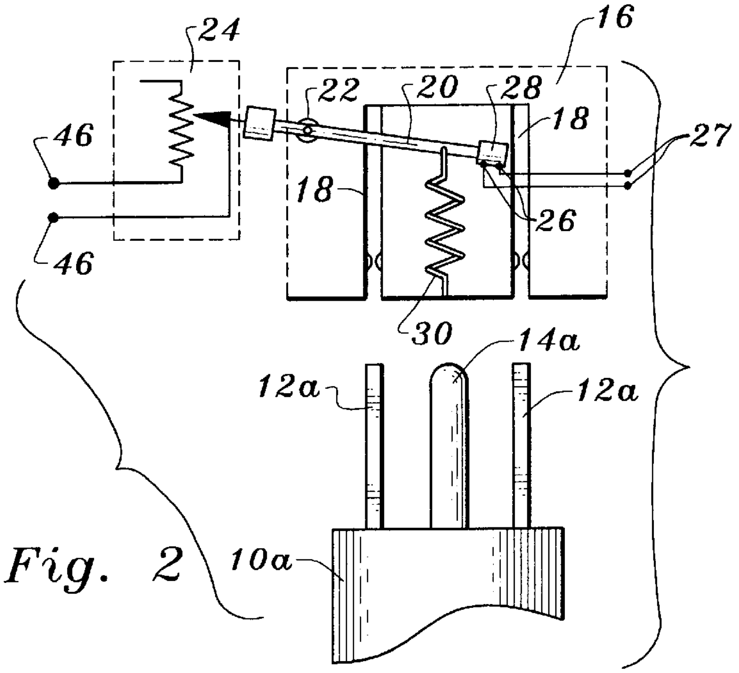
FIG. 2 is a functional diagram of first embodiment electrical receptacle in accordance with the present invention shown together with an electrical connector.

Referring now to FIG. 2, a first embodiment of an electrical outlet, socket or receptacle 16 in accordance with the invention is generally shown, together with electrical connector 10*a*. Receptacle 16 includes a pair of generally parallel slots or openings 18 which are structured and configured to slidably receive prongs 12*a* of connector 10*a* in a conventional manner. Receptacle 16 additionally includes a slot or opening (not shown) which receives ground prong 14*a* of connector 10*a*. When prongs 12*a*, 14*a* of connector 10*a* are fully inserted into slots 18 of socket 16, prongs 12*a*, 14*a* will connect with or contact the line, neutral and ground conductors (not shown) of an electric power circuit in a standard manner.

Means for sensing or detecting the current rating of electrical connector 10*a* are associated with receptacle 16, preferably in the form of a movable member or pivot arm 20 which is pivotally mounted in receptacle 16 by hinge or pivot point 22. Movable arm 20 is positioned such that, when connector prongs 12*a* are inserted into slots 18 of receptacle 16, one of the prongs 12*a* will push on or otherwise interact with movable arm 20 so that movable arm 20 pivots about hinge 22. The amount of movement of arm 20 varies with the length of connector prong 12*a*, so that different length connector prongs will result in correspondingly different degrees of pivotal motion of movable arm 20. Movable arm 20 thus provides means for detecting the length of connector prong 12*a*. As shown, only one connector prong 12*a* interacts with movable arm 20. Receptacle 16 and movable arm 20, however, could be structured and configured to allow both prongs 12*a* to interact with movable arm 20. Various other means for detecting connector current rating and length of connector prongs may also be used with the invention, and are discussed further below.

Means for generating an electric signal or output responsive or corresponding to the length of connector prong 12*a* are also included with receptacle 16, and preferably comprise a variable resistor 24 associated with the end of movable arm 20. The setting or position of variable resistor 24, and the signal output from variable resistor 24, varies with the position of movable arm 20 and the length of connector prongs 12*a* inserted into slots 18. Thus, when connector prongs 12*a* are inserted into slots 18 of receptacle 16, variable resistor 24 will generate a signal output corresponding to the length of connector prongs 12*a* and the magnitude of displacement of movable arm 20 by prongs 12*a*. Various other electric signal generating means may be used with the invention, including variable capacitance and inductance devices, which can generate a variable output according to movement of a movable member 20 and the length of connector prong 12*a*. The signal generating means could alternatively be optical in nature, such as a photoemitter-photodetector device.

The invention includes means for resetting the power disconnecting means, which preferably comprises a pair of reset contacts 26, a conductor 28 on movable arm 20, and a spring 30 which biases movable arm 20 towards a "reset" or neutral position. When connector prongs 12*a* are inserted into slots 18 of receptacle 16, connector prongs 12*a* overcome the bias of spring 30 to push movable arm 20 and move variable resistor 24 according to the length of prongs 12*a*. When connector prongs 12*a* are withdrawn from slots 18 and receptacle 16 by "unplugging" connector 10*a*, spring 30 acts on movable arm 20 to draw or move arm 20 back towards the neutral or reset position wherein the conductor element 28 on the end of movable arm 20 touches or shorts reset contacts 26. While in the reset position, variable resistor 24 generates a signal output indicating that no connector is associated with receptacle 16. Movable arm 20 is shown in the neutral or reset position in FIG. 2, with conductor 28 engaging reset contacts 26. When in an "activated" position wherein prong 12*a* is pushing on movable arm 20, conductor element 28 is physically separated or disengaged from reset contacts 26.

Figure 3:
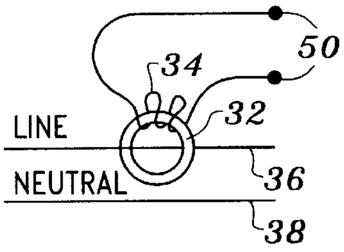
FIG. 3 is a ring transformer shown as used for detecting load current.

Referring to FIG. 3, as well as FIG. 2, means for detecting or sensing a load current delivered to an electrical connector are included with the invention, and preferably comprise a simple one turn primary transformer 32 with a secondary winding 34. An electrical fault will either be generally a "line-to-neutral" fault or a "line-to-ground" fault. Positioning transformer 32 on line conductor 36 insures that the total current, normal current plus fault current, will always be sensed. Line or "hot" conductor 36 and neutral conductors 38 communicate with a power supply (not shown) and with contacts (not shown) associated with slots 18 of receptacle 16, with line conductor 36 passing through the ring of primary transformer 32. Prongs 12*a* of connector 10*a* engage the contacts associated with slots 18 so that the load current delivered through conductors 36, 38 is received by prongs 12*a* and connector 10*a* in a conventional manner to provide electrical power to cords and/or appliances associated with connector 10*a*. A voltage signal V(load) is generated in the secondary winding 34 of transformer 32 by the load current passing through conductor 36, with V(load) being proportional to the load current delivered through conductor 36 to connector 10*a*. The use of a transformer 32 to produce an electric signal proportional to load current is only one possible current detecting means. Load current through conductors 36, 38 could alternatively be sensed or detected by heat, magnetic field or other effect associated with the passage of current through a conductor, with corresponding responsive signal outputs generated.

Figure 4:
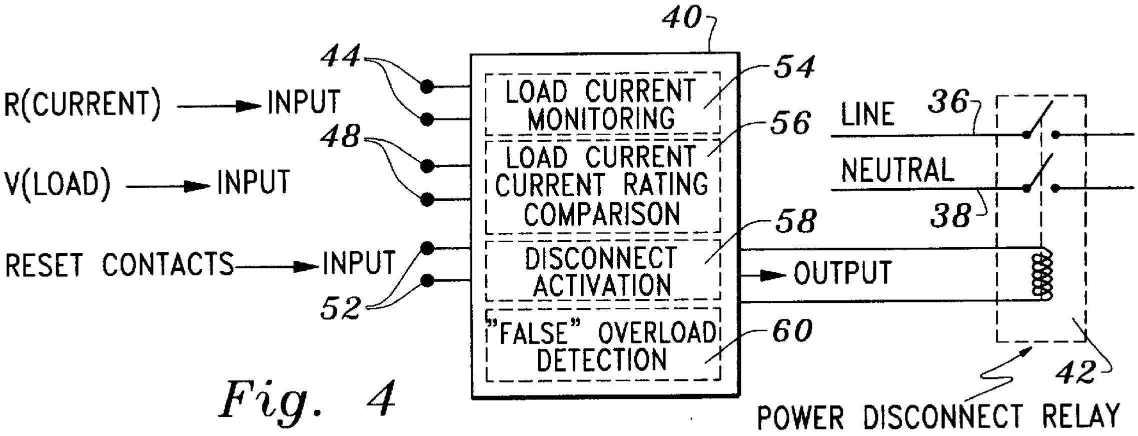
FIG. 4 is a functional block diagram of a power disconnect circuit for the receptacle of FIG. 2.

Referring now to FIG. 4, as well as FIG. 2 and FIG. 3, the invention includes means for disconnecting power to an electrical connector and receptacle when an overload fault occurs or when the load current exceeds the current rating of the electrical connector. The power disconnecting means preferably comprises a circuit board or like hardware device 40 together with a power disconnect relay 42. Circuit board 40 includes current rating input contacts 44 which are operatively coupled to output contacts 46 associated with variable resistor 24. Load current monitoring input contacts 48 are operatively coupled to output contacts 50 associated with winding 34 on primary transformer 32. Reset input contacts 52 are operatively coupled to reset output contacts 27, which communicate with the reset contacts 26 associated with movable arm 20. Power disconnect relay 42 interrupts or disconnects conductors 36, 38, and is positioned "upstream" from receptacle 16 so that disconnection of conductors 36, 38 will interrupt power to receptacle 16 and connector 10*a*. Ring transformer 32 and winding 34 may be located "upstream" or "downstream" from disconnect relay 42.

The power disconnecting means of the invention may alternatively comprise a TRIAC or other solid state electric disconnect switch which can interrupt power. The TRIAC or like solid state disconnect switch would operate with power disconnect activation circuitry in generally the same manner described above to interrupt power through lines 36, 38.

Circuit board 40 includes hardware or circuitry which provides means for monitoring the load current detecting means, shown generally as load current monitoring circuit 54. Load current monitoring circuit 54 carries out the operation of periodically monitoring, updating or verifying the voltage signal V(load) from transformer 32, to ascertain the load current which is being delivered to receptacle 16 and connector 10*a*.

Means for comparing detected or measured load current to the current rating of an electrical connector are also included in circuit board 40, and are shown generally as load current-current rating comparison circuit 56. Comparison circuit 56 carries out the operation of periodically comparing the load current detected by transformer 32 and secondary winding 34 to the current rating for connector 10*a* detected by movable arm 20 and variable resistor 24. Generally, the detected current rating of connector 10*a* is communicated to circuit board 40 via input contacts 44 as a resistance signal R(current) from variable resistor 24 which corresponds to the current rating of connector 10*a* according to the sensed length of connector prong 12*a*, as described above.

Disconnect activation circuitry 58 in circuit board 40 provide means for activating or opening power disconnect relay 42 to disconnect conductors 36, 38, and thus interrupt power to receptacle 16 and connector 10*a*, when the detected load current exceeds the current rating detected for connector 10*a*. The term "exceeds the current rating" means or refers to the occurrence of an overload fault generally, wherein measured load current exceeds a predetermined threshold which is equal to, proportional to, greater than or otherwise associated with the current rating detected for the connector 10*a* plugged into receptacle 16. Thus, the present invention can be utilized such that power disconnect relay 42 is tripped or disconnected upon detection of a load current less than (or greater than) the actual current rating. In the preferred embodiment, however, disconnect activation circuit 58 trips relay 42 generally at the point which the load current to connector 10*a* has measurably exceeded the current rating for connector 10*a*. Disconnect activation circuit 58 also carries out the operation of deactivating or reconnecting power circuit relay 42 when a reset signal is received from the power disconnect reset means via reset input contacts 52 due to conductor element 28 shorting reset contacts 26 when connector 10*a* is unplugged or disengaged from receptacle 16.

Preferably, circuit board 40 also includes means for avoiding or preventing power disconnection due to "false" current overloads. During standard operation of many appliances and electrical systems, there are often situations wherein a brief, temporary load current spike occurs, such as during a normal starting current surge situation for an electrical appliance. The temporary current spikes are not true current overloads which will result in a risk of fire, and thus it is desirable to avoid "nuisance" tripping or disconnecting of relay 42 when such false current overloads occur. Circuit board 40 includes a false overload detection circuit 60 as means for preventing disconnection due to false or temporary overloads. Detection circuit 60 may include an oscillating quartz crystal (not shown) or other conventional time keeping means, and detection circuit 60 carries out the operations of measuring the time or duration in which the load current exceeds the connector current rating and preventing disconnection of relay 42 if such duration is less than a predetermined amount. Typically, startup current spikes for appliances can last for up to two seconds, and detection circuit 60 thus, for example, avoids tripping of relay 42 unless the detected load current exceeds the connector current rating for a period of greater than two seconds.

The load current monitoring circuit 54, load current/current rating comparison circuit 56, disconnect activation circuit 58 and false overload detection circuit 60 on circuit board 40 as related above all carry out functions or operations using conventional circuitry and hardware configurations which are well known to those skilled in the art. The operations carried out by circuit board 40 can alternatively be embodied in software which runs on a conventional microprocessor. In that regard, circuit board 40 would be replaced by a microprocessor having software or programming which carries out the operations of monitoring the load current delivered to receptacle 16 and connector 10*a*, comparing the load current to the current rating detected for connector 10*a*, disconnecting or interrupting power to receptacle 16 and connector 10*a* in the event that the load current exceeded the current rating of connector 10*a*, and preventing power interruption in cases where temporary or false overloads are detected.

In operation, electrical receptacle 16 and circuit board 40 are preferably embodied in a single electrical outlet device such as an electrical wall outlet. A user of the invention inserts a connector 10*a* into receptacle 16 in a standard manner, so that connector prongs 12*a* engaged slots 18. Prong 12*a* pushes on and pivots movable arm 20 by an amount which is proportional to the length of prongs 12*a*. The length of prongs 12*a* indicate the current rating of connector 10*a*, as noted above. Movable arm 20 moves variable resistor 24 such that variable resistor 24 creates a resistance signal output R(current) responsive to the length of prong 12*a* and the current rating of connector 10*a*. The resistance signal from variable resistor 24 is communicated to circuit board 40. The load current passing through receptacle 16 and connector 10*a* is detected or sensed by primary transformer 32 and secondary winding 34, and a voltage signal V(load) is communicated therefrom to circuit board 40. Load current monitoring circuit 54 periodically monitors the voltage signals representing the sensed load current, and comparison circuit 56 periodically compares the load current voltage signals to the resistance signal representing the detected current rating of connector 10*a*. When comparison circuit 56 recognizes or notes that the load current indicated by the voltage signals exceeds the connector current rating indicated by the resistance signals, a current overload to connector 10*a* is recognized by comparison circuit 56. Detection circuit 60 then measures the duration of the current overload period in which the load current exceeds the connector current rating. If the duration of the current overload exceeds a certain threshold which indicates that the current overload is not a "false" overload such as temporary current spike, disconnect activation circuit 58 then activates power disconnect relay 42 to interrupt or disconnect power to receptacle 16 and connector 10*a*.

Following power disconnection, the user can then correct the cause of the overload fault, and disengage connector 10*a* from receptacle 16 to reset receptacle 16. When connector 10*a* is disengaged from receptacle 16, movable arm 20 moves back to the "reset" position shown in FIG. 2, wherein reset contacts 26 are shorted by conductor element 28, sending a reset signal from contacts 26 to circuit board 40 via input 52 indicating that no connector is engaged or plugged into receptacle. Disconnect activation circuit 58 then closes power disconnect relay 42 upon receiving the reset signal to apply power to receptacle 16 and connector 10*a* again. Additionally, while movable arm 20 is in the reset position, variable resistor 24 will provide a "reset" resistance signal output to circuit board to indicate a reset condition. When connector 10*a* or another connector is then inserted or plugged into receptacle 16, movable arm 20 will move according to the connector prong length as described above to again indicate a connector current rating, and aforementioned sequence of events is generally repeated.

Figure 6:
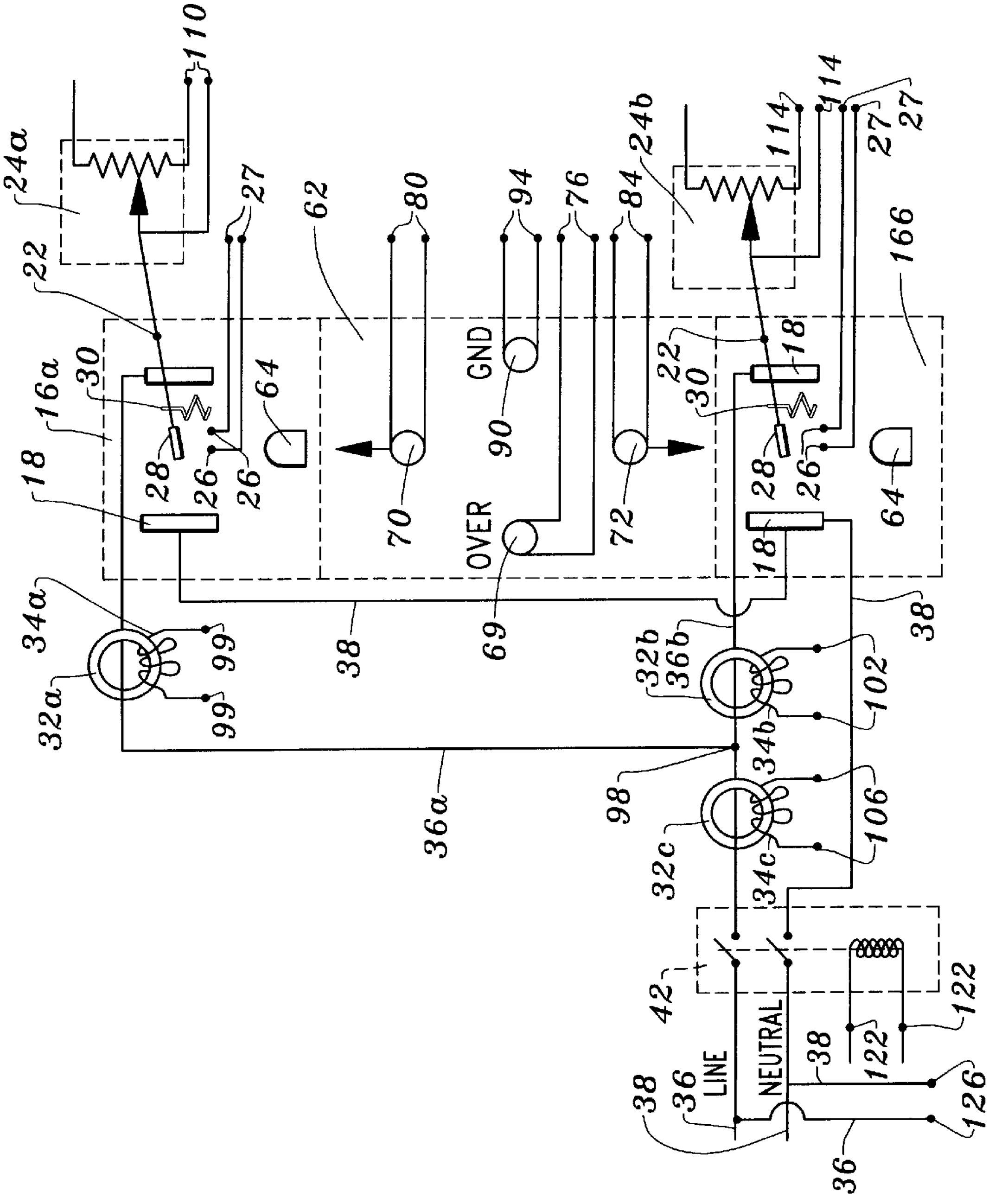
FIG. 6 is a functional diagram of the dual receptacle electrical outlet of FIG. 5.
Figure 5:
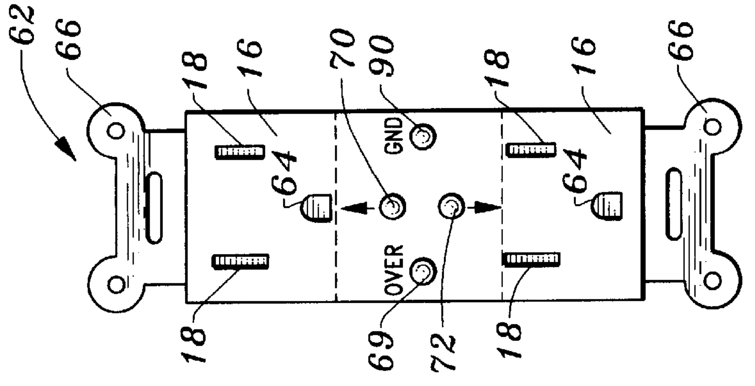
FIG. 5 is a front elevation view of a first embodiment of a dual receptacle electrical outlet in accordance with the present invention, shown with overload and ground fault indicator lights.
Figure 7:
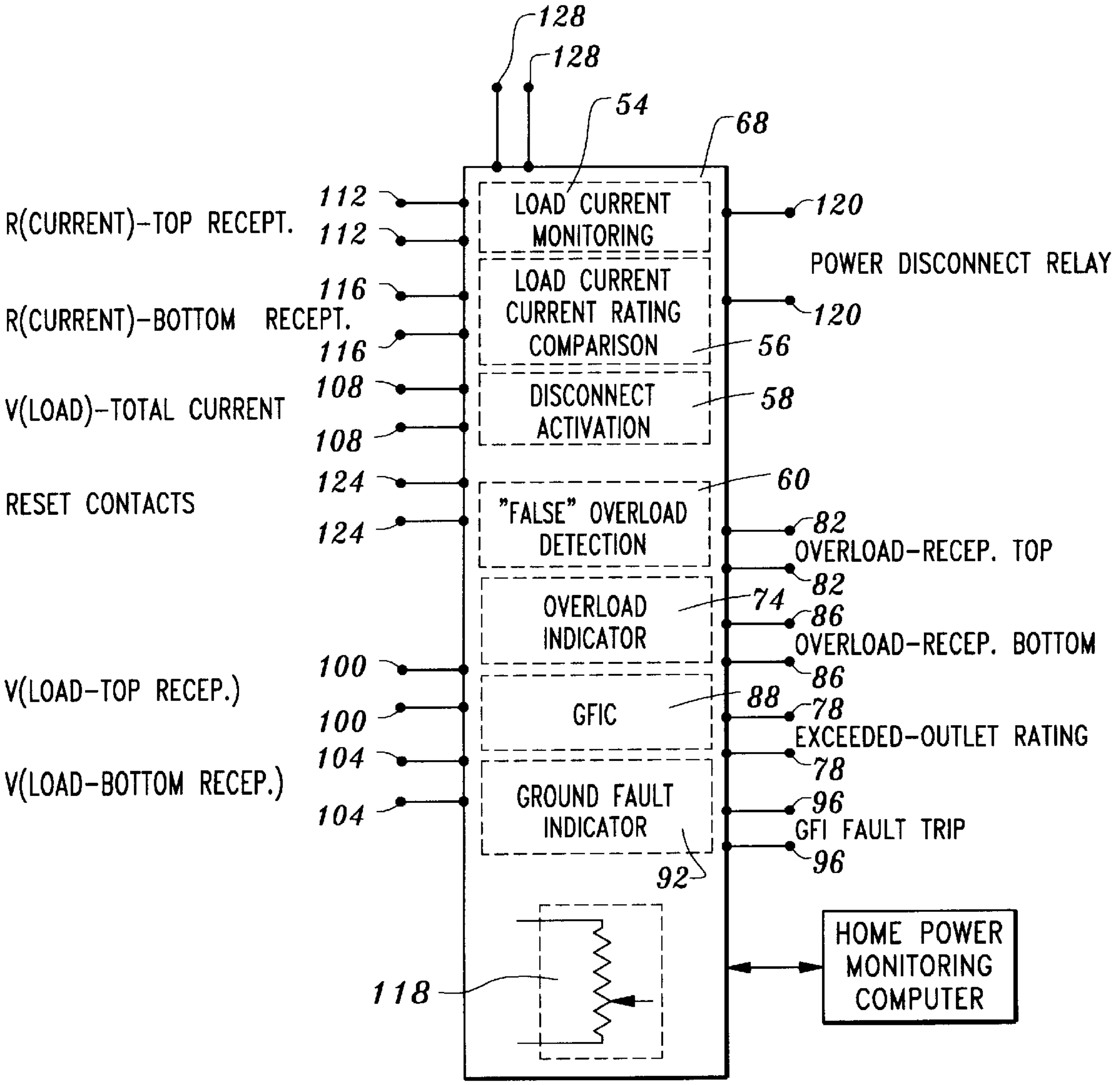
FIG. 7 is a functional block diagram of a power disconnect circuit for the dual receptacle electrical outlet of FIG. 5 and FIG. 6.

Referring now to FIG. 5 through FIG. 7, the electrical connection safety apparatus comprising the invention is shown in a first embodiment of a dual receptacle electrical outlet 62. Electrical outlet 62 includes a pair of electrical receptacles shown as top receptacle 16*a* and bottom receptacle 16*b*, which are generally identical to receptacle 16 described above and shown in FIG. 2, with like reference numbers denoting like parts. Thus, receptacles 16*a*, 16*b* of outlet 62 each include a pair of slots 18 for receiving connector prongs (not shown), and a movable arm 20 which pivots about hinge 22. Variable resistors 24*a*, 24*b*, associated with receptacles 16*a*, 16*b*, are positioned such that movable arms 20 will move variable resistors 24*a*, 24*b* according to connector prong length as described above. Movable arms 20 are shown in FIG. 6 in an "activated" position which results or occurs when connector prongs (not shown) are inserted into slots 18 and push on movable arms 20 so that the bias of spring 30 is overcome and conductor element 28 disengages reset contacts 26. Thus, receptacles 16*a*, 16*b* each include means for detecting connector current rating and reset means as described above. Receptacles 16*a*, 16*b* each include a slot 64 which is structured and configured to receive a connector ground prong (not shown) in a conventional manner. Electrical outlet 62 includes standard installation brackets 66 which allow outlet 62 to be attached to or supported on a stud or other support element within a wall by screws (not shown).

An electronic circuit board 68 (FIG. 7) is associated with outlet 62, and is preferably internally located within outlet 62. Circuit board 68 includes means for disconnecting power upon detection of a current overload which are provided by load current monitoring circuit 54, load current-current rating comparison circuit 56 and disconnect activation circuit 58. Means for preventing disconnection due to false overloads is provided by false overload detection circuit 60. Load current monitoring circuit 54, load current-current rating comparison circuit 56, disconnect activation circuit 58 and detection circuit 60 operate a generally similar manner to that described above for circuit board 40.

Since electrical outlet 62 includes two receptacles 16*a*, 16*b*, outlet 62 preferably includes means for indicating the location of an overload fault to apprise users of which receptacle 16*a*, 16*b* has experienced an overload fault. The overload fault indicating means preferably comprises an overload fault indicator light 69, a top receptacle indicator light 70, a bottom receptacle indicator light 72, and an overload indicator circuit 74 on circuit board 68. Indicator lights 69, 70, 72 are preferably light emitting diodes (LED) or low watt light bulbs. Overload indicator light 69 has contacts 76 which are operatively coupled to output contacts 78 on circuit board 68. Top receptacle indicator light 70 has contacts 80 which are operatively coupled to top receptacle overload output contacts 82 on circuit board 68, and bottom receptacle indicator light 72 has contacts 84 which are operatively coupled to bottom receptacle overload output contacts 86 on circuit board 68. When a current overload fault occurs in top receptacle 16*a*, overload fault indicator light 69 is activated together with top receptacle indicator light 70. When a current overload fault occurs in bottom receptacle 16*b*, overload fault indicator light 69 is activated together with bottom receptacle indicator light 72. When an overload fault occurs for outlet 62 generally as described below, overload fault indicator light 69 is activated together with both directional indicator lights 70, 72. In this manner, the location of an overload fault is indicated or identified for users of the invention.

Electrical outlet 62 includes means for disconnecting power to receptacles 16*a*, 16*b* and connectors associated therewith upon detection of a ground fault associated with either receptacle 16*a*, 16*b*. The ground fault power disconnecting means preferably comprises a conventional ground fault interrupter circuit or GFIC 88, together with power disconnect relay 42. The invention also preferably includes means for indicating the location of a ground fault, which are provided by ground fault indicator light 90 and ground fault indicator circuit 92. Ground fault indicator light 90 is preferably a LED or low watt light bulb, and has contacts 94 which are operatively coupled to GFI fault trip output contacts 96 on circuit board 68. When a ground fault occurs in top receptacle 16*a*, ground fault indicator light 90 is activated together with top receptacle indicator light 70. When a ground fault occurs in bottom receptacle 16*b*, ground fault indicator light 90 is activated together with bottom receptacle indicator light 72. In this manner, the location of a ground fault is indicated or identified for users of the invention.

Means for monitoring load current to electrical outlet 62 is preferably structured, configured and positioned to monitor load current to receptacles 16*a*, 16*b* individually as well as together. As shown in FIG. 6, three primary transformers 32*a*, 32*b*, 32*c*, together with accompanying secondary windings 34*a*, 34*b*, 34*c* are associated with line conductor 36. Line conductor 36 is split at junction point 98 so that line conductor 36 can provide power to both receptacles 16*a*, 16*b* via line conductors 36*a*, 36*b* respectively. Primary transformer 32*a* and secondary winding 34*a* are positioned on line conductor 36*a* below or "downstream" from junction point 98 so that secondary winding 34*a* produces a voltage signal V(load) representative of the load current delivered to receptacle 16*a*. Primary transformer 32*b* and secondary winding 34*b* are positioned on line conductor 36*b* below or "downstream" from junction point 98 so that secondary winding 34*b* produces a voltage signal V(load) representative of the load current delivered to receptacle 16*b*. Primary transformer 32*c* and secondary winding 34*c* are positioned on line conductor 36 above or "upstream" from junction point 98 so that secondary winding 34*c* produces a voltage signal V(load) representative of the total load current delivered to electrical outlet 62 via both receptacles 16*a*, 16*b*. Output contacts 99 from secondary winding 34*a* are operatively coupled to input contacts 100 on circuit board 68. Output contacts 102 from secondary winding 34*b* are operatively coupled to input contacts 104 on circuit board 68. Output contacts 106 from secondary winding 34*c* are operatively coupled to input contacts 108 on circuit board. The total load current to outlet 62 could alternatively be monitored according to the combined signal output of transformers 32*a*, 32*b* and secondary windings 34*a*,34*b*, with transformer 32*c* and secondary winding 34*c* being omitted.

The current rating detecting means of electrical outlet 62 is structured, configured and positioned to detect the individual current ratings for receptacles 16*a*, 16*b* and connectors associated therewith. Output contacts 110 associated with variable resistor 24*a* are operatively coupled to input contacts 112 on circuit board 68 to communicate resistance signals indicative of the current rating of connectors associated with receptacle 16*a*. Output contacts 114 associated with variable resistor 24*b* are operatively coupled to input contacts 116 on circuit board 68 to allow communication of resistance signals indicating the current rating of connectors associated with receptacle 16*b*.

Electrical outlet 62 includes means for providing a preset outlet current rating, and means for disconnecting electrical power to outlet 62 when the overall current load to outlet 62 exceeds the preset outlet current rating. A variable resistor 118 associated with circuit board 68 is preset, preferably by the manufacturer, to indicate a resistance value indicative of a maximum current rating for electrical outlet 62. Variable resistor 118 provides a resistance signal R(current) to comparison circuit 56 which indicates the preset current rating for outlet 62. Comparison circuit 56 compares the total load current to outlet 62 detected by transformer 32*c* to the preset outlet current rating provided by variable resistor 118, and when an overload situation occurs in which the total load current to outlet 62 exceeds the preset outlet current rating, power disconnect relay 42 is disconnected, as related below. The preset outlet current rating could alternatively be hard-wired or integral to comparison circuit 56 rather than set or determined by variable resistor 118.

Power disconnect relay 42 is positioned so that line and neutral conductors 36, 38 are interrupted such that power is cut to the entire electrical outlet 62, including both receptacles 16*a*, 16*b*, in the event of detection of an overload fault or a ground fault. Output contacts 120 on circuit board 68 are operatively coupled to contacts 122 on power disconnect relay 42 to communicate an activation signal to power disconnect relay 42. Alternatively, dual power disconnect relays could be used with outlet 62, with one power disconnect relay positioned to interrupt line conductor 36*a* to receptacle 16*a*, and with one power disconnect relay positioned to interrupt line conductor 36*b* to receptacle 16*b*. However, use of a single power disconnect relay 42 positioned as shown is generally simpler and less expensive, and thus is preferred. Power disconnect relay 42 is activated as described below to disconnect power to outlet 62 upon detection of an overload fault in either top receptacle 16*a* or bottom receptacle 16*b*, as well upon detection of an overload fault with respect to the total detected current rating for outlet 62. Reset contacts 26 of both receptacles 16*a*, 16*b* are operatively coupled to circuit board 68 via output contacts 27 and reset input contacts 124 on circuit board 68, and power disconnect relay 42 is reset or reactivated according to a reset signal received by power disconnect activation circuit 58 from reset contacts 26. Power supply contacts 126 are operatively coupled to input contacts 128 on circuit board 68 to provide power to circuit board 68.

In the operation of electrical outlet 62, a user of the invention inserts a connector 10*a*, 10*b* or 10*c* (FIG. 1) into receptacle 16*a* and/or 16*b* as described above, so that connector prongs 12*a*, 12*b* or 12*c* engaged slots 18. The prongs pivot movable arm 20 by an amount which is proportional to prong length. Movable arm 20 moves variable resistor 24 to create a resistance signal output which is communicated to circuit board 68 as a voltage signal. The load current passing through receptacles 16*a* and 16*b* are respectively sensed by primary transformers 32*a*, 32*b* and secondary windings 34*a*, 34*b*, and corresponding voltage signals therefrom are communicated therefrom to circuit board 68. Additionally, the total load current passing through outlet 62 is sensed by primary transformer 32*c* and secondary winding 34*c* and communicated to circuit board 68 as a voltage signal.

Load current monitoring circuit 54 periodically monitors the voltage signals representing the sensed load currents to receptacles 16*a*, 16*b* and outlet 62. Comparison circuit 56 periodically compares the load currents through receptacles 16*a*, 16*b* to the detected current ratings for connectors which are plugged into receptacles 16*a*, 16*b*. Comparison circuit 56 also compares the total load current through outlet 62 and both receptacles 16*a*, 16*b* to the preset outlet current rating provided by variable resistor 118. Comparison circuit 56 recognizes or notes current overload situations (wherein measured load current exceeds detected current rating) which occur with respect to receptacles 16*a*, 16*b* individually, as well as for outlet 62 overall. When any such current overload event is recognized by comparison circuit 56, detection circuit 60 then measures the duration of the current overload period. If the duration of the current overload exceeds a certain threshold which indicates that the current overload is not a "false" overload such as a temporary current spike, disconnect activation circuit 58 then activates power disconnect relay 42 to interrupt or disconnect power to outlet 62.

Thus, power disconnection will occur in the event of a current overload associated with either receptacle 16*a*, 16*b* individually, or a current overload for electrical outlet 62 overall. If the current overload is associated with an individual receptacle 16*a* or 16*b*, overload indicator circuit 74 activates overload indicator light 69 together with top receptacle indicator light 70 or bottom receptacle indicator light 72. If an overall current overload has occurred to outlet 62, overload indicator circuit 74 activates overload indicator light 69 together with top receptacle indicator light 70 and bottom receptacle indicator light 72. GFIC circuit 88 detects ground faults in a conventional manner and activates power disconnect relay 42 in the event of a ground fault associated with receptacle 16*a* or 16*b*. Ground fault indicator circuit 92 then activates ground fault indicator light 90 together with top receptacle indicator light 70 or bottom receptacle indicator light 72, according to the location of the ground fault.

Following power disconnection of outlet 62 by power disconnect relay 42, the user of the invention notes the location of the overload fault according to top and bottom receptacle indicator lights 70, 72, corrects the cause of the overload faults and disengages connectors from receptacles 16*a* and/or 16*b* to reset outlet 62 and receptacles 16*a*, 16*b*. When connectors are disengaged from receptacles 16*a*, 16*b*, reset signals are sent to circuit board 68 from reset contacts 26. Upon receiving the reset signal, disconnect activation circuit 58 then closes or reset power disconnect relay 42 to again apply or provide power to outlet 62. Where an overload fault for outlet 62 has occurred (total load current has exceeded preset outlet current rating), resetting is carried out by unplugging or disengaging connectors from both receptacles 16*a*, 16*b*. The reset means of the invention also preferably applies to ground fault interruptions, such that disengaging connectors from receptacles 16*a*, 16*b* will reset GFIC 88 and disconnect activation circuit 58 to provide power to outlet 62. Once resetting occurs, the user can then re-engage connectors in receptacles 16*a*, 16*b*, and the above events are generally repeated.

The reset means of the invention may alternatively or additionally comprise a manually activated reset button or switch located on the front of outlet 62. The reset button or switch would preferably be located in generally the center of outlet 62 between indicator lights 70, 72, and between indicator lights 69, 90. Activation of the reset button would send a reset signal to disconnect activation circuit 58 to reset power disconnect relay 42 and restore power to receptacles 16*a*, 16*b*. As noted above, the power disconnect means of the invention may alternatively comprise a TRIAC or solid state switch.

Various other arrangements and configurations for electrical outlet 62 and receptacles 16*a*, 16*b* are possible and will suggest themselves to those of ordinary skill in the art. For example, the invention may be embodied in an electrical outlet having four receptacles, and current rating detection and load current monitoring in association with each of the four receptacles may be carried out. The invention also may be embodied in a single receptacle device having generally the combined features shown in FIG. 2, FIG. 3 and FIG. 4. These and other arrangements of electrical receptacles are considered to be within the scope of the invention.

Circuit board 68 may be interfaced with a home power monitoring computer or "smart house" computer 129, shown in FIG. 7, so that output from load current monitoring 54, load current rating comparison 56, disconnect activation 58, false overload detection 60, and GFIC 88 circuits is communicated to home power monitoring computer 129. Home power monitoring computer 129 would then communicate overload and ground fault indication signals to a central control panel (not shown), or otherwise generate an alarm or signal for users which indicates that a current overload or ground fault had occurred, and which indicates the location of the particular appliance or receptacle associated with the overload or ground fault.

The operations carried out by circuit board 68 can also be embodied in software that runs on a conventional processor having programming which carries out the operations of monitoring load, comparing load current to detected connector current rating, detecting "false" overloads, disconnecting power when load current exceeds the detected connector current rating of connector 10*a*, indicating the location of overload faults and ground faults, interrupting power upon detection of ground faults, and indicating the location of ground faults. For example, the operations of circuit board 68 may be associated with a "smart house" processor within home power monitoring system computer 129, wherein input from the current monitoring means and current rating detection means of the invention are communicated to the smart house processor, which monitors load currents to various appliances and receptacles throughout the house, carries out current rating comparisons and overload detections, and which interrupts current flow to the various appliances and receptacles upon detection of overloads as described above. In this regard, reference number 68 would designate the processor of the home power monitoring computer 129, and load current monitoring 54, load current rating comparison 56, disconnect activation 58, false overload detection 60, and GFIC 88 would all comprise programming, running on processor 68, which carried out the generally the same operations described above as when embodied in circuitry. Further, overload indicator 74 and ground fault indicator 92 could be indicator lights associated with a central control panel (not shown) interfaced with processor 68, which would alert users of the home power monitoring system computer of current overload and ground faults.

Figure 8:
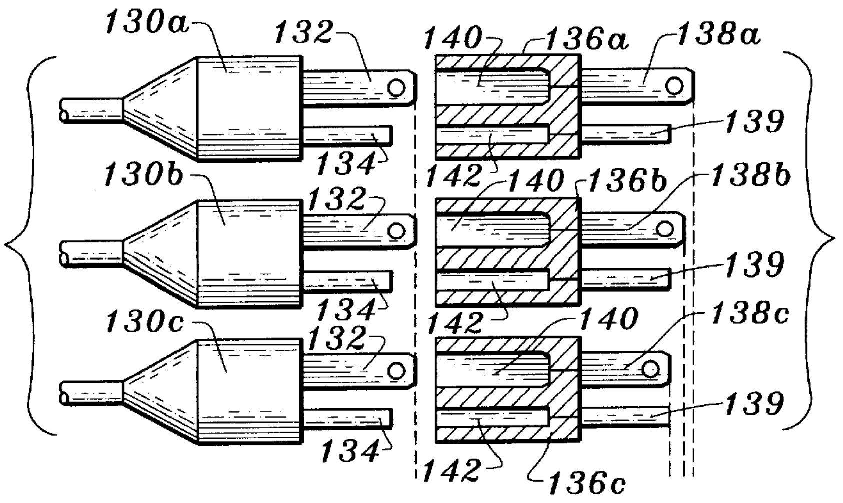
FIG. 8 is a side elevation view of electrical cord connector adaptors in accordance with the present invention for use with conventional electrical cord connectors.

The electrical connector safety apparatus of the invention as embodied in electrical outlet 62 and electrical connectors 10*a*, 10*b*, 10*c* can be employed with currently used electrical connectors and electrical outlets. As noted above, presently available electrical connectors have connector prongs which are not structured and configured to indicate the current rating of the connectors. Referring to FIG. 8, there are shown three conventional electrical connectors 130*a*, 130*b*, 130*c*, each of which has a different current rating. Conventional connectors 130*a*, 130*b*, 130*c* each have connector prongs 132 of identical length and ground prongs 134 of identical length, and thus include no current rating indicating means which can be used with the present invention except as described below in the "notch" current rating embodiment.

FIG. 8 shows connector adaptors 136*a*, 136*b*, 136*c* which, in accordance with the present invention, include means for indicating current rating in the form of different connector prong lengths. Connector adaptors 136*a*, 136*b*, 136*c* respectively have long connector prongs 138*a*, intermediate length prongs 138*b* and short prongs 138*c*, to indicate different current ratings as described above. Connector adaptors 136*a*, 136*b*, 136*c* also include ground prongs 139 of generally the same length. Connector adaptors 136*a*, 136*b*, 136*c* each include connector prong slots 140 and ground prong slots 142 which are respectively structured and configured to slidably receive connector prongs 132 and ground prongs 134 of the conventional connectors 130*a*, 130*b*, 130*c*. Thus, by engaging the connector prongs 132 and ground prongs 134 of conventional connectors 130*a*, 130*b*, 130*c* into the slots 140, 142 of connector adaptors 136*a*, 136*b*, 136*c*, conventional connectors 130*a*, 130*b*, 130*c* can be adapted or modified to include current rating indicating means. The differing length connector prongs 138*a*, 138*b*, 138*c* of connector adaptors 130*a*, 130*b*, 130*c* engage the slots 18 of receptacles 16*a*, 16*b* of outlet 62 as described above.

Figure 9:
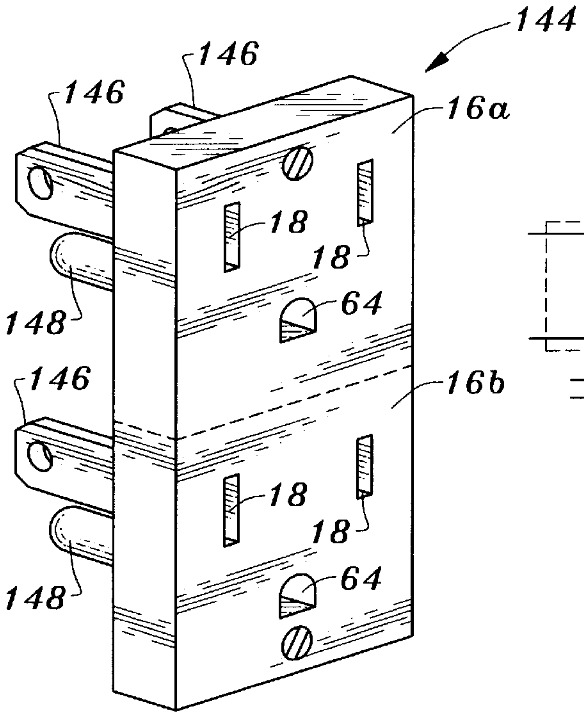
FIG. 9 is a perspective view of an electrical outlet adaptor in accordance with the present invention for use with conventional electrical outlets.

Referring also to FIG. 9, the invention may be embodied in an electrical outlet adaptor 144 which is structured and configured to engage or plug into a conventional dual receptacle outlet (not shown) of the type currently in use. Outlet adaptor 144 includes dual receptacles 16*a*, 16*b* which are generally identical to receptacles 16*a*, 16*b* as described above for outlet 62. Outlet adaptor 144 also includes a circuit board (not shown) having load current monitoring circuitry, current comparison circuitry, disconnect activation circuitry timing circuitry as described above. Connector prongs 146 and ground prongs 148 of outlet adaptor 144 provide means for engaging or plugging into a conventional electrical power outlet, and are structured and configured to engage or plug into a conventional power outlet and are operatively coupled respectively to connector slots 18 and ground slots 64 of receptacles 16*a*, 16*b*. Outlet adaptor 144 thus includes all of the features described above for electrical outlet 62 with the exception of the overload location indicating means and ground fault disconnection and indicating means. However, these features may be included with outlet adaptor 144 as well if desired.

By plugging connector prongs and ground prongs 146, 148 of outlet adaptor 144 into a conventional electrical outlet, the conventional outlet is modified to provide current rating detection, load current monitoring, and power disconnecting means for overload faults described above. In this manner, the invention can be employed without requiring removal and replacement of existing conventional electrical outlets. When outlet adaptor 144 is used in conjunction with connector adaptors 136*a*, 136*b*, 136*c*, the invention may be employed directly with existing, currently used electrical connectors and electrical outlets with requiring replacement of the existing connectors or outlets. Thus, a residence or other structure can be retrofitted to utilize the invention without requiring replacement of existing outlets, receptacles or connectors.

Figure 10:
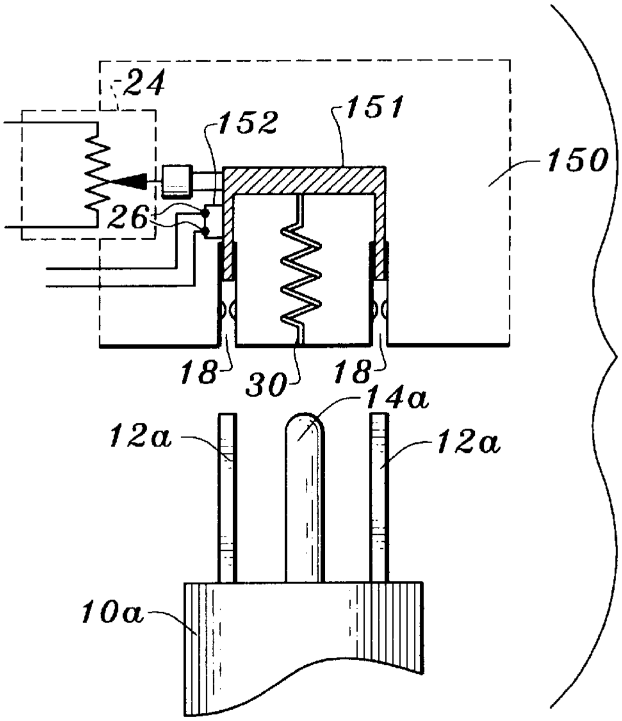
FIG. 10 is a functional diagram of a second embodiment electrical socket in accordance with the present invention which mechanically detects electrical cord current ratings according to the length of the cord connector prongs of FIG. 1.

Referring now to FIG. 10 a second embodiment electrical receptacle 150 is shown with a connector 10*a*, wherein like reference numerals denote like parts. In receptacle 150, the means for detecting length of connector prongs 12*a* is provided by a slidable bracket 151 which is positioned in association with slots 18. Slidable bracket 151 is operatively coupled to variable resistor 24 so that variable resistor 24 moves according to the motion of slidable bracket 151. Slidable bracket 151 is biased by spring 30 towards a reset position wherein reset contacts 26 are adjacent to a conductor 152 which is coupled to bracket 151 as shown. When connector prongs 12*a* are inserted into slots 18, slidable bracket 151 is physically moved by a distance proportional to the length of connector prongs 12*a*, with variable resistor generating a resistance output signal which reflects the length of connector prongs 12*a* as described above. Reset contacts 26 are disengaged from conductor 152 on slidable bracket 151 when connector prongs 12*a* are inserted into slots 18, and conductor 152 shorts reset contacts 26 to generate a reset signal when connector prongs 12*a* are withdrawn from slots 18. The electrical receptacle 150 operates in generally the same manner as described above for receptacles 16, 16*a*, and 16*b*, with the primary exception being that slidable bracket 151 is used to detect connector prong length instead of pivoting arm 20. The slidable bracket 151 generally requires a greater range of motion than movable arm 20, and thus results in receptacle 151 requiring more thickness or "depth" than receptacle 16 in order to accommodate sliding bracket 151. For this reason, receptacle 150 is less preferred than receptacle 16 for use with outlet adaptor 144, as use of receptacle 150 would require outlet adaptor 144 to have a greater size. Various other mechanical means for detecting connector prong length or other connector features indicative of current rating may also be used with the invention, and the use of pivoting and sliding members or brackets should not be considered as limiting.

Referring now to FIG. 11, the means for detecting the length of a connector prong may be optical, rather than mechanical. A third embodiment electrical receptacle electrical optical detector system 153 for the cord connector prongs is shown in FIG. 11 which includes a plurality of photoemitter/photodetector devices 154*a*, 154*b*, 154*c* are positioned adjacent slot 18. Photoemitter/photodetectors 154*a*, 154*b*, 154*c* include an LED which emits light and a detector which senses reflected light. When connector prong 12*a* engages slot 18, connector prong is positioned adjacent one or more of photoemitter/photodetectors 154*a*, 154*b*, 154*c*, depending upon the length of connector prong 12*a*. When connector prong 12*a* is positioned adjacent to photoemitter/photodetector 154*a*, 154*b*, or 154*c*, the amount of LED light reflected to the photodetector is changed by the presence of connector prong 12*a*, and a signal responsive to the presence of the connector prong 12*a* is generated by photoemitter/photodetectors. Varying lengths of connector prong 12*a* will correspondingly effect the number of photoemitter/photodetectors 154*a*, 154*b*, 154*c* which observe increased reflectivity. Thus, longer connector prongs 12*a* will result in higher detected reflectivity, and corresponding signal output, for each of photoemitter/photodetectors 154*a*, 154*b*, 154*c*, while shorter connector prongs 12*a* will only result in higher detected reflectivity for photoemitter/photodetectors 154*a*, and/or 154*b*, depending upon prong length. In this manner, the current rating of a connector may be determined optically according to connector prong length. Various other optical means for detecting connector current rating are possible, including the optical reading of bar codes or other indicia associated with connector prongs.

The invention may include a second, backup means for disconnecting power to a connector when the load current to a connector exceeds the connector current rating and an overload fault occurs. Referring to FIG. 12, there is shown an electrical connector 156 having a side opening or chamber 158 with a removable cover 160. A replaceable "slow-blow" fuse 162 fits within the chamber 158 and is operatively coupled to connector prong 164 and the internal conductor (not shown) associated with connector prong 164. Fuse 162 is structured and configured to "blow" or undergo filament disruption when the load current through connector 156 exceeds the current rating of connector 156 and an overload fault occurs. Connector prong 164 additionally has a length which indicates the current rating of connector 156 in the manner described above. Connector 156 is shown with a ground prong 166 as is standard in the art.

When connector 156 is utilized with receptacle 16*a* or 16*b* of electrical outlet 62 described above, the current rating detection, load current monitoring and power disconnect means associated with electrical outlet 62 provide a first power disconnecting means for preventing current overloads to connector 156, while fuse 162 provides a second or backup power disconnecting means for preventing overloads to connector 156. When an overload fault occurs and power is thus disconnected, fuse 164 is removed from chamber 158 and replaced, and connector 156 is unplugged from receptacle 16*a* or 16*b* of outlet to "reset" as described above.

Connector 156 may alternatively be used independently of outlet 62, with replaceable fuse 162 providing the sole or primary means for disconnecting power to a connector in the event of a current overload. Connector 156 may additionally be structured and configured as a connector adaptor similar to connector adaptors 136*a*, 136*b*, 136*b*, with fuse 162 removably positioned in the connector adaptor.

The operation of the electrical connection safety apparatus of the invention, as embodied in the dual receptacle outlet 62, will be more fully understood by reference to the flow chart shown in FIG. 13.

At step 200, the current rating of a connector is indicated or otherwise shown. Referring also to FIG. 1, the indicating of a connector current rating is preferably carried out by providing connector prongs 12*a*, 12*b*, 12*c* of differing lengths, with each connector prong length indicating or corresponding to a different current rating for connectors 10*a*, 10*b*, 10*c*. As noted above, longer prongs preferably indicating higher current ratings. Thus, the longest connector prong 12*a*, for example, indicates a current rating for connector 10*a* of fifteen amps, while intermediate length connector prong 12*b* indicates a current rating of ten amps for connector 10*b*, and the shortest connector prong 12*c* indicates a current rating of five amps for connector 10*c*. Current rating indicating step 200 can alternatively be carried out by other means such as providing other detectable features on connector prongs 12*a*, 12*b* 12*c* which are indicative of the current rating of connectors 10*a*, 10*b*, 10*c*. Current rating indicating step can additionally be carried out by providing connector adaptors 136*a*, 136*b*, 136*c* which include differing prong lengths as means for indicating current rating.

At step 210, connector current rating is detected. Referring also to FIG. 5 through FIG. 7, the detection of connector current rating is preferably carried out via electrical receptacles 16*a*, 16*b* through the detection or sensing of the length of connector prongs which are inserted into slots 18 of receptacles 16*a*, 16*b*. Generally, a connector 10*a* is plugged into receptacle 16*a* and/or 16*b* in a standard manner, so that connector prong 12*a* engage a slot 18 and pushes on and pivots movable arm 20 by an amount which is proportional to the length of connector prong 12*a*, as described above. Movable arm 20 moves variable resistor 24 which creates a resistance signal output R(current) responsive to the length of prong 12*a* and the current rating of connector 10*a* which is communicated to circuit board 68 of outlet 62.

Step 210 also generally comprises the detecting of the preset current rating for electrical outlet 62 as determined by the adjustment of variable resistor 118 on circuit board 68. In this regard, the detecting of connector current rating step 210 also refers to and includes the detecting of the preset current rating of the electrical outlet into which connectors are plugged.

At step 220, the load current delivered to a connector is monitored. This step is generally carried out by monitoring the load current delivered to the electrical receptacle in which the connector is plugged or engaged. As noted above and shown in FIG. 6, the load current monitoring step can be carried out with respect to receptacles 16*a*, 16*b* individually as well as together for outlet 62. Primary transformers 32*a*, 32*b* and secondary windings 34*a*, 32*b* measure or detect load current to receptacles 16*a*, 16*b* respectively, while transformer 32*c* and secondary winding 34*c* measure load current to both receptacles 16*a*, 16*b* simultaneously and outlet 62 generally. Voltage signals representative of the load current detected by primary transformers 32*a*, 32*b*, 32*c* and secondary windings 34*a*, 34*b*, 34*c* are communicated to circuit board 68 wherein load current monitoring circuit 54 periodically checks or monitors the load current delivered to receptacles 16*a*, 16*b* and outlet 62 overall.

At step 230, detected or measured load current is compared to the detected connector current rating. This comparing step is generally carried out by comparison circuit 56 as described above. As also noted above, comparison of load current to connector current rating is carried out for receptacles 16*a*, 16*b* individually, as well as for electrical outlet 62. Thus, in step 230, comparison circuit 56 compares the load current delivered to receptacle 16*a* to the current rating of the connector plugged into receptacle 16*a*, compares the load current delivered to receptacle 16*b* to the current rating of the connector plugged into receptacle 16*b*, and also compares the overall load current delivered to outlet 62 (receptacles 16*a* and 16*b* together) to the preset current rating provided by variable resistor 118.

At step 240, comparison circuit 56 makes a query as to whether a current overload is detected in the form of a measured load current from step 220 which exceeds the connector current rating (or preset outlet current rating) detected in step 210. If no such current overload is detected, step 220 and step 230 are repeated. If a current overload is detected at step 240, step 250 is carried out.

At step 250, false overload detection circuit 60 generally determines whether the detected overload is real or false according to the duration of the overload or other criteria.

At step 260 detection circuit 60 makes a query as to whether the detected overload is real. If the detected overload is real step 270 is carried out. If the detected overload is false steps 220 to 250 are repeated.

At step 270, electrical power to the connector and associated receptacle are disconnected. This step is generally carried out by disconnect activation circuit 58 and power disconnect relay 42 as described above. Preferably, a single power disconnect relay 42 is used to disconnect power to electrical outlet 62 and both receptacles 16*a*, 16*b* as shown in FIG. 6, rather than individually interrupting power to receptacles 16*a*, 16*b* separately via multiple power disconnect relays.

At step 280 the location of the overload fault detected in step 240 is indicated. This step is generally carried out by overload indicator circuit 74 together with overload indicator light 69 and directional indicator lights 70, 72. If the current overload detected in step 240 is associated with an individual receptacle 16*a* or 16*b*, overload indicator circuit 74 activates overload indicator light 69 together with top receptacle indicator light 70 or bottom receptacle indicator light 72 accordingly. If an overall current overload has occurred to outlet 62, overload indicator circuit 74 activates overload indicator light 69 together with top receptacle indicator light 70 and bottom receptacle indicator light 72. The user of the invention at this point can locate and correct the current overload fault, thereby avoiding potential fire hazards associated with overload faults.

At step 290, electrical outlet 62 is "reset" by unplugging or disengaging connectors from receptacles 16*a* and/or 16*b*. If the overload fault detected in step 240 was associated with outlet 16*a* or 16*b* individually, the reset step 290 is carried out generally by unplugging the connector associated with 16*a* or 16*b*. If the overload fault detected in step 240 was an overall overload fault for outlet 62, then resetting is carried out by unplugging connectors from both receptacles 16*a*, 16*b*. As described above, when connectors are disengaged from receptacles 16*a*, 16*b*, movable arm 20 returns to the reset position and shorts reset contacts 26 which in turn send a reset signal to circuit board 68. Upon receiving the reset signal, disconnect activation circuit 58 re-connects or closes power disconnect relay so that power is again supplied to outlet 62 and receptacles 16*a*, 16*b*. Following reset step 290, steps 200 through 280 are repeated.

The method described above may additionally contain the steps of detecting a ground fault, interrupting power upon detection of a ground fault, and indicating the location of a ground fault. As noted above, these steps are carried out via a conventional ground fault interrupter circuit 88 together with ground fault indicator circuit 92, ground fault indicator light 90, and directional indicator lights 70, 72.

Figure 14:
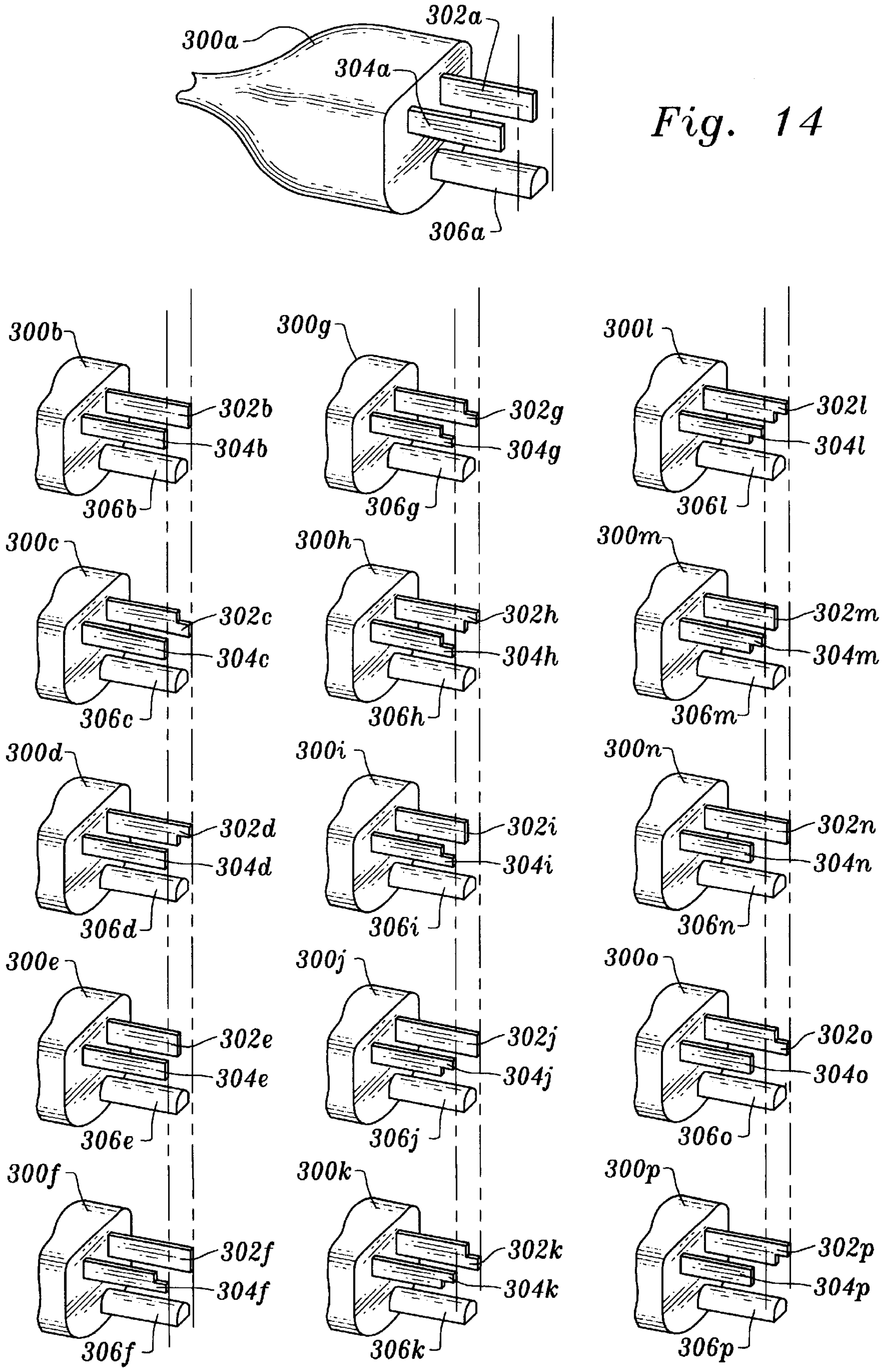
FIG. 14 is a perspective view of a plurality of electrical cord connectors illustrating alternative embodiment current indicating features in accordance with the invention.

Referring now to FIG. 14 and FIG. 15, a preferred means for indicating the current rating of an electrical connector may be provided by the presence or absence of notches or "cutout" sections at the end of each prong of the connector. Particularly, the presence or absence of notches or cutout sections at the corners of each prong provides means for indicating, encoding or mapping a unique current rating for a connector. Connectors 300*a*–300*p* includes neutral prongs 302*a*–02*p* respectively, line prongs 304*a*–304*p* respectively, and ground prongs 306*a*–306*p* respectively. Connectors 300*a*–300*p* are shown as "polarized," with neutral prongs 302*a*–302*p* being generally thicker than line prongs 304*a*–30*p*. As shown in FIG. 14 and FIG. 15, sixteen discrete, mechanically detectable encoding possibilities and current ratings, from zero ampere to fifteen amperes, are embodied in connectors 300*a*–300*p*, based on the presence or absence of a notch or cutout on one or more of the corners of the line and neutral prongs 302*a*–302*p* and 304*a*–304*p*.

Figure 15A:
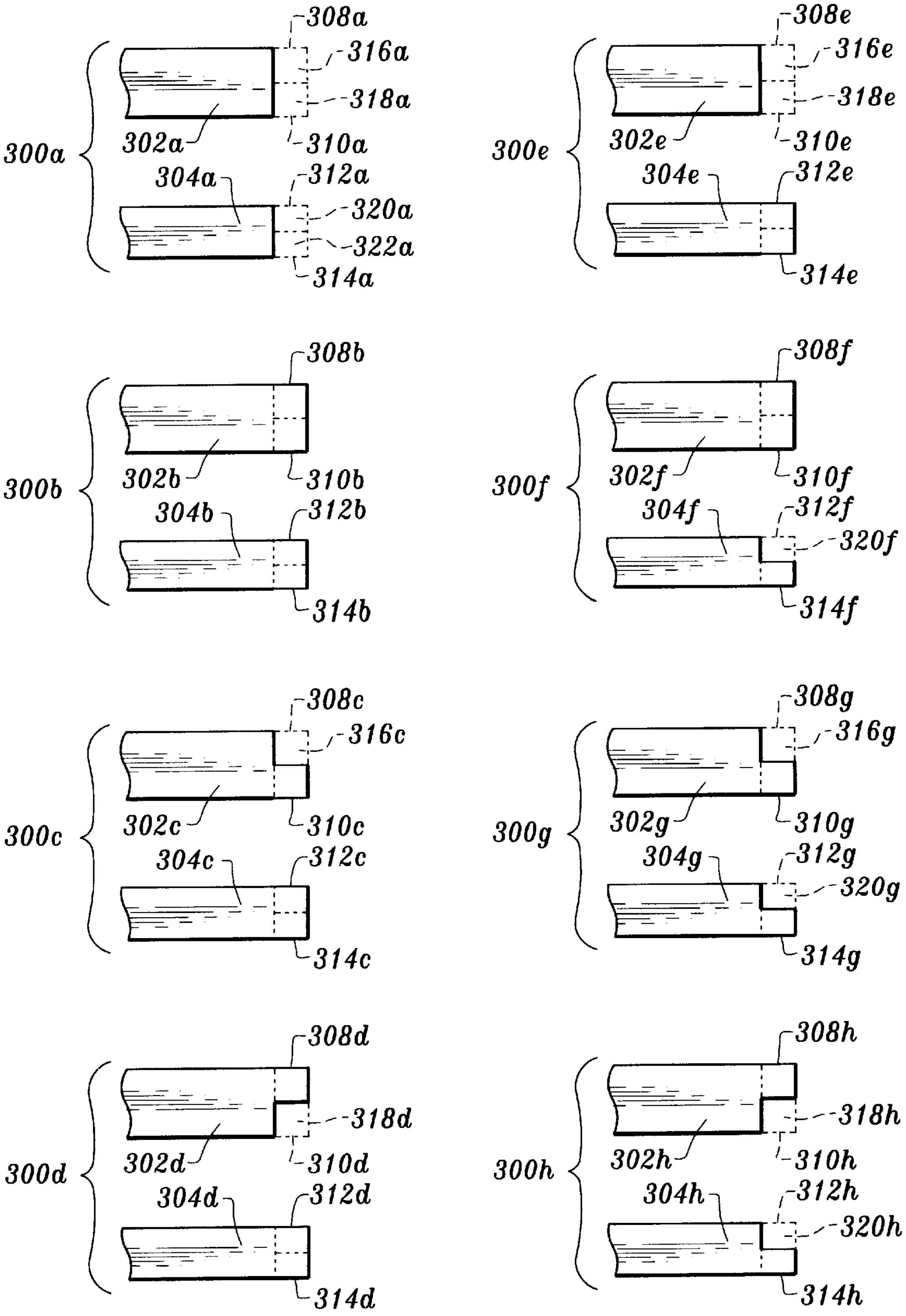
FIG. 15A is a functional diagram of the current indicating features of the electrical cord connectors of FIG. 14.
Figure 15B:
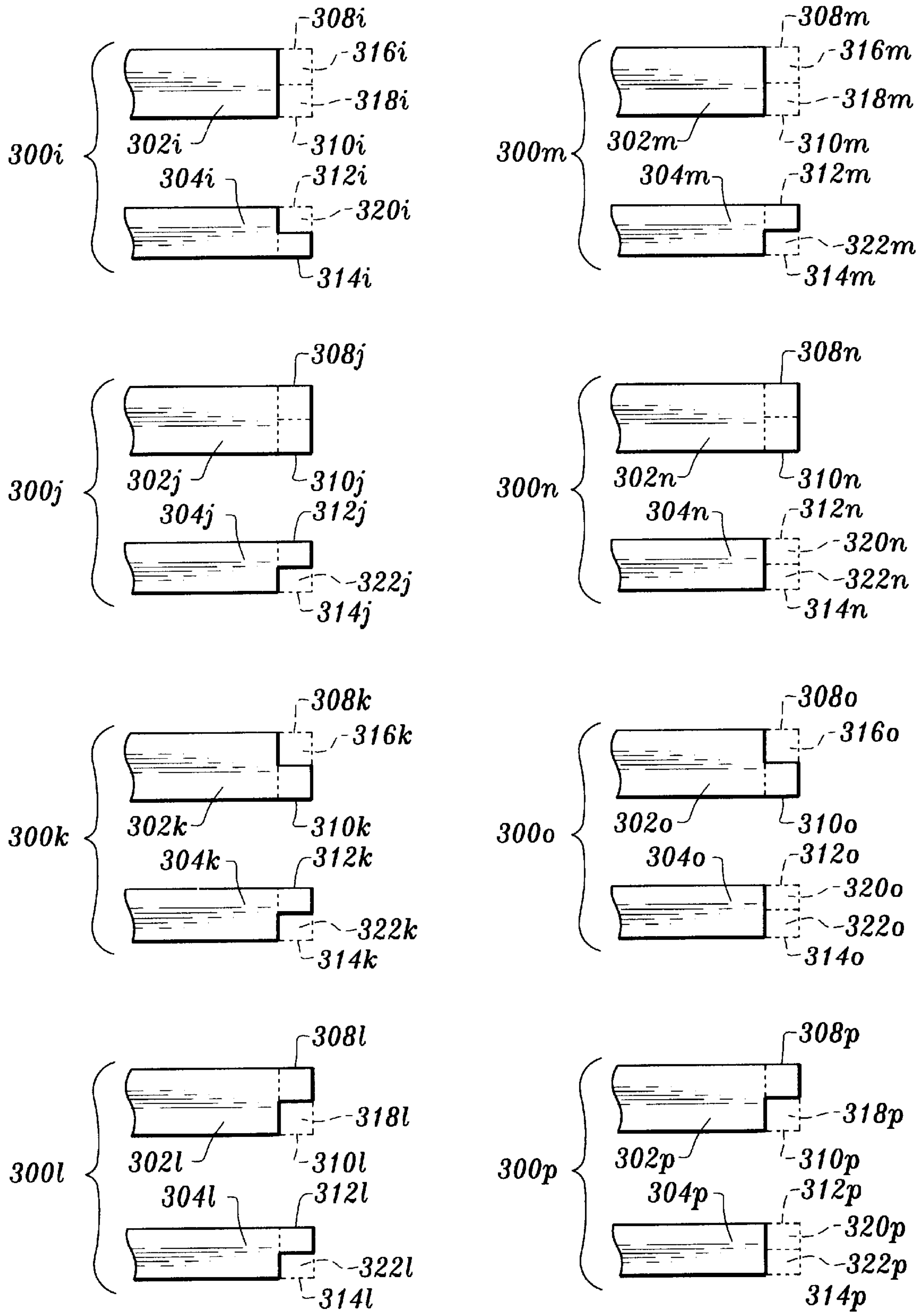
FIG. 15B is a functional diagram of the current indicating features of the electrical cord connectors of FIG. 14.

Referring more particularly to FIG. 15A and FIG. 15B, each neutral prong 302*a*–302*p* of connectors 300*a*–300*p* includes a first or upper corner 308*a*–308*p* respectively, and a second or lower corner 310*a*–310*p*. Each line prong 304*a*–304*p* of connectors 300*a*–300*p* likewise includes a first or upper corner 312*a*–312*p*, and a second or lower corner 314*a*–314*p*. The presence or absence of a notch or cutout portion at corners 308*a*–308*p*, 310*a*–310*p*, 312*a*–312*p* or 314*a*–314*p* provides a detectable mechanical feature for each connector 300*a*–300*p*, and allows for sixteen different current encoding possibilities. In the case of connector 300*a*, upper and lower corners 308*a*, 310*a* of line prong 302*a* are notched or cut away such that cutout portions or notches 316*a*, 31 8*a*, are defined. Upper and lower corners 312*a*, 314*a* of neutral prong 304*a* are also notched or cut away so that cutout portions or notches 320*a*, 322*a* are defined. In the case of connector 300*b*, upper and lower corners 308*b*, 310*b* of line prong 302*b*, and upper and lower corners 312*b*, 314*b* are not cut away. Since cutout portions 316*a*, 318*a* on line prong 302*a* of connector 300*a* are adjacent, their effect is a generally shorter line prong 302*a* on connector 300*a*, than is provided by line prong 302*b* of connector 300*b*, where corners 308*b*, 310*b* have not been cut away. Likewise, adjacent cutout portions 320*a*, 322*a* result in a generally shorter neutral prong 304*a* for connector 300*a* than occurs in neutral prong 304*b* of connector 300*b*, where corners 312*b*, 314*b* have not been cut away.

Connector 300*c* in FIG. 15A is shown with corner 308*c* of line prong 302*c* being cut away to define a notch 316*c*. Corner 310*c* of line prong 302*c* is not cut away, and corners 312*c*, 314*c* of neutral prong 304*c* are not cut away, so that prongs 302*c*, 304*c* of connector 300*c* have a detectably different configuration than the prongs of connectors 300*a* and 300*b*. Connector 300*d* has corner 318*d* cut away to provide notch 310*d*, while corners 308*d*, 312*d* and 314*d* are not cut away. Connector 300*e* has corners 308*e* and 310*e* cut away to provide notches 316*e*, 318*e*, while corners 312*e*, 314*e* are not cut away. Connector 300*f* has corner 312*f* cut away to provide notch 320*f*, while corners 308*f*, 310*f* and 314*f* are not cut away. Connector 300*g* has corners 308*g* and 312*g* cut away to provide notches 316*g* and 320*g* respectively, while corners 310*g* and 314*g* are not cut away. Connector 300*h* has corners 310*h* and 312*h* cut away to form notches 318*h* and 320*h* respectively, while corners 308*h* and 314*h* are not cut away.

In FIG. 15B, connector 300*i* has corners 308*i*, 310*i* and 312*i* are cut away to provide notches 316*i*, 318*i* and 320*i* respectively, while corner 314*i* is not cut away. Connector 300*j* has corner 314*j* cut away to create notch 322*j*, while corners 308*j*, 310*j* and 312*j* are not cut away. Connector 300*k* has corners 308*k* and 314*k* cut away to respectively provide notches 316*k* and 322*k*, while corners 310*k* and 312*k* are not cut away. Connector 3001 has corners 3101 and 3141 cut away to furnish notches 3181 and 3221 respectively, while corners 3081 and 3121 are not cut away. Connector 300*m* has notches 308*m*, 310*m* and 314*m* cut away to provide notches 316*m*, 318*m* and 322*m* respectively, while corner 312*m* is not cut away. Connector 300*n* has corners 312*n* and 314*n* cut away to provide notches 320*n* and 322*n* respectively, while corners 308*n* and 310*n* are not cut away. Connector 300*o* has corners 308*o*, 312*o* and 314*o* cut away to respectively provide notches 316*o*, 320*o* and 322*o*, while corner 310*o* is not cut away. Connector 300*p* has corners 310*p*, 312*p* and 314*p* cut away to provide notches 318*p*, 320*p* and 322*p* respectively, while corner 308*p* is not cut away.

As can thus be seen, each connector 300*a*–300*p* has a different configuration of notches or cut outs associated with its prongs, to provided detectable, current rating-indicating features, in accordance with the invention. Additional detectable notches or cut out sections could additionally be used on the ends or edges of prongs 302*a*–302*p*, 304*a*–304*p*, to provide additional detectable features for encoding larger numbers of current ratings. However, most standard electrical cords are rated for use in the range from one ampere to fifteen amperes, and thus the current rating encoding scheme illustrated in FIG. 15A and FIG. 15B should cover most standard applications. The presence or absence of notches on prongs 302*a*–302*p*, 304*a*–304*p* can be detected or sensed mechanically, optically, magnetically, electrically, or by any other standard detection means. The notching arrangement shown in FIG. 14, FIG. 15A and FIG. 15B may also be embodied in adaptors as shown in FIG. 8, so that the current encoding scheme shown in FIG. 14, FIG. 15A and FIG. 15B can be used with conventional, presently available electrical connectors. The particular current rating assigned to each connector 300*a*–300*p* may vary, but it is preferred generally that connector 300*a*, which has all corners 308*a*, 310*a*, 312*a* and 314*a* cut away, be designated as a current rating of zero amperes. This designation is used to illustrate a safety feature of the invention, which is described more fully below.

Figure 16:
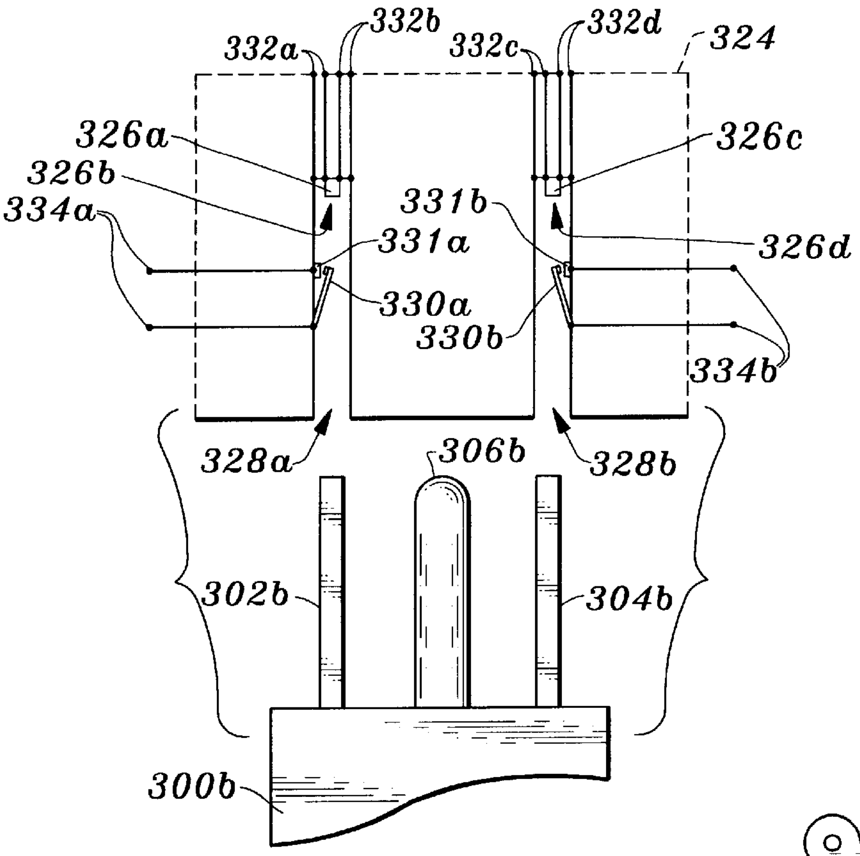
FIG. 16 is a functional diagram, shown as a top view, of a fourth embodiment electrical receptacle for use with the electrical cord connectors of FIG. 14.
Figure 17:
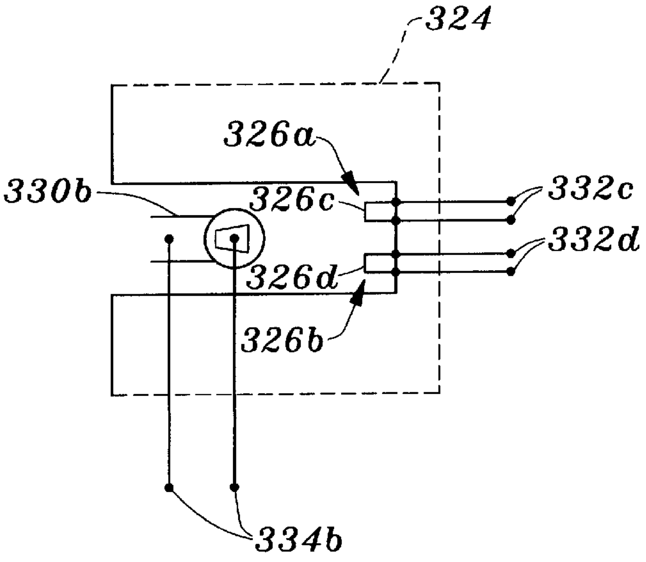
FIG. 17 is a functional diagram, shown as a side view, of the electrical receptacle of FIG. 15.

Referring now to FIG. 16 and FIG. 17, there is shown generally a fourth embodiment electrical receptacle 324 in accordance with the invention. Receptacle 324 is structured and configured for use with the electrical connectors 300*a*–300*p* shown in FIG. 14 and FIG. 15A–15B and described above. For clarity, the receptacle of FIG. 16 is shown together with connector 300*b* which, as noted above, has all corners 308*b*, 310*b*, 312*b*, 314*b* present, with no cut out sections or notches.

Means for sensing or detecting the current rating of a connector as provided by receptacle 324 are based on monitoring or sensing the presence or absence of notches or "cutout" sections at the end of each prong 302*a*–302*p*, 304*a*–304*p* of connector 300*a*–300*p*. Particularly, the current rating detecting means of receptacle 324 is provided by first, second, third and fourth push-to-operate micro switches or plug headers 326*a*, 326*b*, 326*c*, 326*d*, which are mechanically switched or activated respectively by contact with corners 308*a*–308*p*, 310*a*–310*p* 312*a*–312*p* and 314*a*–314*p* of connectors 300*a*–300*p*. In the top view shown in FIG. 16, plug headers 326*b* and 326*b* are positioned directly beneath plug headers 326*a* and 326 respectively. In the side view shown in FIG. 17, plug headers 326*a* and 326*b* are positioned directly behind plug headers 326*c* and 326*d* respectively. Plug header 326*a* is positioned within slot 328*a* to sense or monitor the presence or absence of notches 316*a*–316*p* on the upper portions or corners 308*a*–308*p* of neutral prongs 302*a*–302*p*. Plug header 326*b* is positioned within slot 328*a*, below plug header 326*a*, to sense or monitor the presence or absence of notches 318*a*–318*p* in the corners 310*a*–300*p* of neutral prongs 302*a*–302*p*. Plug header 326*c* is positioned within slot 328*b* to sense or monitor the presence or absence of notches 320*a*–320*p* at the corners 312*a*–312*p* of line prongs 304*a*–304*p*. Plug header 326*d* is positioned within slot 328*b*, below plug header 326*c*, to sense or monitor the presence or absence of notches 322*a*–322*p* at corners 314*a*–314*p* of line prongs 304*a*–304*p*.

Thus, each portion or corner 308*a*–308*p*, 310*a*–310*p*, 312*a*–312*p*, 314*a*–314*p* of prongs 302*a*–302*p* and 304*a*–304*p* has a corresponding plug header 326*a*, 326*b*, 326*c*, 326*d* in the receptacle 324. When connector 300*a*–300*p* is fully engaged with receptacle 324 such that prongs 302*a*–302*p* and 304*a*–304*p* are inserted into slots 328*a*, 328*b*, the corners at the end of each prong will mechanically engage and activate a corresponding plug header if a notch is absent. When a plug header is activated, the plug header generates an electric signal indicating that the corresponding corner of the prong has activated the plug header. Conversely, the corners at the end of each prong will not activate a corresponding plug header if a notch is present. When connector 300*a*–300*p* is disengaged from receptacle 324 such that prongs 302*a*–302*p*, 304*a*–304*p* are slidably removed from slots 328*a*, 328*b*, the upper and lower corners at the end of each prong mechanically disengage and deactivate a corresponding plug headers, thereby returning plug headers 326*a*, 326*b*, 326*c*, 326 to a deactivated, neutral, or reset state. Note that connector 300*a*, which has notches 316*a*, 318*a*, 320*a* and 322*a* present on prongs 302*a*, 304*a*, will not contact or activate any plug headers 326*a*–326*d* when engaged in receptacle 324.

Referring now to FIG. 17 receptacle 324 includes safety interlock switches 330*a*, 330*b*. Although the included drawings and description below describe the use of two such switches 330*a*, 330*b*, it will be obvious to those skilled in the art that that shock prevention can be achieved by one or more of such switches. The greater number of switches used in this manner will result in a higher level of shock prevention. Safety interlock switches 330*a*, 330*b* are conductive or have a conductive layer (not shown) on the side of the switch that is contacted by the inserted electrical connector to insulate said switches from line AC voltage. Safety interlock switches 330*a*, 330*b* are biased away from safety contacts 331*a*, 331*b* respectively, so that safety interlock switches 330*a*, 330*b* are normally not in contact with safety contacts 331*a*, 331*b*. When connector 300*a*–300*p* is engaged with receptacle 324 such that prongs 302*a*–302*p*, 304*a*–304*p* are inserted into slots 328*a*, 328*b*, prongs 302*a*–302*p*, 304*a*–304*p* will contact and activate each safety interlock switch 330*a*, 330*b* by pushing safety interlock switches 330*a*, 330*b* against safety contacts 331*a*, 331*b* respectively. When both the safety interlock switches 330*a*, 330*b* are thus activated, a signal is generated which indicates that a connector has been inserted or engaged into the receptacle 324. Power is not delivered to the inserted prongs 302*a*–302*p*, 304*a*–304*p* by receptacle 324 until safety interlock switches 30*a*, 330*b* are activated by the prongs. Preferably, power is not delivered to the inserted prongs 302*a*–302*p*, 304*a*–304*p* until at least one plug header 326*a*–326*d* is activated as well as safety interlock switches 330*a*, 330*b*.

Safety interlock switches 330*a*, 330*b* provide safety means for preventing shocks due to partial engagement of a connector in receptacle 324. Another level of shock prevention safety is provided by plug headers 326*a*–326*d*, of which at least one must generally be activated. Power is not delivered to receptacle 324 and prongs 302*a*–302*p*, 304*a*–304*p* until a signal is generated upon both safety switches 330*a*, 330*b* connecting with contacts 331*a*, 331*b*, respectively. Thus, receptacle 324 will be switched "on" when both safety interlock switches 330*a*, 330*b* (and at least one plug header 326*a*–326*d*) is activated. Receptacle 324 is switched "off" when either safety switch 330*a*, 330*b* is deactivated, or when all plug headers 326*a*, 326*b*, 326*c*, or 326*d* are deactivated. Connector 300*a*, which has all notches 316*a*, 318*a*, 320*a* and 322*a* present, is shown to more fully illustrate the safety shock prevention means provided by the invention. As can be seen from the above, connector 300*a* will not activate any of the plug headers 326*a*–326*d*, and thus connector 300*a* will not receive power from receptacle 324 even when prongs 302*a*, 304*a* are fully inserted into slots 328*a*, 328*b* of receptacle 324.

Activation of receptacle 324 can thus only occur when prongs 302*b*–302*p*, 304*b*–304*p* are fully inserted into slots 328*a*, 328*b* to activate safety interlock switches 330*a*, 330*b* and at least one plug header 326*a*–326*d*. This arrangement avoids the shock hazard associated with conventional electrical connectors. When a conventional connector is only partially inserted into or partially removed from a standard receptacle, the prongs of the connector may be exposed to the user and pose a shock hazard as current travels through the exposed prongs. In the present invention, however, the plug headers 326*a*, 326*b*, 326*c*, 326*d* are positioned within slots 328*a*, 328*b* of receptacle 324 so that prongs 302*a*–302*p*, 304*a*–304*p* of connector 300*a*–300*p* must be fully or substantially inserted into slots 328*a*, 328*b* of receptacle 324 before plug headers will be activated by prongs 302*a*, 304*a* of connector.

The use of dual safety interlock switches 330*a*, 330*b* also provide means for preventing shocks due to insertion of foreign or improper objects into slots 328*a*, 328*b* of receptacle 324. A shock hazard exists in conventional receptacles, with shock resulting from the insertion of a foreign object such as a hairpin or paperclip into the slots of the receptacle, as could occasionally occur with small children. As described above, however, in the present invention both safety interlock switches 330*a*, 330*b* must be activated before the receptacle will be switched "on" such that power can be delivered to prongs 302*b*–302*p*, 304*b*–304*p*. Thus, if a foreign object is inserted into only one slot 328*a* or 328*b*, only one safety interlock switch 330*a*, 330*b* would be activated, and thus receptacle 324 would remain "off" and no power would be delivered to the foreign object. This arrangement substantially reduces the shock hazard associated with inserting foreign objects into standard receptacles, as both safety interlock switches 330*a*, 330*b* and at least one plug header 326*a*–326*b* must be activated in order for current to be delivered.

Figure 18:
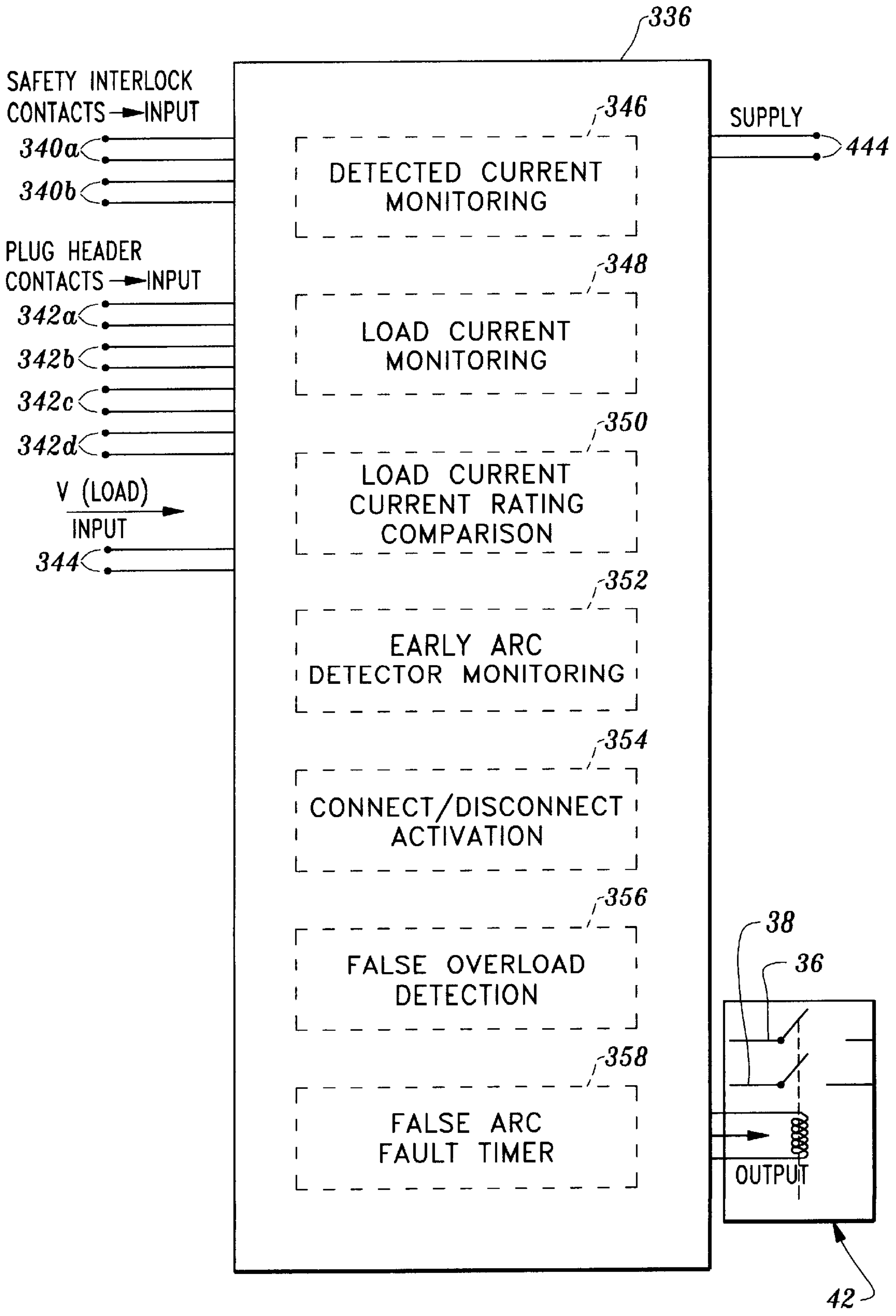
FIG. 18 is a functional block diagram of a power disconnect circuit for the receptacle of FIG. 16 and FIG. 17.

Referring also to FIG. 18, as well as FIG. 16 and FIG. 17, there is shown a power disconnect circuit board 336 for the receptacle 324. Power disconnect circuit board 336, together with power disconnect relay 42, provide means for connecting power to receptacle 324 and an electrical connector when the connector is fully inserted into the receptacle 324, and means for disconnecting power to the connector and receptacle 324 when the connector is removed from the receptacle or when an overload fault, a ground fault, or arc fault occurs. Circuit board 336 includes safety interlock contacts 340*a*, 340*b* which are operatively coupled to output contacts 334*a*, 334*b* associated with safety interlock switches 330*a*, 330*b* respectively. Plug header contacts 342*a*, 342*b*, 342*c*, 342*d* on circuit board 336 are operatively coupled to output contacts 332*a*, 332*b*, 332*c*, 332*d* associated with plug headers 326*a*, 326*b*, 326*c*, 326*d* respectively. Generally, the state of each plug header 326*a*–326*d* is communicated to circuit board 336 via input contacts 342*a*–342*d*, as "on" where the corresponding plug header 326*a*, 326*b*, 326*c*, 326*d* is activated, and is communicate as "off" where the corresponding plug header 326*a*–326*d* is not activated. Circuit board 336 includes hardware or circuitry which provides means for detecting current rating of connector 300, shown generally as detected current monitoring circuit 346. Detected current monitoring circuit caries on the operation of periodically monitoring the states of plug headers 326*a*, 326*b*, 326*c*, 326*d* to determine the current rating of the connector 300*a*–300*p* associated with receptacle 324.

Referring also to FIG. 3, a ring transformer 32 and secondary winding 34 provide load current monitoring means as described above. The output of the load current monitoring means can also be communicated to a total home power monitoring system in or a "smart house," wherein a central data processor for an entire home generally carries out the operations shown in the circuit of FIG. 21 below and described herein. Load current contacts 344 on circuit board 336 are operatively coupled to output contacts 50 associated with winding 34 on primary transformer 32. Load current monitoring circuit 348 operates generally in the manner described above for load current monitoring circuit 54, and carries out the operation of periodically monitoring, updating or verifying the voltage signal V(load) from transformer 32 and secondary winding 34, to ascertain the load current which is being delivered to receptacle 324 and connector 300*a*–300*p*. Means for comparing the detected or measured load current to the current rating of electrical connector 300*a*–300*p* are shown generally as load current-current rating comparison circuit 350, which operates in generally the same manner as comparison circuit 56 described above. Comparison circuit 350 carries out the operation of periodically comparing the load current detected by transformer 32 and secondary winding 34 to the current rating for the connector 300*a*–300*b* detected by detected current monitoring circuit 346.

In addition to sensing the current rating of an inserted plug to set the outlet trip level, such trip level could also be set manually by the user. A front panel means for setting a trip level, preferably a variable resistor or a multi-position switch, may be utilized. The use of an outlet trip level which may be set by a user is generally less preferable from a safety point of view than use of a variable resistor which is set by the manufacturer of the appliance or receptacle. The user would have to set, or reset, the trip level on the outlet every time a different appliance or device is used in the electrical circuit, e.g. a toaster uses more current than a TV set. The likely frustration of the user in identifying the correct setting for each appliance, and thereby avoiding nuisance trips, may soon lead the user to discover that the maximum setting of fifteen amperes trip level eliminates frustration. Of course, such a setting also eliminates most of the needed overload protection.

Circuit board 336 also includes means for detecting arcing faults associated with electrical failure in a receptacle, or an electrical connector or appliance associated with the receptacle. Common conditions which may cause an arcing fault include corroded, damaged or worn insulation, loose connections, and electrical stress caused by repeated overloading. Arc faults can cause fire when located proximate to flammable insulation or other materials. Arc faults typically result in a characteristic broad band noise in a circuit, and arc fault detectors are often based on the monitoring of the high frequency RF content of such noise to detect characteristic arc fault signatures. Low voltage arcing faults, for example, can be intermittent or "sputtering," and thus randomness in high frequency circuit noise is a common criterion for detecting arc faults. Sputtering arc faults typically occur near the peak of the ac voltage waveform, resulting in a step increase in current. The arc fault detecting means of the invention is shown generally as early arc detector monitoring circuit 352, which carries on the operation periodically monitoring the load current delivered to receptacle 324, locates step increases or "spikes" on the current waveform, and identifying and differentiating step increases or spikes associated with sputtering arc faults against non-step spikes or current fluctuations which are unassociated to arc faults, such as spikes caused by normal appliance start-up.

Hardware or circuitry are included on circuit board 336 to provide means for switching the receptacle 324 between an "on" or "activated" state and an "off" or "deactivated" state as described above. The switching means are shown generally as connect/disconnect activation circuit 354. When receptacle 324 in the "on" state according to activation of safety interconnect switches 330*a*, 330*b* and at least one plug header 326*a*–326*d*, connect/disconnect activation circuit 354 provides means for closing the normally open power disconnect relay 42 to initiate power to receptacle 324 and connector 300*b*–300*p*. When in the "off" state, connect/disconnect activation circuit provides means for opening power disconnect relay 42 to interrupt power to receptacle 324 and connector 300. Connect/disconnect activation circuit 354 serves as safety shock prevention means and carries out the operation of monitoring the state of safety interlock switches 330*a*, 330*b* and the state of plug headers 326*a*, 326*b*, 326*c*, 326*d*.

Connect/disconnect activation circuitry 354 also provides means for opening power disconnect relay 42 to interrupt power to receptacle 324 and connector 300*b*–300*p* when the detected load current exceeds the current rating detected for connector 300*b*–300*p*. The term "exceeds the current rating," as noted above, means or refers to the occurrence of an overload fault generally, wherein measured load current exceeds a predetermined threshold which is equal to, proportional to, greater than or otherwise associated with the current rating detected for the connector 300 plugged into receptacle 324. Thus, the present invention can be utilized such that power disconnect relay 42 is tripped or disconnected upon detection of a load current less than (or greater than) the actual current rating, as noted above. In the preferred embodiment, however, connect/disconnect activation circuitry 354 trips relay 42 generally at the point which the load current to connector 300 has measurably exceeded the current rating for connector 300.

Connect/disconnect activation circuitry 354, together with early arc detector circuit further provides means for opening power disconnect relay 42 to interrupt power to receptacle 324 and connector 300*b*–300*p* when an electric arc is detected in the current by early arc detector monitoring circuit 352. Thus, the present invention can be utilized such that power disconnect relay 42 is tripped or disconnected upon detection of an electrical arc fault.

Preferably, circuit board 324 also includes means for avoiding or preventing power disconnection due to "false" current overloads, which are shown as false by overload detection circuit 356. False overload detection circuit 356 operates generally in the same manner as false overload detection circuit 60 as described above and avoids tripping of relay 42 unless the detected overload is "real" rather than "false".

Circuit board 324 also includes means for avoiding or preventing power disconnection due to "false" electrical arc faults. As described above, there are often situations wherein a brief, temporary load current spike or step occurs during normal startup or operation of an electrical appliance. The temporary current spikes are not true electrical faults which would create a fire risk. Circuit board 324 includes a false arc timer circuit 358 as means for preventing disconnection due to false or temporary arc faults. False arc timer circuit 358 includes a conventional time keeping means such as an oscillating quartz crystal (not shown), and false arc timer circuit 358 carries out the operations of measuring the number of current spikes or steps in a given time interval, and preventing disconnection of relay 42 if the number of current spikes or steps within the given interval is less than a predetermined amount.

In operation, electrical receptacle 324 and circuit board 336 are preferably embodied in a single electrical outlet device such as an electrical wall outlet (not shown). A user of the invention inserts a connector 300*b*–300*p* into receptacle 324 in a standard manner, so that connector prongs 302*b*–302*p*, 304*b*–304*p* engage slots 328*a*, 328*b* respectively. Prong 302*b*–302*p* pushes against safety interlock switch 330*a* so that safety interlock switch 330*a* contacts safety interlock contact 331*a*, generating a first activation signal that safety interlock switch 330*a* is "on" or activated. The first activation signal is communicated to circuit board 336. Prong 304*b*–304*p* likewise pushes safety interlock switch 330*b* against contact 331*b*, generating a second activation signal that safety interlock switch 330*b* is "on" or activated. The second activation signal is also communicated to circuit board 336.

The end portions of each prong 302*b*–302*p*, 304*b*–304*p* define at their ends a notch 316, 318, 320, 322 in the upper 308, 312, and lower portion 310, 314, of each prong 302*b*–302*p*, 304*b*–304*p* respectively, as described above. When connector 300*b*–300*p* is fully engaged with receptacle 324 such that prongs 302*a*–302*p* and 304*a*–304*p* are inserted into slots 328*a*, 328*b*, the corners at the end of each prong will mechanically engage and activate a corresponding plug header 326*a*–326*d* if no notch is present. When a plug header is thus activated, the plug header generates an electric signal to circuit board 336 via contacts 332*a*–332*d* and contacts 342–342*d*, indicating the particular current rating of the connector engaged in receptacle 324.

Detected current monitoring circuit 346 periodically monitors plug header switches 332*a*–*d* and calculates the corresponding current rating for the connector 300. Connect/disconnect activation circuit 354 periodically monitors safety interlock switches 330*a*, 330*b*, and plug header switches 332*a*–*d*. When both safety interlock switches 330*a*, 330*b* and one plug header switch are activated, connect/ disconnect activation circuit 354 will close power disconnect relay 42 to connect power to receptacle 324 and connector 300. When only one safety interlock switch or when all plug headers switches are deactivated, connect/disconnect activation circuit 354 will open power disconnect relay 42 to interrupt power to receptacle 324 and connector 300.

The load current passing through receptacle 324 and connector 300*b*–300*p* is detected or sensed by primary transformer 32 and secondary winding 34 in the manner described above, and a voltage signal V(load) is communicated therefrom to circuit board 336 via contacts 344. Load current monitoring circuit 348 periodically monitors the voltage signals representing the sensed load current, and comparison circuit 350 periodically compares the load current voltage signals to detected current rating of connector 300*b*–300*p* determined by the detected current monitoring circuit 346. When comparison circuit 350 recognizes or notes that the load current indicated by the voltage signals exceeds the connector current rating indicated by the detected current monitoring circuit 346, a current overload to connector 300*b*–300*p* is recognized by comparison circuit 350. False overload detection circuit 356 then determines, in the manner described above, whether the detected overload is "real" or "false". If the detected overload is real, the connect/disconnect activation circuit 354 then activates power disconnect relay 42 to interrupt or disconnect power to receptacle 324 and connector 300*b*–300*p*. Early arc detector monitoring circuit 352 periodically monitors the current signal in the load current to detect current stepping or spikes which indicate an electrical arc fault. When early arc detector monitoring circuit 352 recognizes a step or spike pattern in the current signal which is associated with an arc fault, an arc fault is detected or recognized by early arc detector monitoring circuit 352. False arc timing circuit then measure the number of steps or spikes within a certain duration. If the number of spikes within a certain duration exceeds a predetermined threshold which indicates the recognized arc fault is not a "false" arc fault, connect/disconnect activation circuit 354 then activates power disconnect relay 42 to interrupt or disconnect power to receptacle 324 and connector 300.

Following power disconnection by connect/disconnect activation circuit 352 and power disconnect relay 42, the user of the invention can correct the cause of the overload or arc fault, and then disengage connector 300*b*–300*p* from receptacle 324 to reset receptacle 324. Alternatively, a manual reset method such as a reset switch may be utilized. When connector 300*b*–300*p* is disengaged from receptacle 324, prongs 302*a*–302*p*, 304*a*–304*p* disengage from slots 328*a*, 328*b*, and plug headers 326*a*, 326*b*, 326*c*, 326*d* are all deactivated. Connect/disconnect activation circuit 354 recognizes the deactivation of all plug headers 326*a*, 326*b*, 326*c*, 326*d*, together with disengagement of safety interlock switches 330*a*, 330*b* from contacts 331*a*, 331*b*, as a reset condition indicating that no connector is engaged or plugged into receptacle 324. When connector 300*b*–300*p* or another connector is then inserted or plugged into receptacle 324, plug headers 326*a*, 326*b*, 326*c*, 326*d* will activate according to the notches present or absent in the connector prong to again indicate a connector current rating, and the aforementioned sequence of events is generally repeated.

The detected current monitoring circuit 346, load current monitoring circuit 348, load current/current rating comparison circuit 350, early arc detector monitoring circuit 352, connect/disconnect activation circuit 354, false overload detection circuit 356 and false arc timing circuit 358 on circuit board 336 as related above all carry out functions or operations using conventional circuitry and hardware configurations which are well known to those skilled in the art. The output from circuit board 336 may be communicated to the processor of a home power monitoring system computer or "smart house" computer (not shown). The operations carried out by circuit board 336 can alternatively be embodied in software which runs on a conventional microprocessor associated with a "smart house" home power monitoring system computer. In that regard, referring again to FIG. 18, reference number 336 would designate a microprocessor of the home power monitoring system computer, and detected current monitoring, 346, load current monitoring 348, load current-current rating comparison 50, early arc detector monitoring 352, connect/disconnect activation 354, false overload detection 356, and false arc fault timer 358 would all comprise software or programming running on processor 336 and which carried out generally the same operations as the corresponding circuitry described above. Thus, detected current monitoring, 346, load current monitoring 348, load current-current rating comparison 50, early arc detector monitoring 352, connect/disconnect activation 354, false overload detection 356, and false arc fault timer 358 would carry out program operations for connecting or providing power to receptacle 324 when connector 300*b*–300*p* is inserted into the receptacle 324, disconnecting power to receptacle 324 and connector 300*b*–300*p* when the connector 300*b*–300*p* is removed from receptacle 324, monitoring the load current delivered to receptacle 324 and connector 300*b*–300*p*, comparing the load current to the current rating detected for connector 300*b*–300*p*, monitoring load current for electrical arc faults, disconnecting or interrupting power to receptacle 324 and connector 300 in the event that the load current exceeded the current rating of connector 300 or in the event an electrical arc fault arises, and preventing power interruption in cases where false overloads or arcs are detected.

Figure 19:
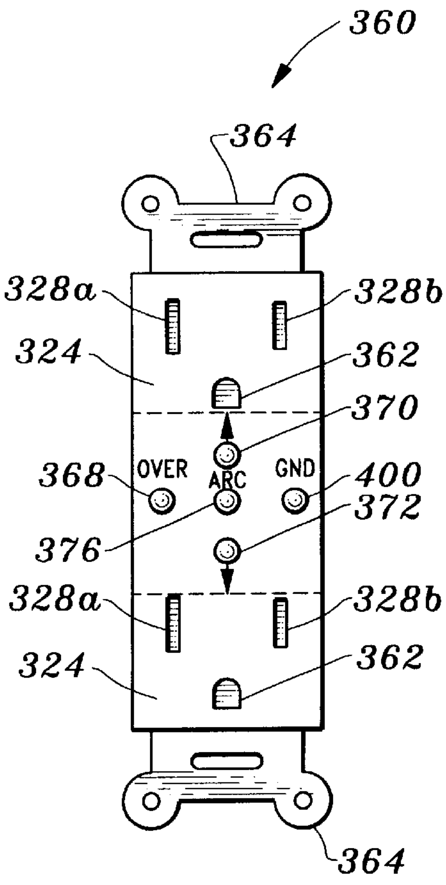
FIG. 19 is a front elevation view of a second embodiment dual receptacle electrical outlet in accordance with the present invention, shown with overload fault, ground fault and arc fault indicator lights.
Figure 20:
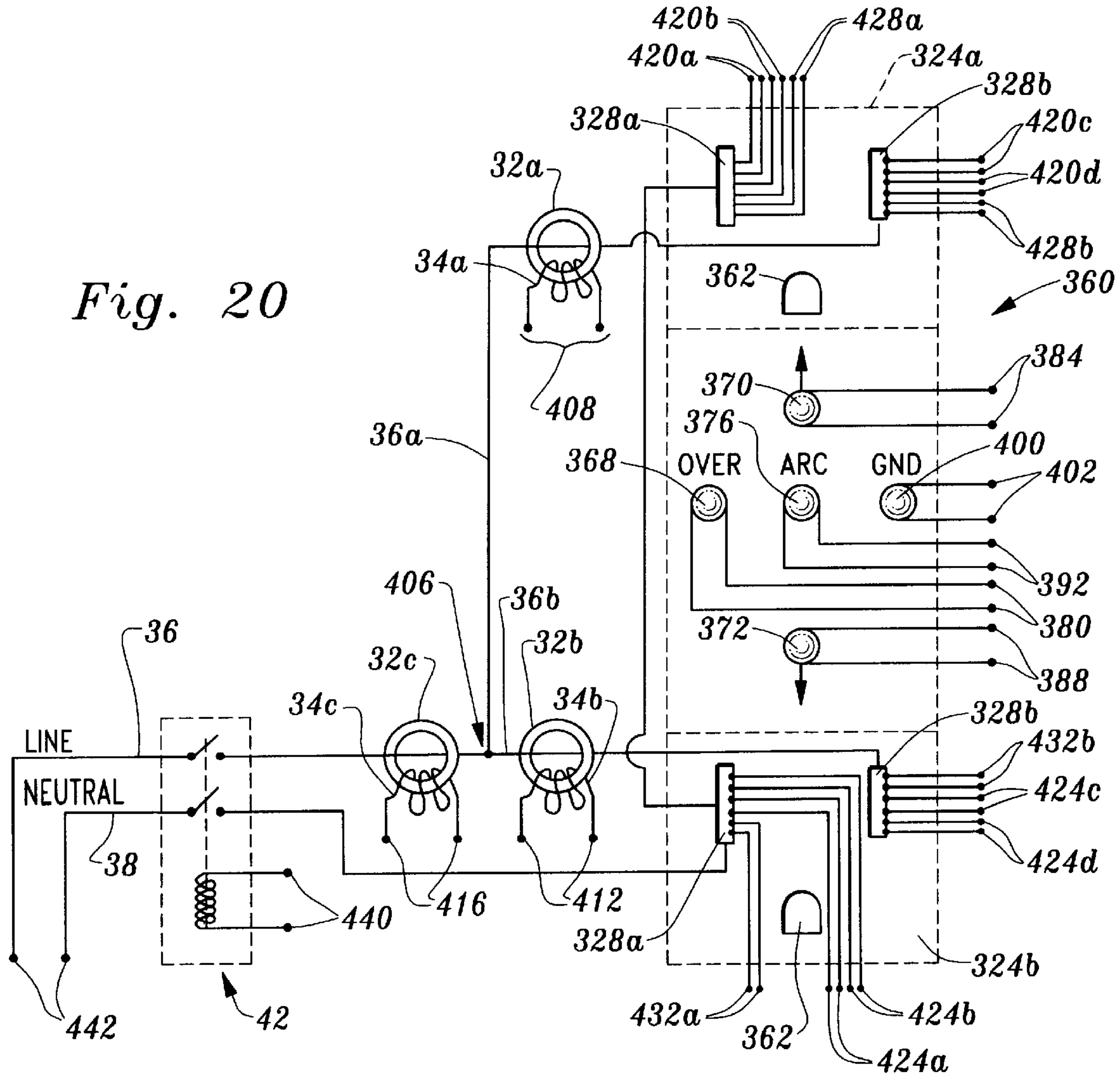
FIG. 20 is a functional diagram of the dual receptacle electrical outlet of FIG. 18.

Referring now to FIG. 19 and FIG. 20, the electrical connection safety apparatus included in a dual receptacle electrical outlet 360 in accordance with the invention, is shown. Electrical outlet 360 includes a pair of electrical receptacles shown as top receptacle 324*a* and bottom receptacle 324*b*, which is generally identical to receptacle 324 described above and shown in FIG. 16 and FIG. 17, with like reference numbers denoting like parts. Thus, receptacles 324*a*, 324*b* of outlet 360 each include a pair of slots 328*a*, 328*b* for receiving connector prongs (not shown), safety interlock switches 330*a* ,330*b* and contacts 331*a*, 331*b*, and plug header switches 326*a*–326*d*. Normally off safety interlock switches 330*a*, 330*b* are turned "on" or activated when connector prongs (not shown) are inserted into slots 328*a*, 328*b* to push on the safety interlock switches 330*a*, 330*b*, as described above. Normally off plug header switches 326*a*–326*d* are turned "on" or activated according to the notches present or absent in the connector prongs (not shown) when connector prongs are inserted into slots 328*a*, 328*b*, as also noted above. Receptacles 324*a*, 324*b* each include a slot 362 which is structured and configured to receive a connector ground prong (not shown) in a conventional manner. Electrical outlet 360 includes standard installation brackets 364 which allow outlet 360 to be attached to or supported on a stud or other support element within a wall by screws (not shown).

Figure 21:
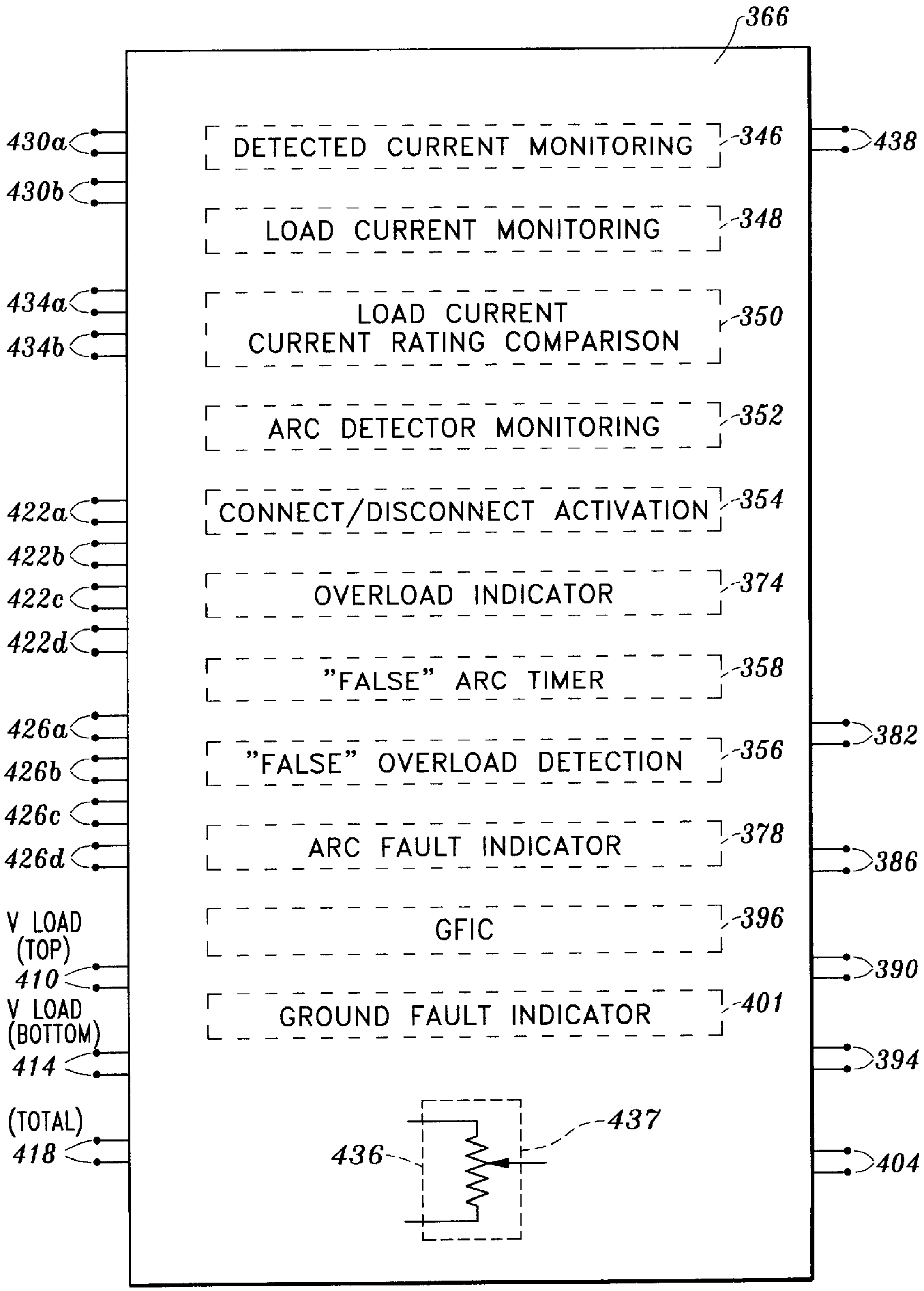
FIG. 21 is a functional block diagram of a power disconnect circuit for the dual receptacle electrical outlet of FIG. 19 and FIG. 20.

An electronic circuit board 366, shown in FIG. 21, is associated with outlet 360, and is preferably internally located within outlet 360. Circuit board 366 includes a detected current monitoring circuit 346, a load current monitoring circuit 348, a load current-current rating comparison circuit 350, an early arc detector monitoring circuit 352, a connect/disconnect activation circuit 354, a false overload detection circuit 356, and a false arc fault timer circuit 358, which operate in generally the same manner described above.

Since electrical outlet 360 includes two receptacles 324*a*, 324*b*, outlet 360 preferably includes means for indicating the location of an overload fault, and means for indicating the location of an arc fault. The overload fault indicating means preferably comprises an overload fault indicator light 368, a top receptacle indicator light 370, a bottom receptacle indicator light 372, and an overload indicator circuit 374 on circuit board 366. The arc fault indicating means preferably comprises an arc fault indicator light 376, the top receptacle indicator light 370, bottom receptacle indicator light 372, and an arc fault indicator circuit 378 on circuit board 366. Indicator lights 368, 370, 372, 376 are preferably light emitting diodes (LED) or low watt light bulbs. Overload indicator light 368 has contacts 380 which are operatively coupled to overload output contacts 382 on circuit board 366. Top receptacle indicator light 370 has contacts 384 which are operatively coupled to top receptacle output contacts 386 on circuit board 366, and bottom receptacle indicator light 372 has contacts 388 which are operatively coupled to bottom receptacle output contacts 390 on circuit board 366. Arc fault indicator light 376 has contacts 392 which are operatively coupled to arc fault output contacts 394 on circuit board 366. When a current overload fault occurs in top receptacle 324*a*, overload fault indicator light 368 is activated together with top receptacle indicator light 370. When a current overload fault occurs in bottom receptacle 324*b*, overload fault indicator light 368 is activated together with bottom receptacle indicator light 372. When an overload fault occurs for outlet 360 generally, overload fault indicator light 368 is activated together with both directional indicator lights 370, 372. In this manner, the location of an overload fault is indicated or identified for users of the invention. In a similar manner, when an arc fault occurs in top receptacle 324*a*, arc fault indicator light 376 is activated together with top receptacle indicator light 370, and when an arc fault occurs in bottom receptacle 324*b*, arc fault indicator light 376 is activated together with bottom receptacle indicator light 372. In this manner, the location of an arc fault is indicated or identified for users of the invention.

Electrical outlet 360 includes means for disconnecting power to receptacles 324*a*, 324*b* upon detection of a ground fault associated with either receptacle 324*a*, 324*b*. The ground fault power disconnecting means preferably comprises a conventional ground fault interrupter circuit or GFIC 396, together with power disconnect relay 42. Means for indicating the location of a ground fault are provided by ground fault indicator light 400 and ground fault indicator circuit 401. Ground fault indicator light 400 is preferably a LED or low watt light bulb, and has contacts 402 which are operatively coupled to GFI fault trip output contacts 404 on circuit board 366. When a ground fault occurs in top receptacle 324*a*, ground fault indicator light 400 is activated together with top receptacle indicator light 370. When a ground fault occurs in bottom receptacle 324*b*, ground fault indicator light 400 is activated together with bottom receptacle indicator light 372. The location of a ground fault is thus indicated or identified for users of the invention.

Current monitoring means for outlet 360 are provided by three primary transformers 32*a*, 32*b*, 32*c*, together with accompanying secondary windings 34*a*, 34*b*, 34*c* associated with line conductor 36. Line conductor 36 is split at junction point 406 so that line conductor 36 can provide power to both receptacles 324*a*, 324*b* via line conductors 36*a*, 36*b* respectively. Primary transformer 32*a* and secondary winding 34*a* are positioned on line conductor 36*a* below or "downstream" from junction point 406 so that secondary winding 34*a* produces a voltage signal V(load) representative of the load current delivered to receptacle 324*a*. Primary transformer 32*b* and secondary winding 34*b* are positioned on line conductor 36*b* below or "downstream" from junction point 406 so that secondary winding 34*b* produces a voltage signal V(load) representative of the load current delivered to receptacle 324*b*. Primary transformer 32*c* and secondary winding 34*c* are positioned on line conductor 36 above or "upstream" from junction point 406 so that secondary winding 34*c* produces a voltage signal V(load) representative of the total load current delivered to electrical outlet 360 via both receptacles 324*a*, 324*b*. Output contacts 408 from secondary winding 34*a* are operatively coupled to input contacts 410 on circuit board 366. Output contacts 412 from secondary winding 34*b* are operatively coupled to input contacts 414 on circuit board 366. Output contacts 416 from secondary winding 34*c* are operatively coupled to input contacts 418 on circuit board. The total load current to outlet 360 can alternatively be monitored according to the combined signal output of transformers 32*a*, 32*b* and secondary windings 34*a*,34*b*, with transformer 32*c* and secondary winding 34*c* being omitted.

The current rating detecting means of electrical outlet 360 is structured, configured and positioned to detect the individual current ratings for receptacles 324*a*, 324*b* and connectors associated therewith. Receptacles 324*a*, 324*b* each include plug headers 326*a*, 326*b*, 326*c*, 326*d* within slots 328*a*, 328*b* as shown in FIG. 16 and FIG. 17 and described above. For clarity, FIG. 20 shows slots 328*a*, 328*b* with the plug headers omitted, but with corresponding output contacts shown for each plug header. Output contacts 420*a* for plug header 326*a* are operatively coupled to input contacts 422*a* on circuit board 366, with output contacts 420*b* for plug header 326*b* are operatively coupled to input contacts 422*b* on circuit board 366, while output contacts 420*c* for plug header 326*c* are operatively coupled to input contacts 422*c* on circuit board 366, and output contacts 420*d* for plug header 326*d* are operatively coupled to input contacts 422*d* on circuit board 366, to communicate state of plug header 326*a*–326*d* of receptacle 324*a* to circuit board 366. Detected current monitoring circuit 346 ascertains the current rating of connectors engaged in receptacles 324*a* according to the states of plug headers 326*a*, 326*b*, 326*c*, 326*d*, as described above. Bottom receptacle 324*b*, which is generally identical to receptacle 324*a*, includes output contacts 424*a* associated for plug header 326*a* (not shown) which are operatively coupled to input contacts 426*a* on circuit board 366, output contacts 424*b* for plug header 326*b* which are operatively coupled to input contacts 426*b* on circuit board 366, output contacts 424*c* for plug header 326*c* which are operatively coupled to input contacts 426*c* on circuit board 366, and output contacts 424*d* for plug header 326*d* which are operatively coupled to input contacts 426*d* on circuit board 366, to communicate the state of plug headers 326*a*–326*d* to circuit board 336. Detected current monitoring circuit 346 ascertains the current rating of connector (not shown) from the states of plug headers 326*a*, 326*b*, 326*c*, 326*d* in receptacle 324*b* in the manner described above.

Top receptacle 324*a* includes safety interlock switches 330*a*, 330*b* and contacts 331*a*, 331*b* within slots 328*a*, 328*b*, in the manner described above and shown in FIG. 16. Safety interlock switches 330*a*, 330*b* and contacts 331*a*, 331*b* are omitted from FIG. 20 for clarity. Output contacts 428*a* are associated with safety interlock switch 330*a* and contact 331*a*, and are operatively coupled to input contacts 430*a* on circuit board 366. Output contacts 428*b* are associated with safety interlock switch 330*b* and contact 331*b* in slot 328*b*, and are operatively coupled to input contacts 430*b* on circuit board 366. The state of safety switches 330*a*, 336*b* are communicated to connect/disconnect activation means 354 in circuit board 366 for determining the appropriate state for relay switch 42. Bottom receptacle 324*b*, which is generally identical to receptacle 324*a*, likewise includes safety interlock switches 330*a*, 330*b* and contacts 331*a*, 331*b*, which are omitted from FIG. 20 for clarity. Output contacts 432*a* for safety interlock switch 330*a* and contact 331*a* in slot 328*a* are operatively coupled to input contacts 434*a* on circuit board 366, and output contacts 432*b* for safety interlock switch 330*b* and contact 331*b* in slot 328*b* are operatively coupled to input contacts 434*b* on circuit board 366, to communicate the state of safety interlock switches 330*a*, 330*b* to circuit board 366. The state of safety switches 330*a*, 33*b* are communicated to connect/disconnect activation means 354 in circuit board 366 for determining the appropriate state for relay switch 42.

Electrical outlet 360 includes means for providing a preset current rating for outlet 360, and means for disconnecting electrical power to outlet 360 when the overall current load to outlet 360 exceeds the preset outlet current rating. A preset current indicating circuit 436 associated with circuit board 366 includes a variable resistor which is preset, preferably by the manufacturer, to indicate a resistance value indicative of a maximum current rating for electrical outlet 360. The variable resistor of current indicating circuit 436 provides a resistance signal R(current) to comparison circuit 350 which indicates the preset current rating for outlet 360. Comparison circuit 350 compares the total load current to outlet 360 detected by transformer 32*c* to the preset outlet current rating provided by variable resistor 436, and when an overload situation occurs in which the total load current to outlet 360 exceeds the preset outlet current rating, power disconnect relay 42 is disconnected, as related below. The preset outlet current rating could alternatively be hardwired or integral to comparison circuit 350 rather than set or determined by variable resistor 436.

Variable resistor 436 may be associated with a front panel 437 on outlet 360 which is accessible to users, so that users may adjust or reset the trip level for receptacle 360 by manually adjusting variable resistor 436. Front panel 437 is shown on circuit board 366 for clarity, although it should be readily understood that front panel 437 is accessible to a user on an external surface of outlet 360. Another variable resistor (not shown) which is identical to variable resistor 436 may additionally be included with front panel 437 on outlet 360, so that the two variable resistors may be used to independently set the trip levels for both upper and lower receptacles 324 on outlet 360. Manual resetting or adjustment of resistor 436 by users is generally less preferable, as noted above, since users may elect to set the trip level at an unsafe high threshold in order to avoid frustration associated with current interruptions due to current overload hazards.

Power disconnect relay 42 is positioned so that line and neutral conductors 36, 38 are both interrupted such that power is cut to the entire electrical outlet 360, including both receptacles 324*a*, 324*b*, in the event of detection of an overload fault, an arc fault or a ground fault. Output contacts 438 on circuit board 366 are operatively coupled to contacts 440 on power disconnect relay 42 to communicate an activation signal to power disconnect relay 42. Alternatively, dual power disconnect relays could be used with outlet 360, with one power disconnect relay positioned to interrupt line conductor 36*a* to receptacle 324*a*, and with one power disconnect relay positioned to interrupt line conductor 36*b* to receptacle 324*b*. However, use of a single power disconnect relay 42 positioned as shown in FIG. 20 is generally simpler and less expensive, and thus is preferred. Power disconnect relay 42 is activated as described below to disconnect power to outlet 360 upon detection of an overload fault in either top receptacle 324*a* or bottom receptacle 324*b*, as well upon detection of an overload fault with respect to the total detected current rating for outlet 360.

In the operation of electrical outlet 360, a user of the invention inserts a connector 300*b–p* into receptacle 324*a* and/or 324*b* as described above, so that connector prongs 302*b–p*, 304*b–p* engaged slots 328*a*, 328*b*. The prongs activate safety interlock switches 330*a*, 330*b* and contacts 331*a*, 331*b* creating signal outputs, via contacts 428*a*, 428*b* and contacts 432*a*, 432*b* for receptacles 324*a* and receptacle 324*b* respectively, which are communicated to circuit board 366. Connector prongs 302*b–p*, 304*b–p* will also activate plug headers 326*a*, 326*b*, 326*c*, 326*d* in receptacle 324*a*, 324*b* according to the notches present or absent in the connector prongs, creating signal outputs via contacts 420*a–d*, and 424*a–d*, which are communicated to circuit board 366. Connect/disconnect activation circuit 354 in circuit board 366 monitors safety interlock switches 330*a*, 330*b* and plug headers 326*a*, 326*b*, 326*c*, 326*d* to ascertain whether a connector has been inserted into receptacle 324*a* and/or 324*b* in order to close disconnect relay 42 and connect power to receptacle 324*a* and/or 324*b*. Detected current monitoring circuit 346 in circuit board 366 monitors the states of plug headers 326*a*, 326*b*, 326*c*, 326*d* to ascertain the current rating of connector 300*b*–300*p* according to the predetermined encoding scheme described above. The load current passing through receptacles 324*a* and 324*b* are respectively sensed by primary transformers 32*a*, 32*b* and secondary windings 34*a*, 34*b*, and corresponding voltage signals therefrom are communicated therefrom to circuit board 366. Additionally, the total load current passing through outlet 360 is sensed by primary transformer 32*c* and secondary winding 34*c* and communicated to circuit board 366 as a voltage signal.

Load current monitoring circuit 348 periodically monitors the voltage signals representing the sensed load currents to receptacles 324*a*, 324*b* and outlet 360. Comparison circuit 350 periodically compares the load currents through receptacles 324*a*, 324*b* to the detected current ratings for the connectors which are plugged into receptacles 324*a*, 324*b*. Comparison circuit 350 also compares the total load current through outlet 360 and both receptacles 324*a*, 324*b* to the preset outlet current rating provided by variable resistor 436. Comparison circuit 350 recognizes or notes current overload situations which occur with respect to receptacles 324*a*, 324*b* individually, as well as for outlet 360 overall. When any such current overload event is recognized by comparison circuit 350, detection circuit 356 then determines whether the overload is real or false according to duration of the overload or other criteria. If the overload is real, the connect/disconnect activation circuit 354 then activates power disconnect relay 42 to interrupt or disconnect power to outlet 360. Thus, power disconnection will occur in the event of a current overload associated with either receptacle 324*a*, 324*b* individually, or a current overload for electrical outlet 360 overall. If the current overload is associated with an individual receptacle 324*a* or 324*b*, overload indicator circuit 374 activates overload indicator light 368 together with top receptacle indicator light 370 or bottom receptacle indicator light 372. If an overall current overload has occurred to outlet 360, overload indicator circuit 74 activates overload indicator light 368 together with both top receptacle indicator light 370 and bottom receptacle indicator light 372.

Arc detector monitoring circuit 352 periodically monitors the voltage signals representing the sensed load currents to receptacles 324*a*, 324*b* and outlet 360. When arc detector monitoring circuit 352 recognizes or otherwise notes steps or spikes on the current waveform, arc timer circuit 358 then measures the number of steps or spikes within a predetermined period. When the number of steps or spikes within the predetermined period exceeds a certain threshold indicating the arc fault is not a "false" arc fault, connect/disconnect activation circuit 354 then activates power disconnect relay 42 to interrupt or disconnect power to outlet 360. Thus, power disconnection will occur in the event of an arc fault associated with either receptacle 324*a*, 324*b*. If the current overload is associated with an individual receptacle 324*a* or 324*b*, arc fault indicator circuit 378 activates arc fault indicator light 376 together with top receptacle indicator light 370 or bottom receptacle indicator light 372.

GFIC circuit 396 detects ground faults in a conventional manner and activates power disconnect relay 42 in the event of a ground fault associated with receptacle 324*a* or 324*b*. Ground fault indicator circuit 401 then activates ground fault indicator light 400 together with top receptacle indicator light 370 or bottom receptacle indicator light 372, according to the location of the ground fault.

Following power disconnection of outlet 360 by power disconnect relay 42, the user of the invention notes the location of the overload, arc or ground fault according to top and bottom receptacle indicator lights 370, 372, corrects the cause of the overload or arc fault and disengages the connectors from receptacles 324*a* and/or 324*b* to reset outlet 360 and receptacles 324*a*, 324*b*. When connectors are disengaged from receptacles 324*a*, 324*b*, connect/disconnect activation circuit recognizes the deactivation of plug headers 326*a–d*, and safety interlock switches 330*a*, 330*b* corresponding to a reset condition. The reset means of the invention also preferably applies to ground fault interruptions, such that disengaging connectors from receptacles 324*a*, 324*b* will reset GFIC 396 and enables connect/disconnect activation circuit 354 to provide power to outlet 360. Once resetting occurs, the user can then re-engage connectors in receptacles 324*a*, 324*b*, and the above events are generally repeated.

Electrical outlet 360 may also be embodied in an outlet adaptor in the manner illustrated in FIG. 9, so that the outlet 360 may be used in connection with conventional, presently available electrical outlets in the manner described above. The operations of circuit board 366 may be embodied in a "smart house" processor as described above, wherein input from the current monitoring means, current rating detection means and arc fault detection means of the invention are communicated to the smart house processor, which monitors load currents to various appliances and receptacles throughout the house, carries out current rating comparisons, overload detections and arc fault detections, and which interrupts current flow to the various appliances and receptacles upon detection of overloads as described above.

Figure 22:
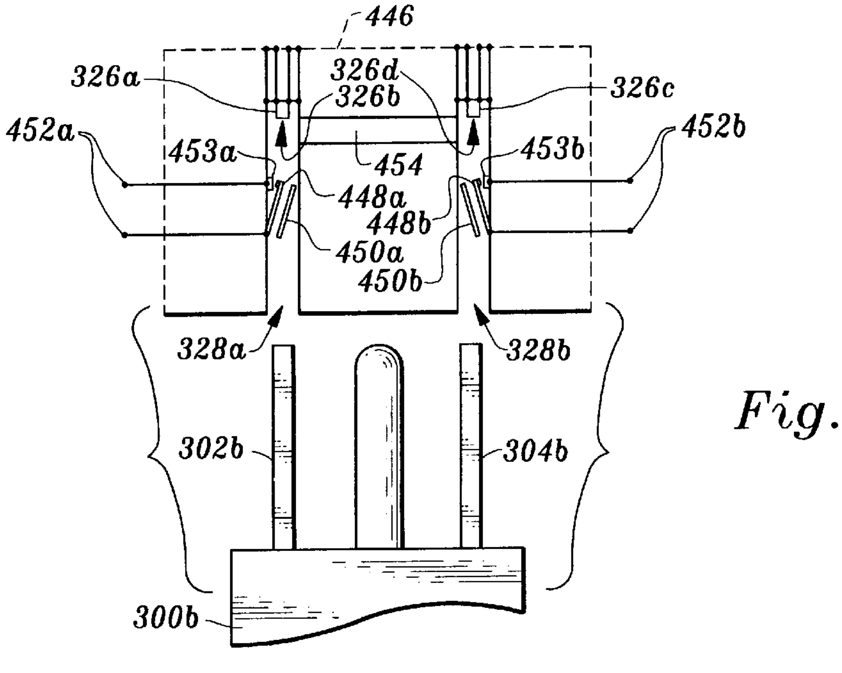
FIG. 22 is a fifth embodiment electrical receptacle in accordance with the invention.

Referring now to FIG. 22 an alternative embodiment receptacle 446 in accordance with the invention is shown with power control switches 448*a*, 448*b*. Although the included drawings and description describe the use of two such power control switches 448*a*, 448*b*, it will be obvious to those skilled in the art that shock prevention can be achieved by one or more of such switches e.g. two on the line side wired in series and two on the neutral side wired in series. The greater number of switches used in this manner will result in a higher level of shock prevention.

Electrical receptacle 446 is shown with a connector 300*b*, and with like reference numerals being used to denote like parts. Receptacle 446 provides power control switches 448*a*, 448*b* within slots 328*a*, 328*b* respectively. Power control switches 448*a*, 448*b* are positioned within the receptacle 446 much in the same manner as safety interlock switches 330*a*, 330*b* shown in FIG. 16 and described above. However, whereas safety interlock switches 330*a*, 330*b* only carry low voltage signal currents, power control switches 448*a*, 448*b* carry line voltages at full load currents of several amperes. Each power control switch 448*a*, 448*b* includes an insulator 450*a*, 450*b* covering each power control switch 448*a*, 448*b* so that power control switches 448*a*, 448*b* are electrically shielded from connector prongs 302*b*–302*p*, 304*b*–304*p* or other objects inserted into slots 328*a*, 328*b*. When connector 300*b*–300*p* is inserted into slots 328*a*, 328*b* of receptacle 446, the prongs 302*b*–302*p*, 304*b*–304*p* will contact and activate each power control switch 448*a*, 448*b* by pushing switches 448*a*, 448*b* against contacts 453*a*, 453*b* respectively. When the power control switches 448*a*, 448*b* are thus activated, current flows through power control contacts 452*a*, 452*b* applying power to receptacle 446 and the inserted connector 300*b*–300*p*, and receptacle 446 is switched to an "on" state. When connector 300*b*–300*p* is removed from slots 328*a*, 328*b*, prongs 302*b*–302*p*, 304*b*–304*p* disengage and deactivate power control switches 448*a*, 448*b* so that current through power control contacts 452*a*, 452*b* to the receptacle is interrupted, and the receptacle is switched to an "off" state.

The invention as shown in FIG. 22 and described above, utilizing power control switches 448*a*, 448*b*, may be used to prevent shock hazard to children as a stand-alone feature in a conventional electrical outlet. In other words, power control switches 448*a*, 448*b* may be used in a receptacle without the current detection means of the invention, and thus receptacle 446 as shown need not include plug headers 326*a*–326*d* within slots 328*a*, 328*b* to sense or detect the presence or absence of notches in connector prongs. The insertion of a foreign object into slots 328*a*, 328*b* will not result in a shock hazard because the foreign object will not contact a live connector, but will instead contact insulator 450*a* or 450*b*, and the foreign object will be diverted by insulation 450*a*, 450*b*, and further insertion of the object will be prevented by an insulated foreign object barrier 454. Barrier 454 will also prevent the foreign object form operating or actuating plug header switches 326*a*–326*d* as shown in FIG. 22. Foreign object barrier could also be included with receptacle 324.

Referring also to FIG. 18, circuit board 336 is used with receptacle 446 with minor modifications. In the case of receptacle 446, circuit board 336 does not monitor or sense safety interlock contacts as described above, and connect/disconnect activation circuit 354 no longer operates to connect power to receptacle 446. Rather, the power connection means for receptacle 446 is provided by power control switches 448*a*, 448*b* and power control contacts 452*a*, 452*b*. Thus, the power disconnect relay 42 for receptacle 446 differs from power disconnect relay 42 in circuit board 336 in that the power disconnect relay for receptacle 446 is normally closed or latched to permit current flow through conductors 36, 38. Power control contacts 452*a*, 452*b* preferably interrupt or disconnect conductors 36, 38, at a position "upstream" from power disconnect relay 42, so that activation of power control switches 448*a*, 448*b* will connect power to receptacle 446 and connector 300*b*–300*p*, and deactivation of power control switches 448*a*, 448*b* will interrupt power to receptacle 446 and connector 300*b*–300*p*.

Figure 23:
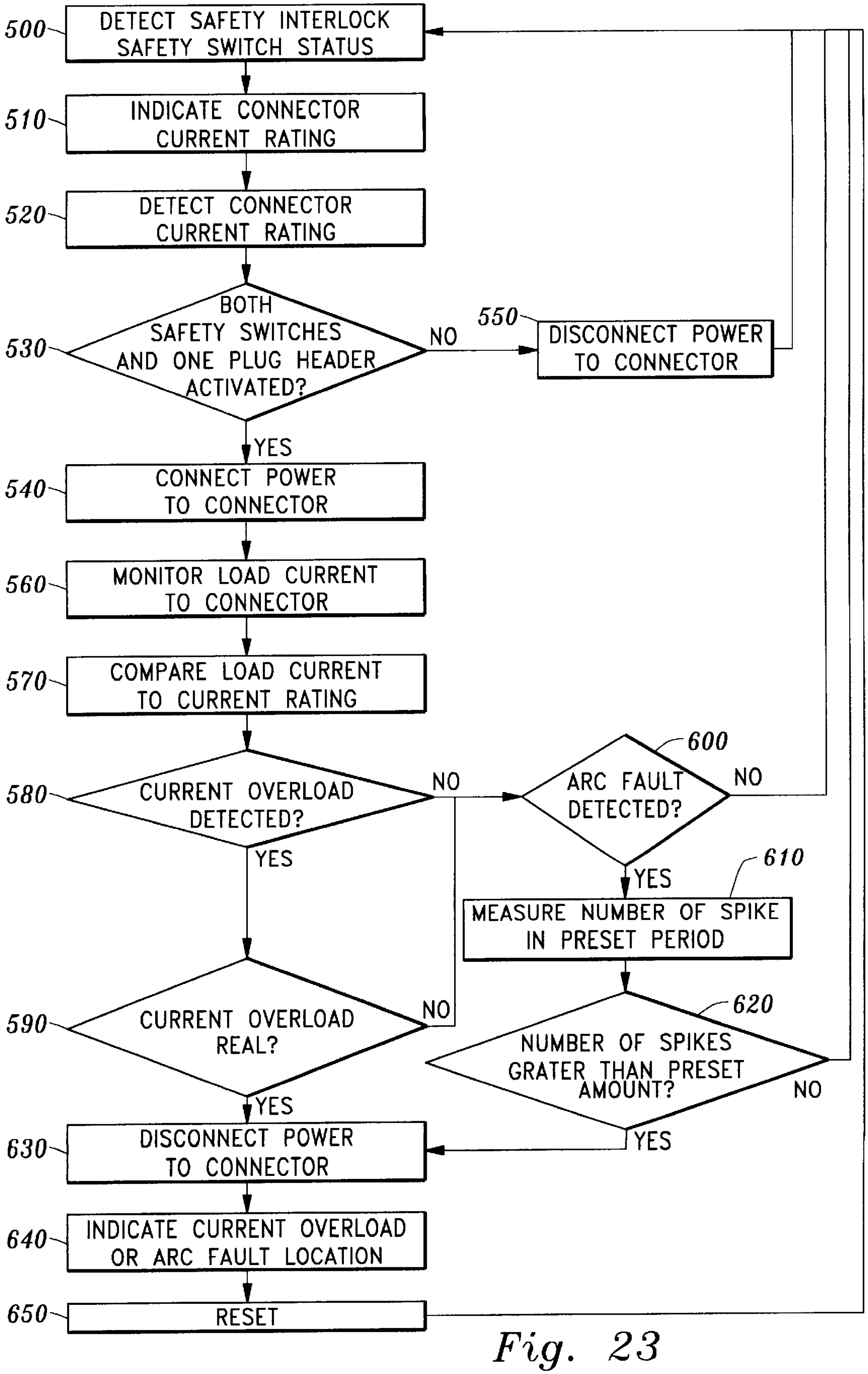
FIG. 23 is a flow chart illustrating the operation of the invention as embodied in the dual receptacle electrical outlet of FIG. 19 through FIG. 21.

The method of the invention will be more fully understood by reference to the flow chart shown in FIG. 23 as well as reference to FIG. 19 through FIG. 21, wherein the operation of the invention with regard to dual receptacle outlet 360 is shown.

At step 500, the states of safety interlock switches 330*a*, 330*b* are sensed or otherwise detected. As noted above, the normally deactivated safety interlock switches 330*a*, 330*b* of receptacles 324*a*, 324*b* are activated when prongs 302*b*–302*p*, 304*b*–304*p* of connector 300*b*–300*p* are inserted into slots 328*a*, 328*b*, and safety interlock switches 330*a*, 330*b* are deactivated when prongs 302*b*–302*p*, 304*b*–304*p* are removed from slots 328*a*, 328*b*. The states of safety interlock switches 330*a*, 330*b* are communicated to circuit board 366 wherein connect/disconnect activation circuit 354 periodically monitors the states of safety interlock switches 330*a*, 330*b* for closing and opening of power relay switch 42.

At step 510, the current rating of a connector 300*a*–300*p* is indicated or otherwise shown. Referring also to FIG. 14, FIG. 15A and FIG. 15B, the current rating indicating step is preferably carried out by providing connectors with notches or cutout sections at the ends of prongs 302*a*–302*p*, 304*a*–304*p*, with each configuration of notches or cutouts corresponding to a different current rating for connectors 300*a*–*p*.

At Step 520, connector current rating is detected. The detection of connector current rating is preferably carried out by electrical receptacles 324*a*, 324*b* through the detection or sensing of the presence or absence of notches in connector prongs 302*a*–302*p*, 304*a*–304*p* via plug headers 326*a*–326*d* located within slots 328*a*, 328*b*, for sensing or detecting notches in connector prongs, as noted above. The states of plug headers 326*a*–326*d* are communicated to circuit 366 wherein detected current monitoring circuit 346 determines the current rating of connector 300*b*–300*p* based on the states of plug headers 326*a*–326*d*.

At Step 530, the states of plug headers 326*a*–326*d* and safety interlock switches 330*a*, 330*b* are evaluated. This evaluation step is generally carried out by connect/disconnect activation circuit 354 in the manner described describe above. If both safety interlock switches 330*a*, 330*b* are activated and at least one of the four plug headers 326*a*–326*d* are activated, step 540 is carried out. If at least one of the safety interlock switches 330*a*, 330*b* are deactivated, or if all four plug headers 326*a*–326*d* are deactivated, then step 550 is carried out.

At Step 540, power to receptacle 324*a* or 324*b* is applied, or remains applied if power has already been applied previously, provided that both safety interlock switches 330*a*, 330*b* are activated and one of the four plug headers 326*a*–326*d* are determined to be activated in step 530. This step is generally carried out by connect/disconnect activation circuit 354 and power disconnect relay 42, as described above, where power to receptacles 324*a*, 324*b* is applied when power disconnect relay 42 is closed.

At Step 550, power to receptacles 324*a* or 324*b* is interrupted, or remains interrupted if power has already been previously terminated. This step is generally carried out by connect/disconnect activation circuit 354 and power disconnect relay 42 as described above, where power to receptacles 324*a*, 324*b* is applied when power disconnect relay 42 is open. Following step 550, steps 500, 510, 520, and 530 are generally repeated.

At step 560, the load current delivered to a connector is monitored. This step is generally carried out by monitoring the load current delivered to the electrical receptacle 324*a*, 324*b* in which the connector is plugged or engaged. As noted above and shown particularly in FIG. 20, the load current monitoring step can be carried out with respect to receptacles 324*a*, 324*b* individually as well as together for outlet 360. Primary transformers 32*a*, 32*b* and secondary windings 34*a*, 34*b* measure or detect load current to receptacles 324*a*, 324*b* respectively, while transformer 32*c* and secondary winding 34*c* measure load current to both receptacles 324*a*, 324*b* simultaneously and outlet 360 generally. Voltage signals representative of the load current detected by primary transformers 32*a*, 32*b*, 32*c* and secondary windings 34*a*, 34*b*, 34*c* are communicated to circuit board 366 wherein load current monitoring circuit 350 periodically checks or monitors the load current delivered to receptacles 324*a*, 324*b* and outlet 360 overall.

At Step 570, detected or measured load current is compared to the connector current rating determined in step 520. This comparing step is generally carried out by comparison circuit 350 as described above. As also noted above, comparison of load current to connector current rating is carried out for receptacles 324*a*, 324*b* individually, as well as for electrical outlet 360. Thus, in step 570, comparison circuit 350 compares the load current delivered to receptacle 324*a* to the current rating of the connector plugged into receptacle 324*a*, compares the load current delivered to receptacle 324*b* to the current rating of the connector plugged into receptacle 324*b*, and also compares the overall load current delivered to outlet 360 (receptacles 324*a* and 324*b* together) to the preset current rating provided by variable resistor 436.

At step 580, comparison circuit 350 makes a query as to whether a current overload is detected in the form of a measured load current from step 560 which exceeds the connector current rating (or preset outlet current rating) detected in step 520. If no such current overload is detected, step 600 is carried out. If a current overload is detected at step 580, step 590 is carried out.

At step 590, detection circuit 356 makes a query as to whether the detected overload is real or false. If the detected overload is real, step 630 is carried out. If the detected overload is "false," then step 600 is carried out.

At Step 600, the current load signal is evaluated to ascertain whether an arc fault is detected in the form of a characteristic electrical spiking or stepping pattern in the current waveform. Arc detector monitoring circuit 352 generally carries out this step as described above. If an arc fault is detected by arc detector monitoring circuit 352, step 610 is carried out. If an arc fault is not detected by detected arc detector monitoring circuit 352, steps 500–530 are carried out.

At Step 610, the number of steps or spikes within a preset period is measured. False arc timer 358 generally carries out this step via an internal timer as described above, to insure that the arc fault detected in step 600 is not a temporary current spike due to powering up an appliance or other cause.

At Step 620, timing circuit 358 makes a query as to whether the number of the steps spikes within the preset period determined in step 610 has exceeded a preset or predetermined value. Generally, situations in which the number of steps or spikes within a preset period do not exceed a predetermined value are considered "false" by timing circuit 358. If the number of spikes within a preset period does not exceed a predetermined value, steps 500–530 are carried out. If the number of spikes within a preset period does exceed a predetermined value, steps 630 is carried out.

At Step 630, electrical power to the connector and associated receptacle 324*a*, 324*b* is disconnected. This step is generally carried out by connect/disconnect activation circuit 354 and power disconnect relay 42 as described above. Preferably, a single power disconnect relay 42 is used to disconnect power to electrical outlet 360 and both receptacles 324*a*, 324*b* as shown in FIG. 6, rather than individually interrupting power to receptacles 324*a*, 324*b* separately via multiple power disconnect relays.

At step 640 the location of the overload or arc fault detected in step 580 or 600, respectively, is indicated. This step is generally carried out by overload indicator circuit 374, arc fault indicator circuit 378, together with overload indicator light 368, arc fault indicator light 376, and directional indicator lights 370, 372. If the current overload detected in step 580 is associated with an individual receptacle 324*a* or 324*b*, overload indicator circuit 374 activates overload indicator light 368 together with top receptacle indicator light 370 or bottom receptacle indicator light 372 accordingly. If an overall current overload has occurred to outlet 360, overload indicator circuit 374 activates overload indicator light 368 together with both top receptacle indicator light 370 and bottom receptacle indicator light 372. If the arc fault detected in step 600 occurs in top receptacle 324*a*, arc fault indicator circuit 378 activates arc fault indicator light 376 together with top receptacle indicator light 370. If the arc fault detected in step 600 occurs in bottom receptacle 324*b*, arc fault indicator circuit 378 activates arc fault indicator light 376 together with bottom receptacle indicator light 372. The user of the invention at this point can locate and correct the current overload or arc fault, thereby avoiding potential fire hazards associated with overload and arc faults.

At step 650, electrical outlet 360 is "reset" by unplugging or disengaging connectors from receptacles 324*a* and/or 324*b*. If the overload or arc fault detected in step 580 or step 600 was associated with outlet 324*a* or 324*b* individually, the reset step 650 is carried out generally by unplugging the connector associated with 324*a* or 324*b*. If the overload fault detected in step 580 was an overall overload fault for outlet 360, then resetting is carried out by unplugging connectors from both receptacles 324*a*, 324*b*. As described above, when connectors are disengaged from receptacles 324*a*, 324*b*, plug headers disengage from the connector prongs which in turn communicate plug header states to circuit board 366. Upon recognizing the disengagement of all four plug headers 326*a*–326*d*, connect/disconnect activation circuit 354 is reset so that when a connector is reinserted into receptacle 324*a* or 324*b*, connect/disconnect activation circuit 354 reconnects or closes power disconnect relay so that power is again supplied to outlet 360 and receptacles 324*a*, 324*b*. Following reset step 650, steps 500 through 640 are repeated.

Of course, if power disconnect relay 42 is a normally closed or latching relay as used for the receptacle 446 of FIG. 22, the reset will be carried out by a manual reset means which re-latches the relay such as occurs in the common GFCI outlet.

The method described above may additionally contain the steps of detecting a ground fault, interrupting power upon detection of a ground fault, and indicating the location of a ground fault. As noted above, these steps are carried out via a conventional ground fault interrupter circuit 396 together with ground fault indicator circuit 401, ground fault indicator light 400, and directional indicator lights 370, 372.

The present invention can also be embodied in a lamp fixture or other conventional electrical appliance. Conventional lamp fixtures, for example, typically provide a socket for receiving a lamp, contacts within the socket for providing power to the lamp, and a means for connecting and disconnecting power to the lamp. Conventional lamp fixtures and other appliances create a potential fire hazard in current overload and overheating situations, as described above.

A lamp fixture in accordance with the present invention provides means for indicating the current rating for the lamp fixture. Generally, the current rating for the lamp fixture will be predetermined and preset by the manufacturer in a current rating circuit within the lamp fixture. Where the lamp fixture includes more than one lamp receptacle, the current rating circuit will preferably include the current rating for each lamp receptacle in the lamp fixture, as well as the current rating for the overall lamp fixture. The lamp fixture of the invention also preferably provides means for indicating the temperature threshold for the lamp fixture. Generally, the temperature threshold for the lamp fixture will be predetermined and preset by the manufacture in a temperature limit circuit within the lamp fixture. The lamp fixture in the present invention further includes means for monitoring the lamp current, means for monitoring the lamp fixture temperature, means for comparing the monitored lamp current to the indicated lamp current rating, means for comparing the monitored lamp fixture temperature to the indicated lamp temperature threshold, means for disconnecting power to the lamp fixture when a current overload occurs, means for disconnecting power to the lamp fixture when a temperature overload or overheat fault has occurred, and means for resetting the power disconnecting means.

Figure 24:
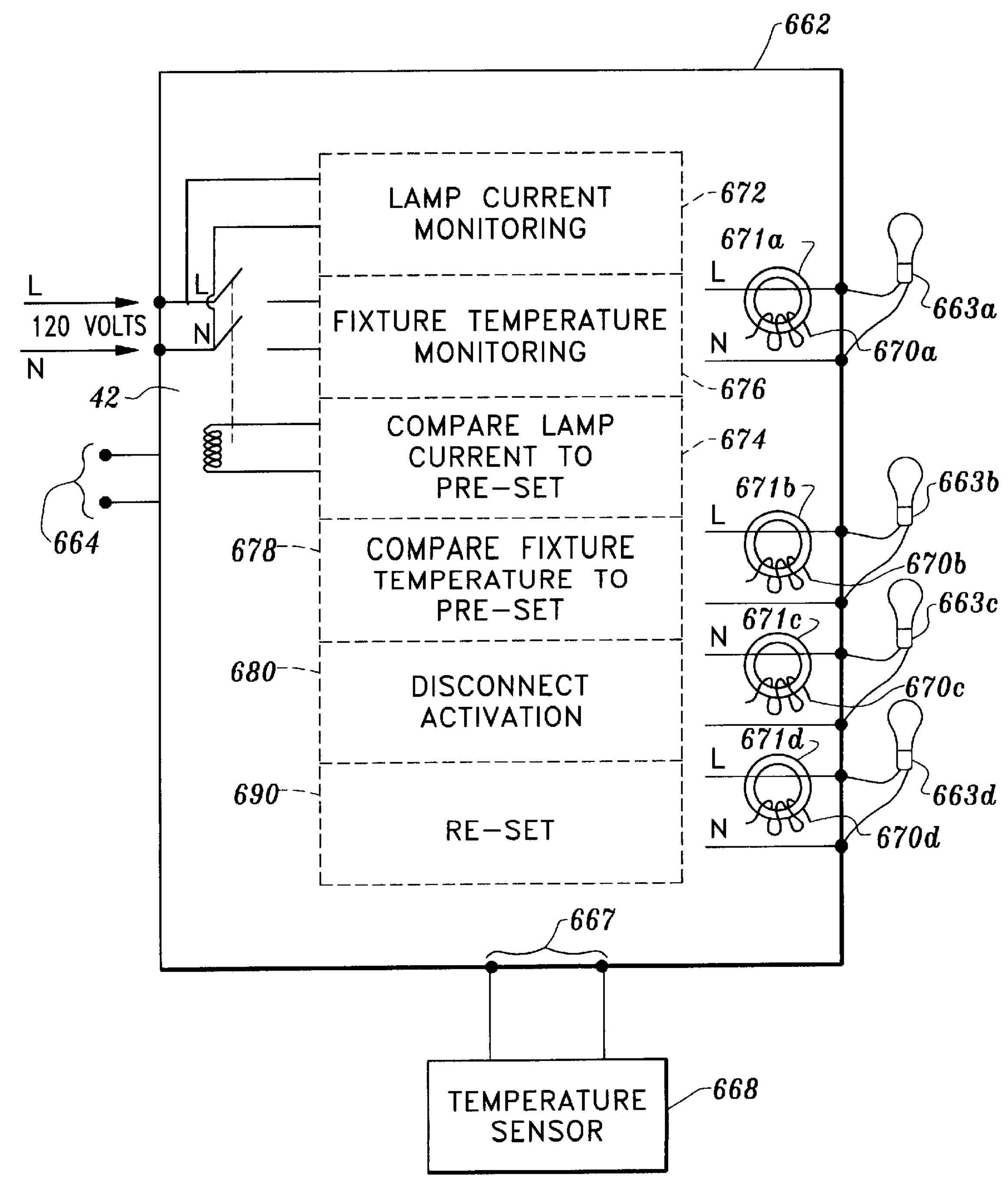
FIG. 24 is a functional block diagram of a power disconnect circuit in accordance with the invention for use with incandescent light fixtures.

Referring now to FIG. 24, there is shown a circuit board 662 for use with a lamp fixture (not shown) in accordance with the invention which provides the aforementioned means. Circuit board 662 may be internal to the lamp fixture or otherwise conveniently associated with the lamp fixture. The arrangement shown in FIG. 23 is for a four lamp light fixture module with lamps 663*a*, 663*b*, 663*c*, 663*d*. However, the present invention may be applied to a lamp fixture having one or more lamps generally. Circuit 662 disconnects power to receptacles for lamps 663*a*–663*d* when current drawn by a lamp exceeds the current rating for the lamp receptacle individually, or when the current drawn by one or more lamps exceeds the overall current rating for the lamp fixture as a whole. Circuit board includes a current rating circuit (not shown), and a temperature limit circuit (not shown), which will generally include a variable resistor and operate in a manner similar to variable resistor 436 described above, which can be preset by the manufacturer to indicate a particular current threshold(s) and a particular temperature threshold.

Circuit board 662 includes reset contacts 664 which are associated with the power switching means (not shown) for the lamp fixture. The power switching means is preferably a conventional on/off power switch. Temperature sensor contacts 667 are operatively coupled to a temperature sensor 668. Temperature sensor 668 preferably comprises a conventional thermocouple. Secondary windings 670*a*, 670*b*, 670*c*, 670*d* of ring transformers 671*a*, 671*b*, 671*c*, 671*d* are respectively associated with the receptacles (not shown) for lamps 663*a*–663*d*, for monitoring load current delivered to the individual lamps. Secondary windings 670*a*–670*d* of ring transformers 671*a*–671*d*, together with lamp current monitoring circuit 672, provide the current monitoring means for the lamp fixture. Lamp current monitoring circuit 672 receives input from transformers 671*a*–671*d* via windings 670*a*–670*d*, and carries out the operation of periodically monitoring, updating or verifying voltage signals V(load) from transformers 671*a*–671*d* via windings 670*a*–670*d*, to ascertain the load current which is being delivered to the lamp fixture and each individual lamp receptacle. An additional ring transformer and secondary winding (not shown) may be included for monitoring the load current to the lamp fixture as a whole, including all four lamps 663*a*–663*d*.

Current comparison circuit 674 provides current comparison means for the lamp fixture. The voltage signals received by lamp current monitoring circuit 672 are communicated to current comparison circuit 674, and the current rating circuit (not shown) communicates the predetermined current rating for each receptacle, and the current rating for the lamp fixture as a whole, to current comparison circuit 674. Lamp current comparison circuit 674 carries on the operation of ascertaining the preset current rating of the lamp fixture and each lamp receptacle from the current rating circuit (not shown) and periodically comparing the load current according to current monitoring circuit 672, to determine whether a current overload has occurred for one or more of the lamp receptacles in the lamp fixture.

Temperature sensor 668 and fixture temperature monitoring circuit 676 provide the temperature monitoring means for the lamp fixture. The temperature sensor 668 carries on the operation of periodically monitoring the temperature of the lamp fixture. Temperature sensor 668 generates an output signal indicating the present temperature of the lamp fixture, which is communicated to fixture temperature monitoring circuit 676. The temperature limit circuit (not shown) and temperature comparison circuit 678 provide temperature comparison means for the lamp fixture. The preset temperature threshold for the lamp fixture is communicated by the temperature limit circuit to temperature comparison circuit 678, and the actual temperature of the lamp fixture is communicated to temperature comparison circuit 678 by temperature sensor 668. Temperature comparison circuit 678 carries on the operation of ascertaining the preset lamp temperature threshold and periodically comparing the lamp fixture temperature detected by temperature sensor 668 to the temperature limit or threshold for the lamp fixture.

Means for disconnecting power to the lamp fixture when a current overload or overheat fault occurs are provided by disconnect activation circuit 680 and power disconnect relay 42. Disconnect activation circuit 680 opens power disconnect relay 42 to interrupt power to the lamp fixture when the detected load current of any of the lamps 663*a*–663*d* exceeds the current rating for their respective lamp receptacles, or when the lamp fixture as a whole exceeds the current rating for the lamp fixture according to the current limit circuit. The term "exceeds current rating" is generally the same as that described above for electrical receptacle 16. Disconnect activation circuit 680 also interrupts power to the lamp fixture when the detected temperature of the lamp fixture exceeds the temperature threshold of the lamp according to the temperature limit circuit. The user of the lamp will generally identify the power interruption by noticing that the light or lights in the lamp fixture have gone out. The cause of the current overload or heat overload in the lamp fixture will typically be caused by the use of a lamp or light bulb having a wattage or power draw which is greater than that for which the lamp fixture was designed and manufactured. The user can generally correct the current or heat overload fault by replacing the improper lamp with a correct lamp.

Means for reconnecting power to the lamp fixture are shown generally as re-set circuit 690. Reset circuit 690 is activated by the user operating the power connecting means (not shown), generally a wall mounted switch, to an "off" and then an "on" position. This will activate reset circuit 690, which closes relay 42 to again provide power to the lamp fixture.

Circuit board 662 may additionally include fault indicator means for indicating to the user whether a current overload or overheat fault associated with the lamp fixture has occurred, and for identifying a particular receptacle in which a fault has occurred. Indicator means can be provided by an audible sound alert, a flashing light, rapid blinking of lamp prior to disconnect, or other signaling means. Circuit board 662 may further include arc fault detection and ground fault detection circuits as described above, as well as false current overload and false arc timing circuits.

Figure 25:
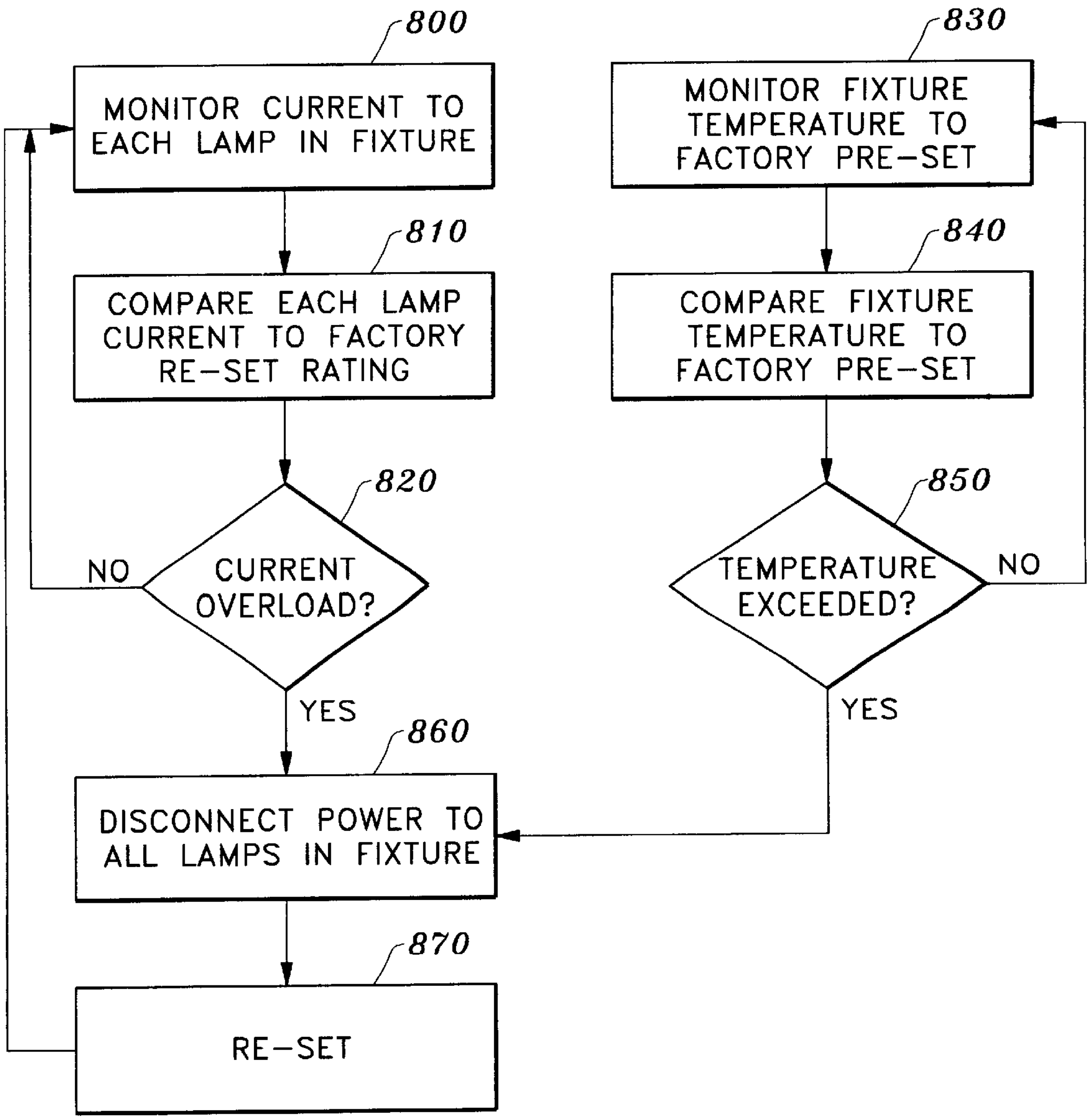
FIG. 25 is a flow chart illustrating the operation of the power disconnect circuit of FIG. 24.

The operation of the electrical connection safety apparatus of the invention as it is embodied in a lamp fixture will be more fully understood by reference to the flow chart shown in FIG. 25 and by reference to circuit in FIG. 24. The method outlined in FIG. 25 is described generally in terms of use with a four socket receptacle lamp fixture. However, as related above, the present invention may be used with one or more lamp receptacles associated with a lamp fixture.

At step 800, the current load supplied to the lamp fixture is monitored. During this step the current rating for the lamp receptacle is indicated as well. Preferably, the current rating for the lamp receptacle is predetermined and preset in a current rating circuit (not shown) within the lamp fixture. The current rating circuit thus carries out the operation of indicating the current rating for each lamp receptacle and the overall current rating for the lamp fixture. Also at step 800, the lamp current monitoring circuit 674 carries out the operation of periodically monitoring and detecting the load current supplied to each lamp 663*a*–663*d*, and the overall lamp fixture.

At step 810, the detected load current to each lamp 663*a*–663*d* as determined in step 800 is compared to the current rating for the each lamp 663*a*–663*d*. Also in step 810, the detected overall load current to the lamp fixture (including all lamps) is compared to the current rating for the overall lamp fixture to ascertain whether a current overload fault has occurred. In this step current comparison circuit 674 carries out the operation of comparing the load current detected by transformers 671*a*–671*d* via secondary windings 670*a*–670*d* to the current ratings for lamps 663*a*–663*d* as detected by lamp current monitoring circuit 672.

At step 820, a determination is made by current comparison circuit 674 whether a current overload fault as detected in step 810 has occurred for receptacles 663*a*–663*d*, or whether an overall current overload has occurred for the lamp fixture. If no such current overload is detected, steps 800 through 820 are carried out again. Also during step 820, if a current overload is detected, a false current detection circuit (not shown) determines whether the overload is real or false. If the detected current overload is not "false," step 860 is carried out.

Steps 830 through 850 are carried out generally in parallel with steps 800–820. At step 830, the temperature to the lamp fixture is monitored to determine a temperature overload fault. Temperature sensor 668 carries out the operation of monitoring temperature in the lamp fixture, and fixture temperature monitoring circuit 676 ascertains the temperature threshold indicated for the lamp fixture and the temperature sensed by sensor 668. Preferably, the temperature threshold for the lamp fixture will be predetermined and preset in a temperature limit circuit within the lamp fixture, as noted above.

At step 840, temperature comparison circuit 678 makes a query as to whether the lamp fixture temperature detected in step 830 has exceeded the temperature threshold for the lamp fixture, indicating a temperature overload fault.

At step 850, a determination is made by temperature comparison circuit 678 whether a temperature exceed fault has occurred as detected in step 840 wherein the lamp fixture temperature has exceeded the preset temperature threshold for the lamp fixture. If no such temperature exceed is detected, steps 830 through 850 are carried out again. If a temperature exceed is detected, step 860 is carried out.

At step 860, electrical power to the lamp fixture is disconnected. This step is generally carried out by disconnect activation circuit 680 and disconnect relay 42 as described above.

At step 870, the lamp fixture is "reset" by switching the power to the lamp fixture to the "off" position and then the "on" position as described above. When the power to the lamp fixture is in the "off" position, reset circuit 690 closes power disconnect relay 42 so that power is again supplied to the lamp fixture when the power switch to the lamp fixture is turned back on. Following steps 860, 870, steps 800 through 820 and steps 830 through 850 are repeated.

The method described above may additionally contain steps for signaling to the user when a current or temperature overload fault has occurred via an audible alert, a flashing light, rapid blinking of lamp prior to disconnect, or other signaling means.

The electrical connection safety apparatus of the invention may also be embodied in various conventional appliances, as well as in an electrical receptacle and lamp fixture. For example, a clothing iron, toaster, or other electrical appliance can include a predetermined current threshold circuit and temperature threshold circuit, current and temperature sensing and monitoring means, current and temperature comparison means, and power disconnect means as described above. Thus, the invention as disclosed above should be considered as applying to all electrical appliances, and not as limited to lamp fixtures or electrical receptacles.

Accordingly, it will be seen that this invention provides an electrical connection safety apparatus which eliminates the risk of fire or electric shock associated with current overload faults in electrical systems, which senses or detects the electrical current rating of electrical connectors which are plugged into electrical outlets and disconnects power to the outlets and connectors whenever the connector current rating is exceeded, and which can be used with conventional electrical connectors and electrical outlets which are presently in use. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. An electrical connection safety apparatus, comprising:

(a) means for detecting a current rating for an electrical appliance;

(b) means for detecting a load current delivered to said electrical appliance; and (c) means for disconnecting power to said electrical appliance when said detected load current exceeds said detected current rating of said electrical appliance.

2. An electrical connection safety apparatus as recited in claim 1, further comprising means for indicating said current rating of said electrical appliance.

3. An electrical connection safety apparatus as recited in claim 1, further comprising means for resetting said power disconnecting means.

4. An electrical connection safety apparatus as recited in claim 1, wherein said power disconnecting means further comprises means for preventing power disconnection due to false current overloads.

5. An electrical connection safety apparatus as recited in claim 1, further comprising means for indicating occurrence of a current overload fault associated with said electrical appliance.

6. An electrical connection safety apparatus as recited in claim 1 wherein said current rating detecting means, said load current detecting means, and said power disconnecting means, are associated with a home power monitoring computer.

7. An electrical connection safety apparatus as recited in claim 2, wherein:

(a) said electrical appliance comprises an electrical receptacle;

(b) said current rating detecting means comprises means for detecting a current rating of an electrical connector according to a detectable feature designating said current rating of said electrical connector; and (c) said load current detecting means comprises means for detecting a load current delivered to said electrical connector when said electrical connector is engaged with said electrical receptacle.

8. An electrical connection safety apparatus as recited in claim 7, wherein said current rating indicating means comprises a connector prong, associated with said electrical connector, said connector prong having at least one detectable notch adjacent an end thereof.

9. An electrical connection safety apparatus as recited in claim 8, wherein said current rating detecting means comprises:

(a) means for detecting said notch in said connector prong; and (b) means for generating an electrical signal responsive to detection of said notch in said connector prong.

10. An electrical connection safety apparatus as recited in claim 7, wherein said current rating indicating means comprises a connector prong on said electrical connector, said connector prong having a length proportional to said current rating of said electrical connector.

11. An electrical connection safety apparatus as recited in claim 10, wherein said current rating detecting means comprises:

(a) means for detecting said length of said connector prong; and (b) means for generating an electrical signal responsive to said length of said connector prong.

12. An electrical connection safety apparatus as recited in claim 7, wherein said current rating indicating means comprises a connector adaptor, said connector adaptor including a connector prong, said connector prong having a length which is proportional to said current rating of said electrical connector.

13. An electrical connection safety apparatus as recited in claim 7, wherein said current rating indicating means comprises a connector adaptor, said connector adaptor including a connector prong, said connector prong having at least one detectable notch.

14. An electrical connection safety apparatus as recited in claim 11, wherein said means for detecting said length of said connector prong comprises a movable member, said movable member positioned in said electrical receptacle to interact with said connector prong when said connector prong is inserted into said electrical receptacle, said electrical signal generating means responsive to movement of said movable member.

15. An electrical connection safety apparatus as recited in claim 1, wherein said power disconnecting means comprises:

(a) means for monitoring said load current detecting means;

(b) means for comparing said detected load current to a current rating detected by said current rating detecting means; and (c) means for activating a power disconnect relay when said detected load current exceeds said detected current rating.

16. An electrical connection safety apparatus as recited in claim 7, wherein said electrical connector comprises a replaceable fuse.

17. An electrical connection safety apparatus as recited in claim 1, further comprising means for disconnecting power to said electrical appliance when a ground fault is detected.

18. An electrical connection safety apparatus as recited in claim 17, further comprising means for indicating occurrence of a ground fault associated with said electrical appliance.

19. An electrical connector safety apparatus as recited in claim 7, further comprising safety means for preventing shocks due to partial engagement of said connector in said receptacle and for preventing shocks due to insertion of improper objects into said receptacle.

20. An electrical connector safety apparatus as recited in claim 19, wherein said shock prevention means comprises at least one safety interlock switch associated with a slot in said receptacle.

21. An electrical connector safety apparatus as recited in claim 19, wherein said shock prevention means comprises at least one power control switch associated with a slot in said receptacle.

22. An electrical connector safety apparatus as recited in claim 20, wherein said shock prevention means further comprises a foreign object barrier.

23. An electrical connector safety apparatus as recited in claim 21, wherein said shock prevention means further comprises a foreign object barrier.

24. An electrical connector safety apparatus as recited in claim 1, further comprising:

(a) means for detecting an arc fault; and (b) means for disconnecting power to said electrical appliance when an arc fault is detected.

25. An electrical connector safety apparatus as recited in claim 24, further comprising means for indicating occurrence of an arc fault associated with said electrical appliance.

26. An electrical connector safety apparatus as recited in claim 24, further comprising means for preventing power disconnection due to false arc faults.

27. An electrical connector safety apparatus as recited in claim 1, further comprising:

(a) means for sensing a temperature of said electrical appliance; and (b) means for disconnecting power to said electrical appliance when said detected temperature exceeds a predetermined temperature threshold.

28. An electrical connector safety apparatus as recited in claim 2, wherein said current rating indicating means comprises a preset current indicating circuit.

29. An electrical connector safety apparatus as recited in claim 2, wherein said current rating indicating means comprises a variable resistor, said variable positioned such that a user can adjust said variable resistor.

30. An electrical connection safety apparatus, comprising:

(a) means for indicating a current rating of an electrical appliance;

(b) means for detecting said current rating of said electrical appliance;

(c) means for detecting a load current delivered to said electrical appliance;

(d) means for disconnecting power to said electrical appliance when said load current exceeds said current rating of said electrical appliance; and (e) means for resetting said power disconnecting means.

31. An electrical connection safety apparatus as recited in claim 30, further comprising means for indicating occurrence of a current overload fault associated with said electrical appliance.

32. An electrical connection safety apparatus as recited in claim 30, wherein said power disconnecting means comprises:

(a) means for monitoring said load current detecting means;

(b) means for comparing said detected load current to said current rating for electrical appliance current rating; and (c) means for activating a power disconnect relay when said detected load current exceeds said electrical appliance current rating.

33. An electrical connection safety apparatus as recited in claim 30, wherein:

(a) said electrical appliance comprises an electrical receptacle;

(b) said current rating detecting means comprises means for detecting a current rating of an electrical connector according to a detectable feature designating said current rating of said electrical connector; and (c) said load current detecting means comprises means for detecting a load current delivered to said electrical connector.

34. An electrical connection safety apparatus as recited in claim 33, wherein said current rating indicating means comprises a connector prong, associated with said electrical connector, said connector prong having at least one detectable notch adjacent an end thereof.

35. An electrical connection safety apparatus as recited in claim 34, wherein said current rating detecting means comprises:

(a) means for detecting said notch in said connector prong; and (b) means for generating an electrical signal responsive to detection of said notch in said connector prong.

36. An electrical connection safety apparatus as recited in claim 35, wherein said means for detecting said notch in said connector prong comprises at least one plug header, said plug header positioned in said electrical receptacle to interact with said connector prong when said connector prong is inserted into said electrical receptacle, said electrical signal generating means responsive to movement of said plug header.

37. An electrical connection safety apparatus as recited in claim 34, wherein said current rating indicating means comprises a connector adaptor, said connector adaptor including a connector prong, said connector prong having at least one detectable notch.

38. An electrical connection safety apparatus as recited in claim 33, wherein said current rating indicating means comprises a connector prong on said electrical connector, said connector prong having a length proportional to said current rating of said electrical connector.

39. An electrical connection safety apparatus as recited in claim 38, wherein said current rating detecting means comprises:

(a) means for detecting said length of said connector prong; and (b) means for generating an electrical signal responsive to said length of said connector prong.

40. An electrical outlet safety apparatus as recited in claim 39, wherein said current rating detecting means comprises:

(a) a movable member, said movable member positioned in said electrical receptacle to interact with a connector prong when said connector prong is inserted into said electrical receptacle, said connector prong having a length which indicates said current rating of said electrical connector; and (b) means for generating an electrical signal responsive to said length of said connector prong, said electrical signal generating means responsive to movement of said movable member.

41. An electrical outlet safety apparatus as recited in claim 40, wherein said means for resetting said power disconnecting means comprises:

(a) reset contacts, said reset contacts associated with said movable member; and (b) bias means for returning said movable member to a reset position when said connector prong is removed from said electrical receptacle.

42. An electrical connection safety apparatus as recited in claim 33, wherein said current rating indicating means comprises a connector adaptor, said connector adaptor including a connector prong, said connector prong having a length which is proportional to said current rating of said electrical connector.

43. An electrical connection safety apparatus as recited in claim 33, further comprising means for disconnecting power to said electrical connector when a ground fault is detected, and means for indicating occurrence of a ground fault associated with said electrical connector.

44. An electrical connector safety apparatus as recited in claim 33, further comprising safety means for preventing shocks due to partial engagement of said connector in said receptacle and for preventing shocks due to insertion of improper objects into said receptacle.

45. An electrical connector safety apparatus as recited in claim 44, wherein said shock prevention means comprises at least one safety interlock switch associated with slots in said receptacle.

46. An electrical connector safety apparatus as recited in claim 44, wherein said shock prevention means comprises at least one power control switch associated with slots in said receptacle.

47. An electrical connector safety apparatus as recited in claim 45, wherein said shock prevention means comprises a foreign object barrier.

48. An electrical connector safety apparatus as recited in claim 46, wherein said shock prevention means comprises a foreign object barrier.

49. An electrical connector safety apparatus as recited in claim 30, further comprising:

(a) means for detecting an arc fault; and (b) means for disconnecting power to said electrical appliance when an arc fault is detected.

50. An electrical connector safety apparatus as recited in claim 49, further comprising means for indicating occurrence of an arc fault associated with said electrical appliance.

51. An electrical connector safety apparatus as recited in claim 49, further comprising means for preventing power disconnection due to false arc faults.

52. An electrical connector safety apparatus as recited in claim 30, further comprising:

(a) means for sensing a temperature of said electrical appliance; and (b) means for disconnecting power to said electrical appliance when said detected temperature exceeds a predetermined temperature threshold.

53. An electrical connector safety apparatus as recited in claim 30, wherein said electrical appliance is a lamp fixture.

54. An electrical connection safety apparatus as recited in claim 30 wherein said current rating detecting means, said load current detecting means, and said power disconnecting means, are associated with a home power monitoring computer.

55. An electrical connector safety apparatus as recited in claim 30, wherein said current rating indicating means comprises a preset current indicating circuit.

56. An electrical connector safety apparatus as recited in claim 30, wherein said current rating indicating means comprises a variable resistor, said variable positioned such that a user can adjust said variable resistor.

57. An electrical outlet safety apparatus, comprising:

(a) an electrical outlet, said electrical outlet including at least one electrical receptacle;

(b) means, associated with said electrical receptacle, for detecting a current rating of an electrical connector, according to a detectable feature of said electrical connector, when said electrical connector is engaged in said electrical receptacle;

(c) means for detecting a load current delivered to said electrical receptacle;

(d) means for disconnecting power to said electrical receptacle when said load current to said receptacle exceeds said current rating of said electrical connector; and (e) means for resetting said means for disconnecting power to said electrical receptacle.

58. An electrical outlet safety apparatus as recited in claim 57, further comprising:

(a) means for detecting a load current delivered to said electrical outlet;

(d) means for disconnecting power to said electrical outlet when said load current to said electrical outlet exceeds a preset electrical outlet current rating; and (e) means for resetting said means for disconnecting power to said electrical outlet.

59. An electrical outlet safety apparatus as recited in claim 57, wherein said means for disconnecting power to said electrical receptacle comprises:

(a) electronic means for monitoring said load current detecting means;

(b) electronic means for comparing said detected load current to said connector current rating; and (c) electronic means for activating a power disconnect relay when said detected load current exceeds said electrical connector current rating.

60. An electrical outlet safety apparatus as recited in claim 57, wherein said current rating detecting means comprises:

(a) at least one plug header, said plug header positioned in said electrical receptacle to interact with a connector prong when said connector prong is inserted into said electrical receptacle, said connector prong having at least one notch adjacent the end thereof; and (b) said plug header generating an electrical signal responsive to detection of said notch in said connector prong.

61. An electrical outlet safety apparatus as recited in claim 57, further comprising means for indicating occurrence of a current overload fault associated with said electrical receptacle.

62. An electrical outlet safety apparatus as recited in claim 57, further comprising:

(a) means for disconnecting power to said electrical outlet when a ground fault is detected; and (b) means for indicating occurrence of a ground fault associated with said electrical receptacle.

63. An electrical connector safety apparatus as recited in claim 57, further comprising safety means for preventing shocks due to partial engagement of said connector in said receptacle and for preventing shocks due to insertion of improper objects into said receptacle.

64. An electrical connector safety apparatus as recited in claim 63, wherein said shock prevention means comprises at least one safety interlock switch associated with slots in said receptacle.

65. An electrical connector safety apparatus as recited in claim 63, wherein said shock prevention means comprises at least one power control switch associated with slots in said receptacle.

66. An electrical connector safety apparatus as recited in claim 64, wherein said shock prevention means comprises a foreign object barrier.

67. An electrical connector safety apparatus as recited in claim 65, wherein said shock prevention means comprises a foreign object barrier.

68. An electrical connector safety apparatus as recited in claim 57, further comprising:

(a) means for detecting an arc fault; and (b) means for disconnecting power to said electrical outlet when an arc fault is detected.

69. An electrical connector safety apparatus as recited in claim 68, further comprising means for indicating occurrence of an arc fault associated with said electrical receptacle.

70. An electrical connector safety apparatus as recited in claim 68, further comprising means for preventing power disconnection due to false arc faults.

71. An electrical connection safety apparatus as recited in claim 57 wherein said current rating detecting means, said load current detecting means, and said power disconnecting means, are associated with a home power monitoring computer.

72. An electrical connector safety apparatus as recited in claim 57, wherein said current rating indicating means comprises a preset current indicating circuit.

73. An electrical connector safety apparatus as recited in claim 57, wherein said current rating indicating means comprises a variable resistor, said variable located in a front panel, said front panel and said variable resistor positioned such that a user can adjust said variable resistor.

74. An electrical outlet safety apparatus, comprising:

(a) an electrical outlet, said electrical outlet including at least one electrical receptacle;

(b) at least one safety switch means for preventing shocks due to partial engagement of a connector in said receptacle and for preventing shocks due to insertion of foreign objects into said receptacle, said safety interlock switch means positioned within a slot in said receptacle;

(c) means for delivering power to said receptacle when said safety switch means is activated; and (d) means for cutting off power to said receptacle when said safety switch means is deactivated.

75. An electrical connection safety apparatus as recited in claim 74, further comprising a foreign object barrier, said foreign object barrier associated with said slot in said receptacle.

76. An electrical outlet safety apparatus, comprising:

(a) an electrical outlet, said electrical outlet including at least one electrical receptacle;

(b) at least one at least one power control switch means for preventing shocks due to partial engagement of a connector in said receptacle and for preventing shocks due to insertion of foreign objects into said receptacle, said power control switch means positioned within a slot in said receptacle;

(c) means for delivering power to said receptacle when said at least one power control switch means is activated; and (d) means for cutting off power to said receptacle when said at least one power control switch is deactivated.

77. An electrical connection safety apparatus as recited in claim 76, further comprising a foreign object barrier, said foreign object barrier associated with said slot in said receptacle.

* * * * *

UNITED STATES PATENT AND TRADEMARK OFFICE
CERTIFICATE OF CORRECTION

PATENT NO. : 6,049,143
DATED : April 11, 2000
INVENTOR(S) : Richard O. Simpson, Stephen G. Jarvis and John LaGrou It is certified that error appears in the above-identified patent and that said Letters Patent is hereby corrected as shown below:

Column 5,
Line 64 a period insert a period following the word "cords".
Line; line 65, "Another" should be indented to reflect the start of a new paragraph.

Column 20,
Line 4, "136b" should be --136c--;
Line 25, a comma should be inserted between "12b" and "12c"; line 59, "32b" should be --34b--.

Column 22,
Line 20, "02p" should be --302p--.

Column 24,
Line 6, a comma should be inserted between "310p" and "312a";
Line 8, the second "326b" should be -- 326d --;
Line 9, "326" should be -- 326c --;
Line 43, the "a" after "deactivate" should be omitted;
Line 44, "326" should be -- 326d --;
Line 56, the phrase "are conductive or" after 330b should be omitted;
Line 57, "conductive" should be "non-conductive".

Column 25,
Line 7, "30a" should be "330a";
Line 23, the "or" between "326c" and "326d" should be omitted;
Line 66, "326b" should be -- 326d --.

Column 26,
Line 20, "communicate" should be --communicated--;
line 25, "caries" should be --carries--;
line 34, "or" should be omitted.

Column 28,
Line 58, "342" should be --342a--.

Column 33,
Line 7, "336b" should be --330b--.

UNITED STATES PATENT AND TRADEMARK OFFICE

CERTIFICATE OF CORRECTION

PATENT NO. : 6,049,143
DATED : April 11, 2000
INVENTOR(S) : Richard O. Simpson, Stephen G. Jarvis and John LaGrou It is certified that error appears in the above-identified patent and that said Letters Patent is hereby corrected as shown below:

Column 35,
Line 3, "74" should be -- 374 --.

Column 37,
Line 48, "describe" should be omitted.

Column 40,
Line 52, the number -- 662 -- should be inserted after the word "board".

Column 48,
Line 57, "(d)" should be -- (b) --; line 60, "(e)" should be -- c --.

Column 50,
Line 37, the first "at least one" should be deleted.

Signed and Sealed this

Twenty-fourth Day of July, 2001

Nicholas P. Godici

*Attest:*

NICHOLAS P. GODICI

*Attesting Officer* *Acting Director of the United States Patent and Trademark Office*